(12) United States Patent
Iijima

(10) Patent No.: US 6,298,651 B1
(45) Date of Patent: Oct. 9, 2001

(54) POWER GENERATION METHOD AND POWER GENERATING APPARATUS

(75) Inventor: Masaki Iijima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/331,943

(22) PCT Filed: Dec. 17, 1997

(86) PCT No.: PCT/JP97/04646

§ 371 Date: Jun. 25, 1999

§ 102(e) Date: Jun. 25, 1999

(87) PCT Pub. No.: WO98/29653

PCT Pub. Date: Jul. 9, 1998

(30) Foreign Application Priority Data

| Dec. 26, 1996 | (JP) | 8-357129 |
| Feb. 14, 1997 | (JP) | 9-047264 |
| Feb. 14, 1997 | (JP) | 9-047265 |
| Feb. 19, 1997 | (JP) | 9-050976 |
| Feb. 26, 1997 | (JP) | 9-058375 |
| May 23, 1997 | (JP) | 9-150202 |
| Sep. 9, 1997 | (JP) | 9-260910 |

(51) Int. Cl.⁷ .................................................. F02G 3/00

(52) U.S. Cl. ............................................. 60/39.02

(58) Field of Search ............................ 60/39.182, 39.02, 60/39.12

(56) References Cited

U.S. PATENT DOCUMENTS

| 3,994,699 | 11/1976 | Scott | 44/76 |
| 4,631,915 | 12/1986 | Frewer et al. | 60/39.12 |
| 4,676,063 | * | 6/1987 | Goebel et al. | 60/39.07 |
| 5,251,433 | * | 10/1993 | Wallace | 60/39.05 |
| 5,319,924 | * | 6/1994 | Wallace | 60/39.02 |
| 5,375,410 | 12/1994 | Briesch et al. | 60/39.182 |
| 5,469,699 | 11/1995 | Daman | 60/39.02 |

FOREIGN PATENT DOCUMENTS

| 0 061 262 A1 | 9/1982 | (EP) . |
| 58-001720 B2 | 1/1983 | (JP) . |
| 59-115405 | 7/1984 | (JP) . |
| 60-243305 | 12/1985 | (JP) . |
| 05078671 | 3/1993 | (JP) . |

(List continued on next page.)

OTHER PUBLICATIONS

Lozza et al.; Combined–Cycle Power Stations Using "Clean–Coal Technologies": Thermodynamic Analysis of Full Gastification Versus Fluidized Bed Combustion With Partial Gastification; Journal of Engineering for Gas Turbines and Power, 118: (737–748) Oct. 1996.

Hirama; Current Development Status of Air Blown Gasification Cycle (formerly known as 'British Coal Topping Cycle'); Coal Utilization Technique Information, pp. 1–6 (Sep. 1996).

Primary Examiner—Timothy S. Thorpe
Assistant Examiner—William H Rodriguez
(74) Attorney, Agent, or Firm—Myers Bigel Sibley & Sajovec, P.A.

(57) ABSTRACT

A method and an apparatus for power generation, by which high-efficiency power generation is achieved by utilizing a boiler-oriented fuel such as inexpensive coal, heavy oil and waste plastic, and by further utilizing a gas-turbine-oriented fuel in some cases, without exerting bad effects on the environment, at low equipment cost. In the apparatus, first, the boiler-oriented fuel is separated into a distillate and a residue by partial processing. The distillate (in some cases, with a gas-turbine-oriented fuel) is supplied to a gas turbine to generate electric power. Further, a combustion exhaust gas discharged from the turbine is supplied to a boiler. Then, the residue (in some cases, with a boiler-oriented fuel) is burned to obtain steam. Further, electric power is generated by the steam.

16 Claims, 8 Drawing Sheets

FOREIGN PATENT DOCUMENTS

| | | |
|---|---|---|
| 05264040 | 10/1993 | (JP) . |
| 06108069 | 4/1994 | (JP) . |
| 06179871 | 6/1994 | (JP) . |
| 06207180 * | 7/1994 | (JP) . |
| 06184565 | 7/1994 | (JP) . |
| 06264760 | 9/1994 | (JP) . |
| 06317106 | 11/1994 | (JP) . |
| 07109904 | 4/1995 | (JP) . |
| 07208111 | 8/1995 | (JP) . |
| 07509766 | 10/1995 | (JP) . |
| 08177522 | 7/1996 | (JP) . |
| 09189206 | 7/1997 | (JP) . |
| 10018859 | 1/1998 | (JP) . |
| WO 93/22540 | 11/1993 | (WO) . |

* cited by examiner

POWER GENERATION METHOD AND POWER GENERATING APPARATUS

FIELD OF THE INVENTION AND RELATED ART STATEMENT

The present invention relates to a method and an apparatus for power generation, wherein a boiler-oriented fuel, such as coal and heavy oil is separated into a distillate and a residue by performing partial processing, and subsequently, a gas turbine fuel obtained from the distillate or a combination of the gas turbine fuel and another gas-turbine-oriented fuel is supplied to a gas turbine, the gas turbine fuel and the gas-turbine-oriented fuel are burned to generate electric power, on the other hand, a boiler fuel comprising the residue or a combination of the residue and the boiler-oriented-fuel and/or other boiler-oriented fuels are supplied to a boiler, these fuels are burned to generate steam, and power is generated by means of a steam turbine. The present invention further relates to a power generation method and apparatus for burning an exhaust gas again wherein an exhaust gas discharged from a gas turbine is supplied to a boiler and is utilized for burning boiler fuel.

There have been three kinds of power generation methods of converting energy produced by combustion into electrical energy through a motor such as a turbine, namely, a first method of generating electric power by means of a boiler and a steam turbine; a second method of generating electric power by means of a gas turbine; and a combined cycle method using the combination of the first and second methods.

In the method for generating electric power by means of a boiler and a steam turbine, fuel oil, crude oil, residue oil or coal is used as a fuel. Further, electric power is generated by driving the turbine by using steam of high-temperature and high-pressure produced by the boiler. However, the thermal efficiency is relatively low, namely, 38 to 40%/HHV basis (HHV: Higher Heating Value; the thermal efficiency of power generation is expressed on HHV basis, unless otherwise specified).

Further, in the method using the gas turbine, liquefied natural gas (LNG), kerosene (or kerosine) or light oil (gas oil) is used as a fuel. Furthermore, the fuel is burned in compressed air, and then burned by heating the compressed air by combustion heat. Electric power is generated by driving the gas turbine by the produced high-temperature and high-pressure gas. Although the thermal efficiency in this case is 20 to 35%, the temperature of the exhaust gas discharged from the gas turbine is high, for example, 450 to 700° C. and thus, the heat of this gas can be utilized.

Furthermore, in the case of using air-cooled fin turbine, the gas temperature can be raised to 1300 to 1500° C. Thus, the efficiency of power generation can be enhanced. Consequently, the exhaust gas can be utilized more effectively.

In the case of the combined cycle power generation method which is the combination of these power generation methods, LNG is used as the fuel. Electric power is generated by burning the fuel in compressed air and driving the gas turbine by the use of the high-temperature and high-pressure gas. Further, the exhaust gas is supplied to a heat recovery boiler to produce steam. Thus, the method of generating electric power by using the steam turbine is performed. Conventional gas turbine features high heat efficiency of 46 to 47%. Therefore, when a facility is newly established due to superannuation of the power generation facility, or when the increase of the ability of power generation by utilizing the existing facility is necessary, new facilities adopting the combined cycle power generation method by which high heat efficiency can be obtained have been constructed.

However, in the case of the combined cycle power generation method using LNG, the storage of the fuel, namely, LNG costs very much, and a problem in supplying LNG may occur.

Western countries have the experience of using crude oil and residue oil in addition to LNG and light oil as the fuel for a gas turbine. However, many troubles have occurred owing to impurities contained in crude oil and residue oil. Further, it is pointed out that the maintenance cost has amounted up to a larger sum in comparison with that in the case of using light oil and LNG. Incidentally, it is desirable that the contents of impurities in the fuel used in the gas turbine are limited as follows: a sum of a sodium content and a potassium content is not more than 0.5 ppm by weight; and a vanadium content is not more than 0.5 ppm by weight. Especially, a sodium salt component, a potassium salt component and a vanadium component affect one another. This results in drop of the melting point of metal used as the material of each blade of the gas turbine, and causes ash component to adhere to the blades.

On the other hand, in the case of thermal power generation, coal and heavy oil reserved in the nature in abundance are used as the raw fuel, in addition to petroleum and LNG. Further, it has been studied how the raw material and fuel are effectively used. For instance, integrated gasification combined cycle (IGCC) power generation, by which a furnace of the entrained (flow) bed gasification type is used as a gasification furnace and the net thermal efficiency of about 43 to 47% is obtained, has been studied. However, in the case of such techniques, it is necessary for utilizing coal and fuel oil in the combined cycle power generation method to convert the raw fuel into gas once and further refine the obtained gas.

Method of gasifying all of raw fuel has encountered the problems that excessive facilities are needed for pretreatment of raw fuel, that a special type gasification furnace and a special type boiler to be combined with this gasification furnace are necessary, that operating conditions are severe, that as a result of gasifying all of the raw fuel, the quantity of the produced gas is large, that excessive facilities are needed for dust removal and purification of a gas, that the treatment of the remaining molten ash is needed, and that even a fuel to be used in a steam turbine is gasified and the obtained gas is purified.

Journal of Engineering for Gas Turbines and Power, vol. 118, October, 1996, p. 737 discloses the technique of a combined cycle power generation by which coal is gasified at high temperature in the presence of oxygen and water vapor, and in which the obtained gas is supplied to a gas turbine and is burned therein and subsequently, power generation is performed by driving the gas turbine by the use of the generated high-temperature combustion gas, and further, power generation is also performed by supplying char, which is left after the gasification of the coal, to a fluidized bed boiler, and by burning the char and driving a steam turbine by generated steam.

This technique, however, has the problem in that ingredients, such as Na salt, K salt and V compound, which corrode the turbine blades, are frequently included in the gas, because the gasification temperature is not lower than 1000° C., and thus there is the necessity for eliminating these ingredients. This technique further has the problem in that because a system constituted by the combination of a gasification device, a gas turbine and a fluidized bed boiler is peculiar, the extensive adjustment of the facility is needed in applying this technique to a boiler provided with a radiation heat transfer surface and a convention heat transfer surface, such as the existing boiler/steam turbine system, and thus, practically, this technique is subject to the constraint that this technique can be applied for establishing a new facility. This technique further has the problem in that the purification of the gas obtained at high temperature should be performed at low temperature and there is a great loss of energy, and that the cost of the entire facility becomes excessive.

SUMMARY OF THE INVENTION

An object of the present invention is to achieve power generation with high efficiency by using an inexpensive boiler-oriented fuel with low availability, which is a fuel that cannot be utilized for a gas turbine but can be utilized for a boiler, thereby effectively utilizing the fuel.

Further, another object of the present invention is to provide a method by which the cost of a facility is low and exert little bad influence on the environment.

Moreover, still another object of the present invention is to provide a method and a facility, which is placed in juxtaposition with a fuel source such as a petroleum refining facility, for generating electric power by effectively utilizing a fuel at low cost.

The inventors of the present invention assiduously studied the power generation using various kinds of fuels. As a result, the inventors have found the following facts. Namely, first, the properties, quality, yield and heat-quantity of the distillate have been found to be suitable for a fuel to be used in a gas turbine by separating an inexpensive and low-available boiler-oriented fuel such as coal, crude oil and heavy oil into distillate and residue by appropriately performing a partial processing such as stripping, distillation, thermal decomposition, carbonization, microwave irradiation, partial water-gas gasification or partial combustion gasification. Similarly, the properties, quality, yield and heat-quantity of the residue have been found to be suitable for a fuel to be used in a boiler. Further, the amounts of the distillate and residue have been found to be suitable for a combined cycle power generation which is a combination of the gas turbine power generation and the steam turbine power generation. Moreover, power generation was achieved with high efficiency at low cost by means of low-expense equipment by generating electric power through a gas turbine by adopting the distillate singly or the combination of the distillate and a gas-turbine-oriented fuel as a gas-turbine fuel, and furthermore, by generating electric power through a steam turbine by adopting the residue singly or the combination of the residue and a boiler-oriented fuel as a boiler fuel and generating steam. Additionally, the power generation was attained with higher efficiency as a result of re-burning in a boiler by supplying the gas-turbine exhaust gas to the boiler. Further, the power generation was conducted efficiently by utilizing the fuel derived from a petroleum 3refining facility effectively as a result of using a surplus gas-turbine-oriented fuel obtained from this facility, using a boiler-oriented fuel produced in the same facility, and burning them in a boiler. Thus, the inventors accomplished the present invention.

Namely, in a first embodiment of the present invention, there is provided a power generation method that comprises the steps of: separating a boiler-oriented fuel (F) into distillate (D) and residue (R) by performing partial processing of the boiler-oriented fuel (F); adopting a fuel for a gas turbine (G) obtained from the distillate (D) singly, or a mixture of the fuel for a gas turbine (G) and a gas-turbine-oriented fuel (G') as a gas turbine fuel (A); adopting the residue (R) singly, or a mixture of the residue (R) and at least one chosen from a group consisting of a boiler-oriented fuel (F) and another kind of a boiler-oriented fuel (F') as a boiler fuel (B); generating electric power by burning the gas turbine fuel (A) in a gas turbine and by driving the gas turbine; and generating electric power by burning the boiler fuel (B) in a boiler and by driving a steam turbine by use of produced steam.

Thereby, a fuel suitable for use in a gas turbine and a steam turbine are obtained efficiently from inexpensive or low-available boiler-oriented fuel, namely, a fuel which can be utilized in the boiler but cannot be utilized in the gas turbine, such as coal and heavy oil. Further, various kinds of inexpensive or low-available boiler-oriented fuels can be used by being combined with diverse kinds of gas-turbine-oriented fuels. Thus, the sphere of utilization of the fuels can be expanded. Moreover, from the environmental pollution view point as well as the economical view point, the power generation is efficiently achieved by selecting optimal fuels. Electric power is generated by using such fuels. Consequently, as compared with the case of using a boiler-oriented fuel (F) as a boiler fuel (B), the efficiency of power generation is drastically improved.

Further, in an embodiment (hereunder referred to as a second embodiment) of the first embodiment of the present invention, the boiler fuel (B) is burned again by supplying a gas-turbine exhaust gas to the boiler.

Thus, the residue can be burned by utilizing the quantity of heat remaining in the gas-turbine exhaust gas and further utilizing residual oxygen whose amount is 10 to 15%. Consequently, the efficiency of power generation can be increased to about 46%.

Moreover, in another embodiment (hereunder referred to as a third embodiment) of the first power generation method of the present invention, power generating vapor is generated by supplying a gas-turbine exhaust gas to a heat recovery boiler, and the boiler fuel (B) is burned again by supplying the exhaust gas discharged from the heat recovery boiler to the boiler.

Thus, the power generating vapor can be generated by utilizing the remaining heat of the gas-turbine exhaust gas. Further, the residue can be burned by utilizing the quantity of heat remaining in the exhaust gas of the heat recovery boiler and further utilizing residual oxygen whose amount is 10 to 15%. Consequently, high efficiency of power generation is achieved.

Furthermore, in another embodiment (hereunder sometimes referred to as a fourth embodiment of the present invention) of one of the first to third embodiments of the present invention, the partial processing is partial separation processing which comprises at least one selected from a group consisting of topping, flushing, distillation, extraction, decantation.

Thus, as is understood from this, various kinds of practical partial separation processing methods for the boiler-oriented fuel can be used actually.

Additionally, in another embodiment (hereunder sometimes referred to as a fifth embodiment of the present invention) of one of the first to third embodiments of the present invention, the partial processing is partial decomposition processing which comprises at least one selected from a group consisting of thermal decomposition, carbonization, water-gas gasification, combustion gasification, hydrogenation, liquefaction and microwave irradiation.

Thus, it is understood that diverse kinds of practical partial separation processing methods for the boiler-oriented fuel can be used actually.

Further, in another embodiment (hereunder sometimes referred to as a sixth embodiment of the present invention) of the fourth or fifth embodiment of the present invention, the partial processing is performed at a temperature in a range of 250° C. to 500° C.

Thereby, the distillate can be obtained thermally advantageously. Moreover, the impurities such as Na, K, Ca and V contained in the distillate can be reduced considerably.

Moreover, in another embodiment (hereunder sometimes referred to as a seventh embodiment of the present invention) of one of the first to sixth embodiments of the present invention, the ratio of heat-quantity of the distillate (D) to the residue (R) is 20–60% to 80–40%.

Thus, the distillate having a quantity of heat, which is suitable for the exhaust-gas re-burning combined cycle power generation, is obtained economically from the boiler-oriented fuel. Further, the power generation can be attained with high efficiency by re-burning by way of an exhaust gas wherein the distillate is used as a fuel for a gas turbine and the residue is used in the boiler.

Furthermore, in another embodiment (hereunder sometimes referred to as an eighth embodiment of the present invention) of one of the first to seventh embodiments of the present invention, at least a gas component (V) and an oil component (O) are separated from the distillate (D), and further, the gas component (V), the oil component (O) or a combination of the gas component (V) and the oil component (O) is used as a fuel for a gas turbine (G).

Thus, moisture component and impurities dissolving thereinto can be prevented from being mixed into the gasturbine fuel.

Additionally, in an embodiment (hereunder sometimes referred to as a ninth embodiment of the present invention) of the eighth embodiment of the present invention, the oil component (O) is separated into refined distillate (C) and distilled residue (R') by distilling the oil component (O). Further, the refined distillate (C) is used as a fuel for a gas turbine (G), and the distilled residue (R') is used in a boiler. Thus, a gas turbine fuel, which hardly corrodes turbine blades of the gas turbine even when operated for a long time period, can be obtained from the distillate, which is obtained from any kind of boiler-oriented fuel. In the case that the distillate contains small quantity of impurities initially, the weight percent of the impurities can be further reduced.

Further, in an embodiment (hereunder sometimes referred to as a tenth embodiment of the present invention) of the eighth or ninth embodiment of the present invention, the gas turbine fuel (A) contains a sodium component and a potassium component, the total weight ratio of these components being not more than 0.5 ppm by weight, and further contains a vanadium component, the weight ratio of vanadium being not more than 0.5 ppm by weight.

Thus, because a sum of Na-content and K-content is not more than 0.5 ppm by weight, and further V-content is not more than 0.5 ppm, even if the gas turbine is continuously used for a long time period, the turbine blades and so forth are hardly corroded.

Furthermore, in an embodiment (namely, an eleventh embodiment of the present invention) of one of the eighth to ninth embodiments of the present invention, the gas component (V) is burned by a gas turbine for burning gas, and on the other hand, the oil component (O) or the refined distillate (C) is burned by a gas turbine for burning oil.

Thus, the gas-turbine power generation can be performed by burning the gas component and the oil component efficiently and stably.

Moreover, in a twelfth embodiment of the present invention, there is provided a power generation apparatus which comprises: partial processing means for separating a boiler-oriented fuel (F) into distillate (D) and residue (R) by performing partial processing of the boiler-oriented fuel (F); a gas turbine to be driven by burning a gas turbine fuel (A) as described in the first embodiment of the present invention; a power generator for the gas turbine, which generates electric power by using the driven gas turbine; a boiler which generates steam by burning the boiler fuel (B) as described in the first embodiment of the present invention; a steam turbine which is driven by generated steam; and a power generator for the steam turbine which generates electric power by the driven steam turbine.

Thus, a fuel suitable for use in the gas turbine and the steam turbine are obtained efficiently from inexpensive or low-available boiler-oriented fuel such as coal and heavy oil, and can be used for generating electric power. Further, various kinds of inexpensive or low-available boiler-oriented fuels or diverse kinds of gas-turbine-oriented fuels can be used. Consequently, the sphere of utilization of the fuels can be expanded. Moreover, from the environmental or the economical view point, the power generation is efficiently achieved by selecting optimal fuels.

Further, an embodiment (namely, a thirteenth embodiment of the present invention) of the twelfth embodiment of the present invention is further provided with an exhaust gas supplying means for supplying a gas-turbine exhaust gas to the boiler.

Thus, the residue can be burned by utilizing the quantity of heat remaining in a gas-turbine exhaust gas and further utilizing residual oxygen whose amount is 10 to 15%. Consequently, the power generation can be performed with the efficiency of power generation of about 46%.

Furthermore, an embodiment (namely, a fourteenth embodiment of the present invention) of the twelfth embodiment of the present invention are further provided with: a heat recovery boiler for supplying a gas-turbine exhaust gas to generate vapor for generating power; and an exhaust gas supplying means for supplying a heat-recovery-boiler exhaust gas to the boiler.

Thus, the vapor for generating power can be generated by utilizing the remaining heat of the gas-turbine exhaust gas. In addition, the residue can be burned by utilizing the quantity of heat remaining in exhaust gas discharged from the heat recovery boiler and further utilizing residual oxygen whose amount is 10 to 15%. Consequently, high efficiency of power generation is achieved.

Further, in accordance with the present invention, there is provided another power generation method (hereunder referred to as a fifteenth embodiment of the present invention) that comprises the steps of: placing the power generation apparatus of the present invention in juxtaposition with a facility in which a gas-turbine-oriented fuel and a boiler-oriented fuel are available at one place; supplying the gas-turbine-oriented fuel to a gas turbine and then burning the gas-turbine-oriented fuel therein; generating electric power by driving the gas turbine by using a combustion gas for driving which is generated by burning the gas-turbine-oriented fuel; supplying the boiler-oriented fuel to a boiler and burning the boiler-oriented fuel therein by using an exhaust gas discharged from the gas turbine; and generating electric power by driving a steam turbine by using generated steam.

Thus, the power generation can be achieved with good efficiency by effectively utilizing off-gas and tar, without newly establishing a partial processing facility.

Further, in an embodiment (namely, a sixteenth embodiment of the present invention) of the fifteenth embodiment of the present invention, the facility is selected from a group consisting of an oil purification plant, a steelmaking plant, a chemical plant and a complex which comprises at least one selected from the oil purification plant, the steelmaking plant and the chemical plant.

Thus, large quantities of the gas-turbine-oriented fuel and the boiler-oriented fuel can be efficiently utilized in power generation without being discharged and transported to the environment in comparison with the case of burning such fuels in the boiler simply.

In accordance with the present invention, there are further provided the following methods and apparatuses.

Namely, first, there is provided a power generation method that comprises the steps of: separating a boiler-oriented fuel into distillate and residue by performing partial processing of the boiler-oriented fuel; adopting the distillate as a gas turbine fuel; adopting the residue as a boiler fuel; supplying the gas turbine fuel to a gas turbine wherein the gas turbine fuel is burned; generating electric power by driving the gas turbine by using a combustion gas generated by burning the gas turbine fuel; supplying the boiler fuel and a boiler-oriented fuel to a boiler wherein the boiler fuel and the boiler-oriented fuel are burned; and generating electric power by driving a steam turbine by the generated steam.

Further, there is provided another power generation method that comprises the steps of: separating a boiler-oriented fuel into distillate and residue by performing partial processing of the boiler-oriented fuel; adopting the distillate as a gas turbine fuel; adopting the residue as a boiler fuel; supplying a gas-turbine-oriented fuel and the gas turbine fuel to a gas turbine wherein these fuels are burned; generating electric power by driving the gas turbine which is driven by combustion gas for driving generated by burning the fuels; and supplying the boiler fuel and a boiler-oriented fuel to a boiler wherein these fuels are burned; and generating electric power by driving a steam turbine by the use of produced steam.

Moreover, in the case of an embodiment of the aforementioned power generation methods of the present invention, the boiler-oriented fuel (F or F') is a fuel selected from a group of coal, poorly graded coal whose volatile matter is not less than 20% by weight, char, coke, fuel oil, residual oil, pitch, bitumen, petroleum coke, carbon, tar sand, sand oil obtained from tar sand, oil shale, shale oil obtained from oil shale, Orinoco tar, orimulsion which is aqueous suspension of Orinoco tar, asphalt, asphalt emulsion (namely, emulsified asphalt), petroleum-oil mixture (COM), coal-water mixture (CWM), coal-methanol slurry, mass resulted from naturally occurring substances, such as wood, grass, fats and oils or press cake, waste plastic, combustible refuse, and a mixture of these substances.

Furthermore, in the case of an embodiment of the aforementioned power generation method of the present invention, the gas-turbine-oriented fuel (G') is a fuel selected from a group of hydrogen, methane, ethane, ethylene, propane, propene, butane and the like, butene and the like, hexane and the like, heptane and the like, methanol, ethanol, propanol, butanol, dimethyl ether, diethyl ether, LNG, LPG, naphtha, gasoline, kerosene, light oil (gas oil), heavy-oil decomposition component whose boiling point at the atmospheric pressure is not higher than 500° C., natural gas, coal bed methane, landfill gas, blast furnace gas, coke oven gas, converter gas, by-product gas which is derived from a chemical plant and contains hydrogen, coal or heavy-oil gasification gas (namely, gas obtained by the gasification of coal or heavy oil), coal carbonization gas, coal water-gas gasification gas (namely, water gas obtained by the gasification of coal), coal partial-combustion gas, heavy-oil thermal separation light-oil or gas (namely, light oil or gas obtained by the thermal separation of heavy oil), heavy-oil thermal decomposition light-oil or gas, heavy-oil oxidation decomposition light-oil or gas, super-heavy oil thermal decomposition light-oil or gas, super-heavy oil oxidation decomposition light-oil or gas, fermentation gas, and a mixture of these substances.

In the case of an embodiment of the aforementioned power generation method of the present invention, the boiler-oriented fuel to be treated partially is coal, heavy oil or a mixture of coal and heavy oil.

In the case of an embodiment of the aforesaid power generation method of the present invention, the gas-turbine exhaust gas is supplied to the boiler. Further, the boiler fuel and/or the boiler-oriented fuel are burned by supplying air thereto.

In the case of an embodiment of the aforementioned power generation method of the present invention, the combustion in the boiler is performed by using only the gas-turbine exhaust gas.

In the case of an embodiment of the aforesaid power generation method of the present invention, the microwave irradiation is conducted by supplying hydrocarbon to the boiler-oriented fuel (F).

In the case of an embodiment of the aforementioned power generation method of the present invention, the water-gas gasification is performed by supplying gas and water vapor for heating directly to the boiler-oriented fuel (F).

In the case of an embodiment of the aforesaid power generation method of the present invention, the combustion gasification is performed by supplying air or oxygen, and water to the boiler-oriented fuel (F).

Moreover, there is provided another power generation apparatus which comprises a partial-processing means, a gas turbine, a generator for the gas turbine, a boiler, a steam turbine, and a generator for the steam turbine. This power generation apparatus is adapted to perform one of the following power generation operations:

(1) a power generation operation that comprises the steps of: separating a boile-oriented fuel into distillate and residue by performing partial processing of the boiler-oriented fuel; adopting the distillate as a gas turbine fuel; adopting the residue as a boiler fuel; supplying the gas turbine fuel to a gas turbine wherein the gas turbine fuel is burned; generating electric power by driving the gas turbine by using combustion gas for driving generated by burning the gas turbine fuel; supplying the boiler fuel and the boiler-oriented fuel to a boiler wherein the boiler fuel and the boiler-oriented fuel are burned; and generating electric power by burning the fuels in a boiler and by driving a steam turbine by the use of produced steam;

(2) a power generation operation that comprises the steps of: separating a boiler-oriented fuel into distillate and residue by performing partial processing of the boiler-oriented fuel; adopting the distillate as a gas turbine fuel; adopting the residue as a boiler fuel; supplying a gas-turbine-oriented fuel and the gas turbine fuel to a gas turbine wherein the fuels are burned; generating electric power by driving the gas turbine by using fuel gas for driving generated by burning the fuels; supplying the boiler fuel and a boiler-oriented fuel to a boiler wherein the fuels are burned; and generating electric power by driving a steam turbine by the use of produced steam;

(3) a power generation operation that comprises the steps of: separating a boiler-oriented fuel into distillate and residue by performing partial processing of the boiler-oriented fuel; adopting the distillate as a gas turbine fuel; adopting the residue as a boiler fuel; supplying the gas turbine fuel to a gas turbine wherein the gas turbine fuel is burned; generating electric power by driving the gas turbine by using combustion gas for driving generated by burning the gas turbine fuel; supplying the boiler fuel and a boiler-oriented fuel which is a different kind of fuel from said boiler-oriented fuel to a boiler where the fuels are burned; and generating electric power by driving a steam turbine by the use of produced steam; or (4) a power generation operation that comprises the steps of: separating a boiler-oriented fuel into distillate and residue by performing partial processing of the boiler-oriented fuel; adopting the distillate as a gas turbine fuel; adopting the residue as a boiler fuel; supplying a gas-turbine-oriented fuel and the gas turbine fuel to a gas turbine wherein these fuels are burned; generating electric power by driving the gas turbine by using combustion gas for driving generated by burning the fuels; supplying a different kind of boiler-oriented fuel and the boiler fuel to a boiler wherein the boiler fuel and the boiler-oriented fuel are burned; and generating electric power by driving a steam turbine by the use of produced steam.

In the case of an embodiment of the herein-above described power generation apparatus of the present invention, the gas-turbine exhaust gas is supplied to the boiler, and the residue is burned by supplying air thereto.

In the case of an embodiment of the aforementioned power generation method of the present invention, the combustion in the boiler is performed by using only the gas-turbine exhaust gas.

In accordance with the present invention, there are provided the following fuels and methods concerning the coal carbonization.

Namely, first, there is provided a fuel for power generation, which is obtained by separating coal, which especially contains volatile matter that is not less than 20% by weight, into distillate and residue by performing the partial decomposition of the coal, further employing the distillate as a gas-turbine fuel, and employing the residue, which is carbonized residue, char or coke, as a boiler fuel for the steam turbine.

Moreover, there is provided a method of producing a fuel for power generation, in which the partial processing is carbonization, especially, thermal decomposition carbonization to be performed at a temperature that is not higher than 500° C., and in which a gas component and/or a oil component are separated from the distillate and are used as the gas turbine fuel.

Furthermore, there is provided a fuel for gas-turbine power generation, which is obtained by adopting the obtained gas component and/or oil component as the fuel, and which contains salt component that is not more than 0.5 ppm by weight and V (vanadium)-content that is not more than 0.5 ppm.

Further, in accordance with the present invention, there is provided a method of producing a fuel for power generation, in which coal is separated into distillate and residue by performing the partial decomposition of the coal, and in which this distillate is employed as a gas-turbine fuel, and the residue is adopted as a boiler fuel for a steam turbine.

Moreover, in accordance with the present invention, there is provided a method of producing a fuel for power generation, in which coal is separated into distillate and residue by heating the coal for a time period of 0.1 to 10 seconds at a heating rate of 10 to 100,000° C. per second to perform rapid partial thermal decomposition, and in which this distillate is employed as a gas-turbine fuel, and the residue is adopted as a boiler fuel for a steam turbine.

Furthermore, in accordance with the present invention, there is provided a method wherein combined cycle power generation is conducted by using a gas turbine fuel, which is derived from the distillate that is obtained by the aforesaid rapid partial thermal decomposition, as a fuel for the gas turbine and the residue is used for a boiler fuel.

In accordance with the present invention, there are provided the following fuels and methods concerning the microwave irradiation of coal.

The present invention relates to a fuel for power generation, which is obtained by separating coal, which especially contains volatile matter that is not less than 20% by weight, into distillate and residue by performing the partial decomposition of the coal by the microwave irradiation, further employing the distillate as a gas-turbine fuel, and using the residue as a boiler fuel in a boiler steam turbine system.

Furthermore, in the case of this fuel, the partial decomposition treatment is microwave irradiation which is performed especially, at a temperature that is not lower than 50° C., preferably, 100 to 1000° C., and in the presence of hydrocarbon, preferably, in the presence of aliphatic compound, alicyclic compound or aromatic hydrocarbon, each molecule of which contains 1 to 20 carbon atoms (namely, carbon number is 1 to 20), or in the presence of hydrocarbon gas, a gas turbine fuel is obtained by separating gas component and/or oil component from the distillate, and using the gas component and/or the oil component as the gas turbine fuel.

Moreover, there is provided a method of producing a fuel for power generation wherein coal is separated into distillate and residue by performing the partial decomposition of the coal by microwave irradiation, further employing the distillate as a gas-turbine fuel, and using the residue as a boiler fuel in a boiler steam turbine system.

In accordance with the present invention, there are provided the following method concerning the partial water-gas gasification of coal.

Namely, there is provided a method of producing a fuel for power generation wherein coal is separated into distillate and residue by performing the partial water-gas gasification of the coal, and further employing the distillate as a gas-turbine fuel, and employing the residue as a boiler fuel.

Further, in the case of an embodiment of this method, the partial water-gas gasification is performed by adding water vapor for heating directly the gas.

Additionally, in the case of an embodiment of this method, the partial water-gas gasification is performed by further adding hydrogen, hydrocarbon, carbon dioxide or a mixture thereof.

Moreover, in the case of an embodiment of the method of producing a fuel for power generation, gas component or gas and oil components is separated from the distillate, and the gas component or the gas and oil components is adopted as a gas turbine fuel. Moreover, in the method of producing a fuel for power generation, the ratio of heat-quantity of the distillate to the residue is 30–45% to 70–55%.

In accordance with the present invention, there are provided the following methods concerning the partial combustion gasification of coal.

Namely, there is provided a method of producing a fuel for power generation wherein coal is separated into distillate and residue by performing the partial combustion gasification of the coal, and further employing the distillate as a gas-turbine fuel, and employing the residue as a boiler fuel.

Further, in an embodiment of this method, the partial combustion gasification is performed by adding air or oxygen, and water vapor to the coal. Moreover, in the case of another embodiment of this method, the partial combustion gasification is performed by further adding hydrogen, hydrocarbon, carbon dioxide or a mixture thereof.

Furthermore, in an embodiment of the method of producing a fuel for power generation, gas component or a sum of gas and oil components is separated from the distillate, and this gas component or this sum of gas and oil components is adopted as a gas turbine fuel, the ratio of heat-quantity of the distillate to the residue is 30–55% to 70–45%.

In accordance with the present invention, there are provided the following methods concerning the partial thermal decomposition of heavy oil.

Namely, there is provided a method of producing a fuel for power generation, wherein fuel oil is separated into distillate and residue by performing the thermal decomposition of the heavy oil, and further employing the distillate as a gas-turbine fuel.

Moreover, in an embodiment of the method of the present invention, heavy oil is separated into distillate and residue by performing the thermal decomposition of the heavy oil, and the residue is used as a boiler fuel.

Moreover, in an embodiment of the method of the present invention, heavy oil is separated into distillate and residue by performing the thermal decomposition of the heavy oil, the distillate is used as a gas turbine fuel, and the residue is used as a boiler fuel.

Additionally, in the case of another embodiment of the method of the present invention, the heavy oil is fuel oil A, fuel oil B, fuel oil C, atmospheric pressure residue oil, residue oil under reduced pressure, shale oil, Orinoco super-heavy oil, orimulsion, asphalt emulsion, bitumen or a mixture of these substances. Further, the thermal decomposition is performed by a cracking method, a visbreaking method, a delayed coking method, a fluid coking method, a flexicoking method, a contact coking method or EUREKA method (which was developed by Kureha Chemical Industry Co., Ltd.). Furthermore, the thermal decomposition is performed by adding water vapor, air, hydrogen, hydrocarbon, carbon dioxide or a mixture thereof. Moreover, the ratio of heat-quantity of the distillate to the residue is 20–60% to 80–40%.

In accordance with the present invention, there are provided the following methods concerning the partial combustion gasification of a mixture of coal and heavy oil.

Namely, there is provided a method of producing a fuel for power generation wherein a mixture of coal and heavy oil is separated into distillate and residue by performing the partial combustion gasification of this mixture, the distillate is employed as a gas-turbine fuel, and the residue is employed as a boiler fuel.

Further, in an embodiment of this method, the partial combustion gasification is performed by adding air or oxygen, and water vapor to the mixture of coal and heavy oil.

Moreover, in another embodiment of this method, the partial combustion gasification is performed by further adding hydrogen, hydrocarbon, carbon dioxide or a mixture thereof.

Additionally, in another embodiment of this method, the weight ratio of the coal to the heavy oil ranges from 5:95 to 80:20 in the partial combustion gasification.

Furthermore, in another embodiment of this method, gas component or a sum of gas and oil components is separated from the distillate, and this gas component or this sum of gas and oil components is adopted as a gas turbine fuel, the ratio of heat-quantity of the distillate to the residue is 20–60% to 80–40%.

Further, in accordance with the present invention, the aforesaid power generation apparatus may be further provided with a separation device for separating at least a gas component (V) and an oil component (O) from the distillate (D).

Moreover, an embodiment of such a power generation apparatus of the present invention may be further provided with a separation device for separating the oil component (O) into refined distillate (C) and residue (R').

As above described, a gas turbine fuel and a boiler fuel, which meet all of necessary standards, are obtained at a fuel ratio, which is suitable for power generation, especially, power generation performing the exhaust-gas reburning, by employing coal, heavy oil and the like or a mixture of the coal and the heavy oil and the like as materials of the boiler-oriented fuel, and performing the partial processing thereof. In comparison with the thermal efficiency (about 38 to 40%) in the case of performing power generation by burning the full amount of the boiler-oriented fuel in a boiler and by generating electric power, the thermal efficiency, in which the power generation can be performed in accordance with the present invention, is 45 to 47%. This value of the thermal efficiency is comparable with the value of the thermal efficiency in the case of generating electric power by gasifying the full amount of the heavy oil. As compared with the gasification of the full amount of heavy oil, the cost of facilities used in a fuel decomposition process and a fuel-gas refining process according to the present invention is low. Even when a gas turbine is used, no corrosion occurs therein. Moreover, the amount of an exhaust gas is small because of the abundance and inexpensiveness of raw materials, thriftiness, the utilization of the existing facility and the high thermal efficiency. Consequently, the method and apparatus of the present invention is very advantageous to prevention of the deterioration of the global environment.

Furthermore, in accordance with the present invention, one of the various boiler-oriented fuels, which are utilized only in a boiler and are inexpensive and have low utilization factors and are pressed to be treated, and the gas-turbine-oriented fuels, which are easily obtained and are excessive and hardly produce toxicant that causes pollution, can be selected and used freely. Thus, further efficient power generation is achieved. Additionally, increase in ability of power generation can be attained by small-scale investment, because an additional partial-processing facility is unnecessary.

DETAILED DESCRIPTION OF THE PREFERRED EMBODIMENTS

Figure 1:
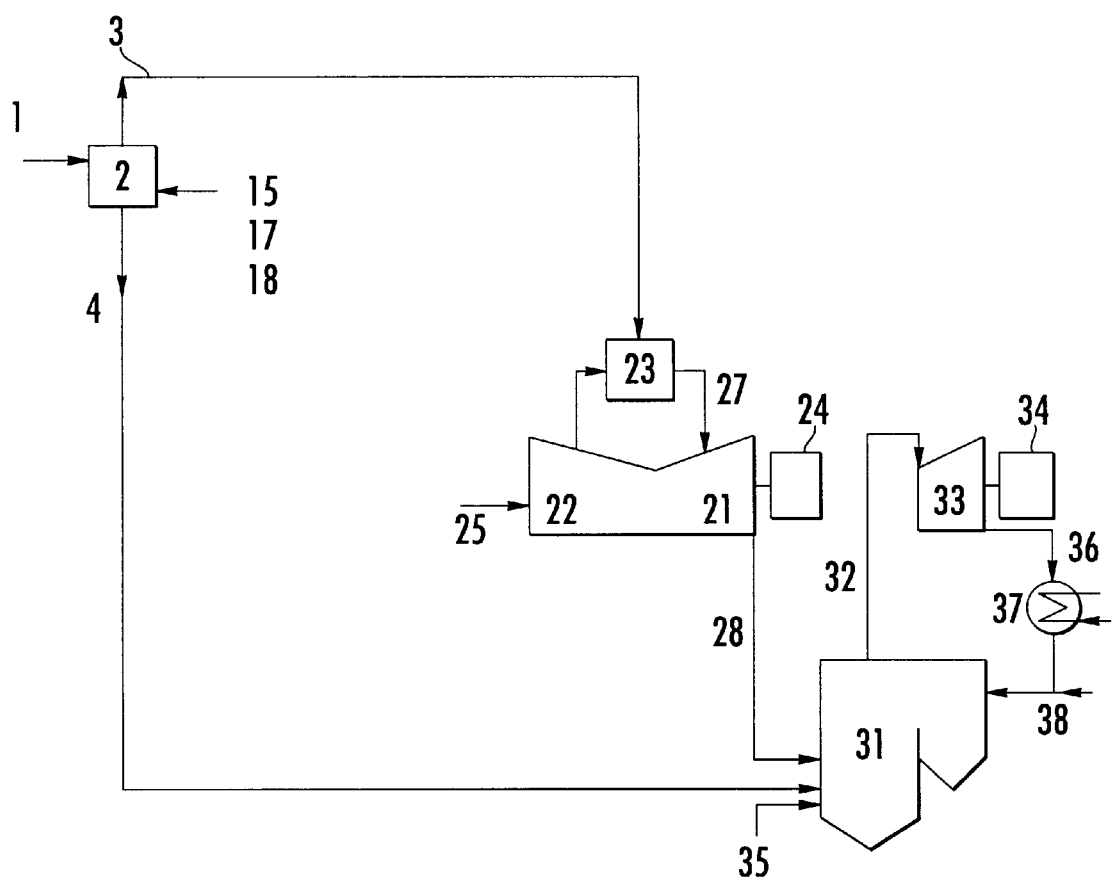
FIG. 1 is a process flow chart for illustrating the present invention.

Incidentally, in the method and apparatus of the present invention, the term "gas-turbine-oriented fuel (G')" represents a fuel that can be used in a gas turbine, and is a combustible gas or a flammable light-gravity liquid whose boiling point at the atmospheric pressure is 500° C. (namely, about 900° F.). Practical examples of such a "gas-turbine-oriented fuel" are methane, ethane, ethylene, propane, propene, butane and the like, butene and the like, hexane and the like, heptane and the like, methanol, ethanol, propanol, butanol, dimethyl ether, diethyl ether, LNG, LPG, naphtha, gasoline, kerosene, light oil (gas oil), heavy-oil decomposition component whose boiling point at the atmospheric pressure is not higher than 500° C., natural gas, coal bed methane, landfill gas, blast furnace gas, coke oven gas, converter gas, by-product gas which is derived from a chemical plant and contains hydrogen and/or carbon monoxide gasification gas such as coal or fuel oil, coal carbonization gas, coal water-gas gasification gas, coal partial-combustion gas, heavy-oil thermal decomposition light-oil or gas, heavy-oil oxidation decomposition light-oil or gas, super-heavy oil thermal decomposition light-oil or gas, super-heavy oil oxidation decomposition light-oil or gas, fermentation gas, and a mixture of these substances.

Further, examples of by-product gases, which contain hydrogen and/or carbon monoxide and are derived from various kinds of plants, are hydrogen obtained by the oxidation of hydrocarbon, or gases derived from a chemical plant, such as a mixed gas obtained by mixing hydrogen and carbon monoxide.

Further, in the method and apparatus of the present invention, the term "boiler-oriented fuel (F)" represents a fuel that cannot be used in a gas turbine but can be used in a boiler, and that is combustible solid or combustible heavy liquid. Practical examples are coal, char, coke, fuel oil (namely, fuel A, fuel B, fuel C), residual oil (namely, atmospheric pressure residue oil, residue oil under reduced pressure), pitch, bitumen, petroleum coke, carbon, tar sand, sand oil obtained from tar sand, oil shale, shale oil obtained from oil shale, Orinoco tar, orimulsion which is aqueous suspension of Orinoco tar, asphalt, asphalt emulsion, coal-oil mixture (COM), coal-water mixture (CWM), coal-methanol slurry, mass derived from naturally occurring substances, such as wood, grass, fats and oils or press cake, waste plastic, combustible refuse, and mixtures of these substances.

In the method and apparatus of the present invention, a boiler-oriented fuel for partial processing (namely, a boiler-oriented fuel (F) for a boiler to be used for partial-processing) may be the same as or different from a boiler-oriented fuel (F') that does not undergo the partial processing and is directly supplied to a boiler. For instance, fuel oil may be used as the boiler-oriented fuel for partial processing, while coal may be used as the boiler fuel to be supplied directly to the boiler. Alternatively, a boiler-oriented fuel, on which the partial processing can be achieved, may be used, and a fuel which is difficult to be treated partially or a fuel which is disadvantageous from the economical point of view may be used as the boiler-oriented fuel to be fed directly to the boiler.

Incidentally, the terms "boiler" and "heat recovery boiler" are used in the method and apparatus of the present invention. When a term is referred to simply as "a boiler", this term "boiler" designates a boiler of a boiler steam-turbine system in which a boiler fuel is burned. For designating a boiler for recovering a waste heat, the term "heat recovery boiler" is used.

Further, examples of coal to be used as the boiler-oriented fuel (F) or (F') in the method and apparatus of the present invention are brown coal, brownish black coal, low rank bituminous coal, high rank bitumous coal, semibitumous coal, semianthracite and anthracite. Preferably, the volatile matter of coal is not less than 20% by weight and is not more than 60% by weight. More preferably, the volatile matter of coal is not less than 30% by weight and is able to provide volatile matter which is commensurate with the heat-quantity ratio used in the gas turbine and the boiler, or provide distillate consisting of the volatile matter and a product material of thermal-decomposition. Most preferable coal is low or medium grade coal, of which the volatile matter of coal is not less than 35% by weight, and can provide the distillate which is commensurate with the heat-quantity ratio used in the gas turbine and the boiler, the combination of which is used to burn an exhaust gas again.

Generally, the smaller the volatile matter of coal is, the lower the degree of coalification of the coal becomes. Thus, the utility becomes lower. Conversely, the coal reserve is high, and the price thereof is low. Therefore, it is very important to find a method of performing power generation by effectively using such coal. However, the methods of the present invention have been unknown publicly. Moreover, there have been not known such a power generation facility and experimental equipment.

Heavy oil to be used as the boiler-oriented fuel of the present invention includes crude oil, conventional heavy oil, super-heavy oil and bitumen (or sand oil).

Crude oil contains distillate and heavy component. In the apparatus of the present invention, crude oil can be used as a gas turbine fuel by performing the partial separation or the partial decomposition thereon. Moreover, crude oil can be supplied to the boiler as a boiler-oriented fuel. Moreover, either of low-sulfur crude oil and high-sulfur crude oil can be used. There is no necessity of adjusting the salt content to a low density such as 0.5 ppm before the partial processing. Additionally, no limitation is imposed on the sulfur content in the distillation.

Conventional heavy oil is, for example, fuel oil A, fuel oil B. fuel oil C, atmospheric pressure residual oil, residue oil under reduced pressure, shale oil.

Super-heavy oil has a specific gravity of 1.0 or more (60/60° F.) and a viscosity of 10,000 cP or less, that is, below oil reservoir temperature and is, for example, Orinoco super-heavy oil, orimulsion which is aqueous suspension of Orinoco super-heavy oil, asphalt, and asphalt emulsion which is aqueous emulsion of asphalt.

Bitumen has a specific gravity of 1.0 or more (60/60° F.) and a viscosity of 10,000 cP or less, that is, below oil reservoir temperature and is, for instance, athabasca bitumen and cold lake bitumen.

If necessary, before the partial processing, the contents of impurities such as salts including sodium, potassium, calcium and sulfur in such heavy oil may be lowered by (water) washing, alkali cleaning, acid cleaning, solvent cleaning, adsorption, replacement or bio-processing.

In the description of the method and apparatus of the present invention, the "partial processing" to be performed on a boiler-oriented fuel designates partial separation, partial decomposition or mixed processing thereof.

Partial separation is to separate distillate and residue to be described later from a boiler-oriented fuel by separation means, such as heating, pressure reduction, topping, flushing, distillation, extraction or decantation, without changing the composition of the fuel chemically.

Partial decomposition is to change the composition of a boiler-oriented fuel chemically, namely, to generate distillate and residue from a boiler-oriented fuel by thermal decomposition, carbonization, combustion gasification, water-gas gasification, hydrogenation, liquefaction, or microwave irradiation. Therefore, the partial decomposition is followed by the operation of separation of distillation and residue. Thereafter, if necessary, an operation of separating a gas component and an oil component from the distillation, or an operation of further separating a light oil component from the oil component is followed.

In the description of the method and apparatus of the present invention, the "distillate" (D) is a component separated from the boiler-oriented fuel by the partial separation or from the partially decomposed boiler-oriented fuel by the partial decomposition or the partial decomposition and the subsequent separation in a gaseous state and/or liquid state. Thus, the distillate includes both of a component condensed and liquefied after once vaporized, and a component separated after generated as liquid.

In the partial treatment of heavy oil, the term "distillate" designates a gaseous or liquid component which has a boiling point below 500° C. (about 900° F.) under the atmospheric pressure.

In the description of the method and apparatus of the present invention, the "residue" (R) is a substance left after the herein-above mentioned distillate is separated from the boiler-oriented fuel or the partially decomposed boiler-oriented fuel.

Hereinafter, the partial processing will be explained by describing the partial separation and the partial decomposition individually.

First, various kinds of partial separation operations will be described hereinbelow.

"Topping" to be used in the method and apparatus of present invention is a method of forming volatile matter by heating, for example, crude oil and thereafter, using steam, or inert gas such as nitrogen, carbon dioxide or methane-contained gas as a stripping gas, and then blowing the stripping gas into the heated crude oil.

"Distillation" to be used in the method and apparatus of the present invention includes a method of heating, for instance, crude oil and forming volatile matter under reduced or the atmospheric pressure or in a pressurized state, a method of simply forming volatile matter, a method of separating refined distillate by distillation after introducing reflux thereto, and a method of separating a specific component by adding an entrainer or an extracting agent to the crude oil.

In the case of the "extraction" to be used in the method and apparatus of the present invention, bio-mass which is rich in oil component is crushed, if necessary and is separated into an extract and an extraction residue by adding extracting agent. Then, the extracting agent is separated from the extract and the extract can be used as a gas turbine fuel. Further, a fibrous part, which is the extraction residue, can be used as a boiler fuel.

"Flushing" to be used in the method and apparatus of the present invention can be utilized in introducing, for instance, crude oil, which has been heated at high temperature and at high pressure, to a low-pressure vessel and then separating the crude oil into distillate and residue.

"Decantation" to be used in the method and apparatus of the present invention is a method of heating, for instance, oil shale and then separating only the oil component, whose viscosity is lowered, from the oil shale by "pouring off" the oil component without stirring up sediment.

Incidentally, these partial separation operations can be utilized in the cases where a distillate and a residue are separated subsequently to the partial decomposition, or where a refined distillate is obtained from the distillate.

Next, various kinds of the partial decomposition will be described hereunder.

Thermal decomposition to be utilized in the method and apparatus of the present invention is a method wherein, for example, heavy oil serving as a raw material can be separated into at least a distillate, which contains a component that can be used as a gas turbine fuel, and a residue that can be used as a boiler fuel.

Thus, in the case of using a thermal decomposition in the method and apparatus of the present invention, the thermal decomposition may be performed simply, or may be performed blowing water vapor or a hydrogen gas into the material. Alternatively, catalytic contact thermal decomposition may be conducted in the presence of a catalyst.

Examples of methods of performing thermal decomposition are a cracking method for obtaining a distillate, a visbreaking method for lowering mainly the viscosity of a residue, and a coking method for obtaining a distillate and a coke component. Further, if classified by severity, examples thereof are a method of performing high-temperature thermal decomposition at a temperature which is not lower than 1100° C., a high-temperature coking method of performing thermal decomposition at a temperature in a range of 980 to 1100° C., a medium temperature thermal decomposition method of performing thermal decomposition at a temperature in a range of 870 to 980° C. to obtain a low-heat-quantity gas, another medium temperature thermal decomposition method of performing thermal decomposition at a temperature in a range of 700 to 870° C. to obtain a high-heat-quantity gas, a low-temperature coking method of performing thermal decomposition at a temperature in a range of 480 to 700° C., a low-temperature thermal decomposition method of performing thermal decomposition at a temperature in a range of 480 to 540° C., a visbreaking method of performing thermal decomposition at a temperature in a range of 430 to 480° C., and EUREKA method of performing thermal decomposition at a temperature in a range of 350 to 480° C. simultaneously blowing water vapor into the material.

Moreover, the properties of the obtained residue vary with the kind of the heavy oil, namely, the raw material and a sort of the coking method. Depending upon the sort of the coking method, for example, asphaltic coke is obtained in the case of using the delayed coking method, whereas in the case of using the fluid coking method, the flexicoking method and the contact coking method, carboid coke is obtained.

In the case that thermal decomposition is performed on heavy oil by using the visbreaking method, the thermal decomposition is carried out gently to the extent that no coke is produced. Thus, the viscosity and pour point of a reside can be lowered. In the case of the visbreaking method, fuel oil is separated into a distillate and a residue by decomposing the fuel oil by means of a heating furnace, or by further causing the fuel oil to go through a soaker vessel, if necessary. Distillate and residue may be separated by quickly cooling the distillate to stop the decomposition.

In the case of the thermal decomposition of heavy oil by using the fluid coking method and the flexicoking method, fuel oil is supplied to a reactor and then undergoes the thermal decomposition on a heating coke flowing in the reactor, so that the fuel oil is separated into a distillate and a residue (namely, a coke). In the case of using the flexicoking method, a residue (namely, a coke) adhering to a heating coke is sent to a heater chamber in which the residue is heated by the coke and gas which is put back from a gasifier. Thereafter, the residue is recycled to the reactor. A part of the residue (namely, the coke), which has adhered onto the heating coke and has been sent to a heater chamber, is sent to the gasifier in which the residue is then gasified by air and steam. Thereafter, the resultant gas is returned to the heater chamber. A part of the coke placed in the heater chamber is taken out as a coke, while the remaining part thereof is recycled to the reactor.

In the case of using the fluid coking method, a residue (namely, a coke) adhering onto a heating coke is sent to a burner chamber in which the residue is heated by being supplied with air. Thereafter, the residue is recycled to the reactor. Part of the coke placed in the burner chamber is taken out therefrom as a coke, while the remaining part thereof is recycled to the reactor.

In the case that the thermal decomposition of the heavy oil is performed by using the delayed coking method, heavy oil is first heated and the heated oil is then supplied to the bottom portion of the distilling column, in which the heavy oil is separated into a distillate (namely, oil vapor) and a residue (namely, high boiling liquid). Subsequently, the residue is supplied to a heating furnace. In this heating furnace, heavy oil is heated in a short time period. Thereafter, the heavy oil is sent to a coke drum and is further separated into a distillate and a residue in the coke drum. This residue is gradually changed into a coke by being heated. This distillate is supplied to the aforementioned distilling column, in which the distillate and the heavy oil are separated into a distillate (namely, the oil vapor) and the residue (namely, the high boiling liquid).

As compared with the fluid coking method and the flexicoking method, the yields of a gas and a coke is high in the case of this method.

In the case that the thermal decomposition of heavy oil is performed by using EUREKA method, the fuel oil is preheated and is then supplied to the bottom portion of a distilling column in which the fuel oil is separated into a distillate and a residue (namely, high boiling liquid). The residue (namely, the high boiling liquid) is heated in a heating furnace. Thus, the residue is slightly decomposed and is then supplied to a reactor. Water vapor is supplied to the reactor from the lower portion thereof. Thus, the slightly decomposed residue is further decomposed thermally. In addition, the mixing of the residue and the forming of the distillate are promoted. After a lapse of a predetermined time period, a reactant is cooled, so that the reaction is stopped.

Distillate includes a gas, an oil component and condensed water. If necessary, sulfur compounds such as hydrogen sulfide may be removed from the gas component. Oil component is separated by rectification so that oil component having a high boiling point may be mixed with a raw material, namely, fuel oil and also may be circulated in the system. After the reaction is stopped, the residue becomes liquid pitch and is further extracted to the exterior of the system as petroleum pitch.

Plural reactors are prepared and are further used by being exchanged with one another every time period. Thus, the operation is performed by employing a semi-batch system.

Thermal decomposition will be explained hereinbelow by describing the case, in which the partial thermal decomposition of waste plastic is performed by dissolving the waste plastic into oil, as an example. Polyolefine, such as polyethylene and polypropylene, is dissolved in oil, such as light oil by being heated at a temperature in the range of 330 to 350° C. for a time period of 20 to 120 minutes, during lowering the molecular weight thereof. Polystyrene is decomposed and dissolved mainly by depolymerization by being heated at a temperature of 250° C. for a time period of 10 to 60 minutes. Then, the liquid, which is thus obtained by decomposition and dissolution of the waste plastic, is separated into a distillate and a residue by distillation. Further, the distillate may be used as a gas turbine fuel, and the residue may be used as a boiler fuel.

In the case of the catalytic decomposition, decomposition catalysts, such as activated clay, silica alumina, zeolite (especially, rare earth exchange zeolite and ultrastable Y zeolite), Co—Mo, Ni—Mo and Fe can be used depending upon kinds of fuel oil used as a raw material and sorts of entrained impurities.

Conditions for thermal decomposition of heavy oil vary with the kind of the heavy oil used as a raw material, the sorts of target products, the ratio of acquisition thereof, and the processing or treatment methods. The processing temperature of fuel oil ranges from 350 to 1300° C. and varies with the severity. Pressure ranges from the atmospheric pressure to 100 atm. Therefore, a distillate can be obtained by the application of the atmospheric pressure to a pressure of 100 atm. Reaction time is not more than 10 hours.

To promote thermal decomposition, hydrogen, carbon monoxide, carbon dioxide, hydrocarbon, a part of the generated gas component, an oil component or alcohol may be added to the raw material as a modifier.

These methods can be achieved by any of operations performed according to a batch process, a semi-batch process such as EUREKA process, and a continuous process such as the visbreaking process.

Carbonization to be used in the method and apparatus of the present invention is an operation of chemically converting coal into a gas component, which is not condensed, and a liquid component, which is condensed, and liquid and solid components, which are separated by the decantation, by baking coal in a condition in which oxygen is reduced, preferably in a condition where the coal is cut off from the air, and cooling a distillate by water and so forth.

Carbonizing method may be either a process of using a retort or a process of using what is called a coke oven. In view of the supply of coal to a carbonization apparatus and the discharge of the residue therefrom, the coal is broken into blocks with ordinary sizes or into fine particles and consequently, such blocks or fine particles of coal are supplied to the carbonization apparatus.

Heating of coal for carbonization may be performed by heating a carbonization furnace from the outside. However, preferably, a gas for heating at a predetermined temperature, for example, 400 to 1300° C., which is obtained by burning a fuel, is fed to the furnace which is then heated by this gas. Thus, the volatile matter is formed by being "accompanied" with the gas for heating.

Incidentally, there are two types of carbonization. Namely, one is a low-temperature carbonization, of which the final heating temperature is not higher than 800° C. The other is a high-temperature carbonization, of which the final heating temperature is not lower than 800° C. Further, this high-temperature carbonization is performed at a temperature in the vicinity of 1000° C. Although both of these two types of carbonization may be used, the low-temperature carbonization is more preferable. In the case of the low-temperature carbonization, large amounts of an oil component and char to be used as a fuel are obtained. In contrast, in the case of the high-temperature carbonization, a coke oven gas and a large quantity of coke, which is used for a blast furnace or for casting, is obtained. Further, the carbonization to be performed in the method and apparatus of the present invention may comprise only a thermal decomposition carbonization process to be performed at a temperature which is not higher than 500° C., without a sintering step. In this case, when the coal is of a certain kind, the residue is obtained in the form of fine particles or of a lump as a result of being soften and molten. It is determined according to the type of the boiler which of such forms of the residue is to be used.

In the description of the method and apparatus of the present invention, the term "carbonization" designates the aforementioned low-temperature carbonization, the high-temperature carbonization, the thermal decomposition carbonization or the combination of these types of the carbonization.

Regarding the heating time in the carbonization, the residence or dwell time may be equal to or longer than about 1 minute as established conventionally. Further, the residence time at a high temperature of 1,000° C. as in the case of the rapid thermal decomposition, may be equal to or less than about 1 minute. However, the low-temperature carbonization method, by which the residence time as conventionally established is long, is preferable.

In the case of the carbonization, the gas components depend on the kind of coal and the manufacturing conditions of the apparatus. To cite an example (hereunder, the gas content is expressed in % by volume, unless otherwise specified), the gas components contain 50% of hydrogen, 30% of methane, 8% of carbon monoxide, 3% of hydrocarbon such as ethylene and benzene as effective component, and further contain moisture component, nitrogen, carbon dioxide, and miner components such as nitric monoxide, hydrocyanic acid, pyridine, hydrogen sulfide, carbon disulfide, carbonyl sulfide and tar.

The amount or yield of the gas component generated by the carbonization is 100 to 200 $Nm^3/t$ coal in the case of the low-temperature carbonization or the thermal decomposition carbonization, and is 300 to 400 $Nm^3/t$ coal in the case of the high-temperature carbonization. Further, the heating value of the gases is 4700 to 5400 $kcal/Nm^3$ in the case of the gases produced by the low-temperature carbonization and the thermal decomposition carbonization, and is 6200 to 8000 $kcal/Nm^3$ in the case of the gases produced by the high-temperature carbonization.

The oil component is composed mainly of light oil, tar and alcohol, in the case of the carbonization, and may be used by undergoing the purification and separation through distillation or the like. The residue is a pitch in which inorganic substances such as salts and vanadium are condensed. Thus, a more desirable fuel for a gas turbine is obtained by the distillation and purification of the pitch. In this case, the residue may be mixed into a fuel for a boiler.

The amount of produced alcohol is 50 to 150 liter/t coal.

The amounts of light oil and tar is 90 to 180 liter/t coal in the case of the low-temperature carbonization or the thermal decomposition carbonization, and is 40 to 80 liter/t coal in the case of the high-temperature carbonization.

Rapid partial thermal decomposition to be used in the method and apparatus of the present invention will be described hereinafter. Namely, this rapid partial thermal decomposition is used in a method of producing a fuel for power generation, wherein the rapid thermal decomposition of coal is first performed by heating the coal at a heating rate of 10 to 100,000° C. per second for a time period of 0.1 to 10 seconds, and wherein the coal is separated into a distillate, whose main component is volatile matter, and a residue whose main components are char and coke, and further, the distillate is used as a fuel for a gas turbine, and the residue is used as a fuel for the boiler of a steam turbine.

Furthermore, in accordance with the present invention, a combined cycle power generation is performed by using a gas-turbine fuel, which is derived from the distillate that is obtained from the aforesaid rapid partial thermal decomposition, in the gas turbine and by using the residue as a boiler fuel.

Partial combustion gasification to be used in the method and apparatus of the present invention will be explained hereinbelow by describing the case of using coal as a raw material by way of example.

Namely, in the case of using the partial combustion gasification in the method and apparatus of the present invention, first, the coal to be used as a raw material is separated into a distillate, which contains a component that can be used as a gas turbine fuel, and a residue which can be used as a boiler fuel. Examples of methods of performing the partial combustion gasification are methods respectively using a fixed bed furnace, a fluid (or fluidized bed) furnace, a flow bed furnace, a melting layer or basin (or molten bed) furnace, a moving bed furnace, a fixed-bed-flowbed combination furnace, a fluid-bed-flow-bed combination furnace and a flow-bed-melting-layer combination furnace. The conditions for partial combustion gasification vary with these methods. Moreover, the ratio among the fuel contents of an obtained gas depends upon which of air and oxygen is used for oxidation. It is preferable for obtaining a fuel, which has a high heating value, to use oxygen. Additionally, a fuel having a further higher heating value is obtained by separating and removing carbon dioxide and the like from a gas, which is obtained by the partial combustion gasification, or by increasing the contents of hydrogen and methane contained in the obtained gas by a conversion reaction and a reforming reaction.

The ratio by weight among coal, oxygen (incidentally, in the case of using air, oxygen contained in the air) and water to be added to coal is dependent on the methods of performing the partial combustion gasification. Further, let the weight of the coal be 1, the ratio by weight of the added oxygen to the coal is not more than about 1.5:1, and the ratio by weight of the added water to the coal is not more than 3. Preferably, the ratio by weight of the oxygen to the coal is 0.1 to 1.2. Preferably, the ratio by weight of the water to the coal is 0.1 to 2.0. The processing temperature is the temperature of the furnace and ranges from about 600 to 1600° C. The pressure ranges from the atmospheric pressure to 100 atm. Therefore, a distillate can be obtained by applying a pressure, which is in the range between the atmospheric pressure and 100 atm or so.

As the ratio by weight of water vapor added to the coal becomes closer to 3, a carbon-monoxide-to-hydrogen shift reaction proceeds. Thus, the ratio by weight of hydrogen contained in a distillate increases. The smaller the ratios by weight of oxygen and water become, the more the gasification becomes similar to the dry distillation (or carbonization). Thus, the gas content decreases, while the liquid content increases.

In the case of performing the partial combustion-gas gasification, the oil component is naphtha and tar, into which products of the partial combustion gasification and the volatile matter of the coal are distilled as they are.

Partial water-gas gasification to be used in the method and apparatus of the present invention will be explained hereinbelow by describing the case of using coal as a raw material by way of example. Further, examples of methods of performing the partial water-gas gasification are methods respectively using a fixed bed furnace, a fluid furnace, a flow bed furnace, a melting layer or basin furnace, a moving bed furnace, a fixed-bed-flow-bed combination furnace, a fluid-bed-flow-bed combination furnace and a flow-bed-melting-layer combination furnace.

The conditions for partial water-gas gasification of coal vary with these methods. Further, let the weight of the coal be 1, the ratio by weight of the added water to the coal is not more than 3. Preferably, the ratio by weight of the water to the coal is 0.1 to 2.0. The processing temperature is the temperature of the furnace and ranges from about 300 to 1600° C. The pressure ranges from the atmospheric pressure to 100 atm. As the ratio by weight of water vapor to the coal becomes closer to 2, a carbon-monoxide-to-hydrogen shift reaction proceeds. Thus, the ratio by weight of hydrogen contained in a distillate increases. As the ratio by weight of water becomes closer to 0.1, the gasification becomes similar to the dry distillation. Thus, the gas content decreases.

Heating of coal for partial water-gas gasification may be performed by heating a partial water-gas gasification furnace from the outside while supplying steam to coal. However, preferably, water vapor is added to a gas for heating at a predetermined temperature, for example, 400 to 1800° C., which is obtained by burning a fuel, and the furnace is then heated by this gas. Thus, a gas and the volatile matter are distilled.

Moisture source depends on the kind of the aforesaid partial water-gas gasification furnace, and water, drain water, low-pressure steam or high-pressure steam is used.

Hydrogen, carbon monoxide, carbon dioxide, hydrocarbon, a part of the generated water-gas component, an oil component or alcohol may be added to the gas for heating in addition to the water vapor.

In the case of the partial water-gas gasification, the gas components depend on the kind of coal, the degree of the partial water-gas gasification, the processing conditions of the apparatus and the kind of coal. In the case of blowing water vapor and air into coal, the obtained gas contains nitrogen, carbon dioxide, carbon monoxide, methane and hydrogen as main components. The amount or yield of heat generated by the gas component, which is produced by the partial water-gas gasification, is 1000 to 1500 kcal/Nm$^3$. In the case of blowing water vapor and oxygen to coal, the obtained gas contains carbon monoxide, methane, hydrogen and carbon dioxide as main components. The amount or yield of heat generated by the gas component, which is produced by the partial water-gas gasification, is 2,500 to 4,500 kcal/Nm$^3$. The distillate usually contains hydrocarbon, nitrogenous substances such as ammonia, sulfide such as hydrogen sulfide, and tar in addition to the aforementioned gas component. To cite an example, in the case of the partial water-gas gasification in the condition that the invert ratio is 35% at 830° C. at a pressure of 70 atm, 24% of hydrogen, 7% of methane, 7% of carbon monoxide and 4% of hydrocarbon are contained as effective component, and moisture component, nitrogen, carbon dioxide, nitrogenous substances such as ammonia, sulfide such as hydrogen sulfide, and tar are further contained.

In the case of performing the partial water-gas gasification, the oil component comprising mainly naphtha and tar is obtained as a distillate of products of the partial combustion gasification and the volatile matter of the coal.

Partial hydrogeneation to be used in the method and apparatus of the present invention will be explained hereinbelow by describing the case of using a solid boiler-oriented fuel such as coal by way of example. Partial hydrogenation can be performed in the case of using no catalyst and also can be conducted in the presence of metallic catalyst. In the case of no catalyst, obtained oil is used as a recycle solvent, and thus the processing temperature and the pressure are nearly the same as those in the case of the thermal decomposition and the carbonization. However, because the hydrogenation is an exthothermic reaction, a necessary amount of heat to be supplied to the apparatus is very small.

Further, the partial hydrogenation can be performed at a temperature ranging from 400 to 500° C. and at a pressure of 20 to 200 atm by using oil obtained in the presence of a disposable catalyst, such as Co—Mo/alumina or Ni—Mo/alumina or iron system or zinc system catalyst, as a recycle solvent.

Distillate obtained in this manner is rich in low hydrocarbon gas, such as methane. Moreover, the heat quantity of this distillate is high.

Partial liquefaction to be used in the method and apparatus of the present invention will be explained hereinbelow by describing the case of using a solid boiler-oriented fuel such as coal by way of example. Obtained oil is used as a recycle solvent, and the solid boiler-oriented fuel is dispersed into the solvent without being changed, or alternatively, the solid boiler-oriented fuel is dispersed into the recycle solvent by being crushed into fine powder. Moreover, the liquefaction is performed by using no catalyst or using a catalyst similar to the partial hydrogenation catalyst and by the following methods such as IG method, EDS method, Dow method, a zinc chloride catalyst method, Bergbau-Forschung method, Saarbergwerke method, SRC method, SRC-II method, Mitsui-SRC method, C-SRC method, H-Coal method, a solvent extraction method, a supercritical gas extraction method, STC method, a solvolysis method, CS/R method, IGT-SRT method, and NEDOL method. Regarding the partial liquefaction conditions, the temperature is in the range of 300 to 500° C., and the pressure is in a range of 20 to 200 atm.

When performed at low pressure, large amounts of char and heavy oil are obtained. However, in the case of the method and apparatus of the present invention, such char and tar can be used in the boiler. Thus, complete liquefaction is not necessarily performed.

Microwave irradiation to be used in the method and apparatus of the present invention will be explained hereinbelow by describing the case of using a solid boiler-oriented fuel such as coal by way of example.

Microwave irradiation is an operation of, preferably, performing the partial decomposition of the fuel in the presence of hydrocarbon, and then cooling a distillate by water or the like to thereby convert the distillate into a gas component, which does not condense, a liquefied component, which is adapted to condense, and a liquid component and a solid component, which are separated therefrom by decantation.

Microwave irradiation method may be either of a method by which microwaves are irradiated from the outside of a reactor, or another method by which microwaves are irradiated in a reactor. Further, the microwave irradiation can be achieved by operations according to any of the batch system, the semi-batch system and the continuous method.

It is preferable that the microwave irradiation is performed in the presence of hydrocarbon.

Examples of hydrocarbon include saturated aliphatic compound, unsaturated aliphatic compound, saturated alicyclic compound, unsaturated alicyclic compound and aromatic hydrocarbon, each molecule of which contains 1 to 20 carbon atoms (namely, carbon number is 1 to 20). Especially, a hydrocarbon gas is very preferable. Examples of hydrocarbon gas include methane, ethane, ethylene, acetylene, propane, propylene, methylacetylene, butane, butene, butadiene, pentane, hexane, heptane, benzene, toluene, xylene and cyclohexane. Hydrocarbon may be generated either by heating liquid hydrocarbon or by being accompanied with an inert gas.

In the presence of hydrocarbon, the hydrocarbon is brought into a plasma state by microwave. This promotes a reaction thereof with coal. Consequently, a gas component, a liquid component and a residue can be generated efficiently from the boiler-oriented fuel such as coal.

Microwave irradiation can be performed even at ordinary (or room) temperature and even when heated. Heating may be simply performed on the reactor from the outside. However, preferably, a hydrocarbon gas having been heated to a predetermined temperature is fed to the furnace which is then heated by this gas. Thus, the volatile matter is formed by being accompanied with the heated gas. The heating temperature is not lower than 50° C., preferably 100 to 1000° C., and more preferably, not more than 600° C.

In the case of the microwave irradiation, the oil component includes mainly light gas oil, tar and alcohol component. When the decomposition in the presence of hydrocarbon such as hydrogen and methane is performed, the volume of hydrocarbon gas and light gas oil increase.

Partial combustion gasification to be used in the method and apparatus of the present invention will be explained hereinbelow by describing the case, in which the boiler-oriented fuel is a mixture of heavy oil and coal, by way of example. Even in the case that no catalyst is provided in the apparatus, the partial combustion gasification is performed. Moreover, in the presence of an alkaline metal compound catalyst such as a potassium-carbonate catalyst, Ni-catalyst, Ni-dolomite catalyst and Ni-magnesia catalyst, the partial combustion gasification can be performed.

In the case that the ratio of the coal is larger than that of the heavy oil, a method using a furnace such as a fixed bed furnace, a fluid furnace, a flow bed furnace, a melting layer furnace, a moving bed furnace, a fixed-bed-flow-bed combination furnace, a fluid-bed-flow-bed combination furnace or a flow-bed-melting-layer combination furnace are cited as the method of performing partial combustion gasification.

In contrast, in the case that the ratio of the heavy oil is larger than that of the coal, a method such as ERE flexicoking method, Ube heavy oil gasification method, Shell gasification method, Texaco partial oxidation method, or a coal heat medium method which is substituted for a coke heat medium method (KK method) is cited as the method of performing partial combustion gasification.

In the case of ERE flexicoking method, the mixture of the coal and the heavy oil (hereunder referred to simply as a raw material) is supplied to a reactor. Then, the heavy oil is thermally decomposed on the heating coal or coke fluidized in the reactor and is separated into a distillate and a residue (namely, the coal or coke). The residue adhering to the heating coal or coke is sent to a heater chamber in which the residue is heated by the coke and gas put back from a gasifier to 600 to 650° C. Thereafter, the residue is recycled to the reactor. A part of the residue, which has been sent to the heater chamber, is sent to the gasifier in which the part of the residue is then gasified by air and steam at a temperature of 925 to 975° C. Thereafter, the resultant gas is returned to the heater chamber. A part of the residue placed in the heater chamber is taken out as a boiler fuel, while the remaining part thereof is recycled to the reactor.

In the case of the fluid coking method that is used in pneumatic thermal decomposition of heavy oil instead of ERE flexing coking method, a residue adhering onto a heating coke is sent to a burner chamber in which the residue is heated by being supplied with air. Thereafter, the residue is recycled to the reactor. Part of the residue placed in the burner chamber is taken out therefrom as a boiler fuel, while the remaining part thereof is recycled to the reactor.

Decomposition furnace of the Commbo Flexicoker type can be used for heavy oil whose viscosity is high.

In the case of Ube heavy oil gasification process, the raw material is supplied to a fluid bed decomposition furnace, in which the raw material is decomposed at a temperature of 500 to 900° C. by using oxygen. Then, steam is supplied thereto together with oxygen to thereby lower the partial pressure of the heavy oil. Thus, the decomposition is promoted, and thus the steam serves to hold the furnace temperature. If decomposition occurs at a temperature of 500 to 600° C., the oil content increases. If decomposition occurs at a temperature of 800 to 900° C., the gas component increases. Residue is obtained by causing the char to disperse into glutinous oil residue, and can be used as a boiler fuel.

Fluid bed is made by only the coal, which is added to the furnace as a raw material. Further, a spherical refractory material may coexist.

In the case of Shell gasification method, a raw material is supplied to a gasification furnace after being preheated. Then, air or oxygen gas is blown into this furnace. Thus, the raw material is oxidized at a temperature of about 1500° C.

and at a pressure of the atmospheric pressure to 100 atm, especially, at a pressure which is not higher than 20 atm in the case of using air, or at a pressure which is not lower than 30 atm in the case of using an oxygen gas. Thus, the partial gasification is performed. Gas exhausted from the gasification furnace is washed by heavy oil to be used as the raw material, and is further used as a fuel for a gas turbine after removing fine particles of carbon and ash therefrom. Heavy oil suspension containing the fine particles of carbon and ash is employed as a raw material for the gasification furnace by adding atomized coal thereto after removing moisture therefrom. Gas exhausted from the gasification furnace is washed by using naphtha and the like separated from a distillate by distillation and the like and thus is adapted so that moisture can be easily separated therefrom.

In the case of the air oxidization method, although nitrogen, which is 60% or so, is mixed into the material, there is obtained a gas which has a pressure of 20 atm and has a heat quantity of 1000 kcal/m$^3$, which is used in the gas turbine as it is.

In the case of Texaco partial oxidization method, a raw material is mixed with water vapor and is preheated at about 380° C., and is further supplied to a reactor together with air or oxygen. Then, a reaction occurs in the reactor at a temperature of 1,200 to 1,500° C. and at a pressure of 20 to 150 atm. Gas exhausted from the reactor is cooled quickly by water. Simultaneously, a shift reaction of the exhausted gas to hydrogen and carbon dioxide occurs. Further, the obtained gas is used in a gas turbine. Carbon suspended in water is extracted by using the oil component or the fuel oil and is mixed with the raw material.

In the case of the coal heat medium method, a raw material is supplied to a reactor column, and water vapor is supplied from the bottom portion of the reactor column. Further, an undecomposed residue containing coal or coke (hereunder referred to simply as undecomposed residue) which is heated in a reheater is recycled to the reactor, in which the raw material is mainly thermally decomposed. Distillate produced by the thermal decomposition is exhausted from the top portion of the reactor and is used as a gas-turbine fuel. A part of the undecomposed residue is supplied from an upper portion of the reactor to a lower portion of the reheater. The remaining part of the undecomposed residue is used as a residue, namely, as a boiler fuel. Vapor is supplied from the bottom portion of the reheater. Moreover, air or oxygen is blown into the reheater from a middle portion thereof, and the undecomposed residue is burned and is thus heated. A part of the heated undecomposed residue is recycled from a upper portion of the reheater to a lower portion of the reactor. Moreover, a combustion gas is exhausted from the top portion of the reheater. In the case of this method, in addition to the partial oxidation, gasification due to a water-gas gasification is caused by an operation of blowing vapor into the reheater.

Especially, in the case that the ratio of the coal is high, for instance, methods respectively using a fixed bed furnace, a fluid furnace, a flow bed furnace, a melting layer furnace, a moving bed furnace, a fixed-bed-flow-bed combination furnace, a fluid-bed-flow-bed combination furnace and a flow-bed-melting-layer combination furnace are cited as methods of performing the partial combustion gasification.

Especially, the aforementioned methods used in the case that the ratio of the coal is high, the ratio by weight among coal, oxygen (incidentally, in the case of using air, oxygen contained in the air) and water to be added to a mixture of coal and fuel oil depends on the methods of performing the partial combustion gasification. Further, let the weight of the mixture of the coal and the fuel oil be 1, the ratio by weight of the added oxygen to the mixture of the coal and the fuel oil is not more than about 1.0:1, and the ratio by weight of the added water to the mixture of the coal and the fuel oil is not more than 3:1. Preferably, the ratio by weight of the oxygen to the mixture of the coal and the fuel oil is 0.1 to 0.5. Moreover, the ratio by weight of the water to the mixture of the coal and the fuel oil is 0.5 to 2.0. The processing temperature is the temperature of the furnace and ranges from about 300 to 1600° C. The pressure ranges from the atmospheric pressure to 100 atm. Therefore, a distillate can be obtained by applying a pressure, which is in the range between the atmospheric pressure and 100 atm.

Water vapor source depends on the kind of the aforesaid partial combustion gasification furnace, and uses water, drain water, low-pressure steam and high-pressure steam. Water may be mixed with coal, and may be fed to the partial combustion gasification furnace as the coal/water-fluid. Similarly, water may be fed to the partial combustion gasification furnace as the heavy-oil/water-fluid or the mixture-of-the-coal-and-the-heavy-oil/water-fluid.

As the ratio by weight of water vapor to be added becomes closer to 3, a carbon-monoxide-to-hydrogen shift reaction proceeds. Thus, the ratio by weight of hydrogen contained in the distillate increases. As the ratios by weight of oxygen and water become smaller, the gasification becomes similar to the thermal decomposition. Thus, the gas content decreases, while the liquid content increases.

Hydrogen, carbon monoxide, carbon dioxide, hydrocarbon, a part of the generated gas component, an oil component or alcohol may be added to air, oxygen and water vapor.

Preferably, the gasification temperature is not higher than 1000° C., and more preferably, the gasification temperature is not higher than 600° C.

In the apparatus of the present invention, in the case that a distillate is once changed into a gas or a mixture of a gas and liquid, solid substances are scarcely mixed thereinto. However, if necessary, the solid substances mixed thereinto can be removed by a cyclone, a filter or a strainer.

Partial processing temperature according to the present invention is, preferably, not higher than 1000° C., and more preferably, is not higher than 600° C., and most preferably, is not higher than 500° C. Thus, Na salt, K salt and V compound are hardly mixed into a distillate. Gas-turbine fuel having preferable quantity can be obtained as it is, or by a simple separation operation such as distillation.

Although a distillate (D) can be used as a gas turbine fuel (A) as it is, a non-condensible gas component (V) and a condensible liquid component, which are obtained by cooling the distillate, can be used as a gas turbine fuel (A).

Sometimes, a distillate (D) contains ordinary nitrogenous compounds such as ammonia, sulfide such as hydrogen sulfide, high-molecular-weight hydrocarbon, and tar in addition to the gas component (V).

Gas component (V) may be refined by washing with a liquid component (to be described later), an oil component, and the other washing agent. Further, hydrogen sulfide may be removed by desulfurization equipment after being dedusted.

Moreover, a distillate or a gas, which are in a high-temperature and high-pressure state, may be supplied to a gas-turbine combustion chamber by using a cyclone and a filter.

Liquid component includes a moisture and an oil component (O). Further, if necessary, only the oil component (O) is utilized as a gas turbine fuel by separating a moisture from the liquid component. Inorganic matter such as a salt is condensed in a moisture. Thus, when a gas turbine is used, it is preferable to use only the oil component(O). The separated moisture contains alcohol, carboxylic acid and tar acid, and is, therefore, mixed into the boiler fuel (B). Furthermore, the liquid component, the moisture or the oil component may be used by removing solid materials therefrom by means of a strainer or a filter.

Oil component (O) is, mainly, naphtha, kerosene, light oil or tar, and is obtained by the partial decomposition of the boiler-oriented fuel (F) and/or is obtained as a result of diluting volatile matter included in the fuel (F) as it is.

Oil component (O) may be used after being refined and separated by distillation or the like. Salt components, such as sodium, potassium and calcium components, and inorganic matter such as lead and vanadium are condensed in a distillation residue. Thus, if distilled and refined, a more desirable gas turbine fuel (G) is obtained. In this case, the residue (R') can be mixed into the boiler fuel (B).

Apparatus of the present invention may be adapted so that a mixture of a gas component and an oil component is burned in a single gas turbine. Alternatively, the apparatus of the present invention may be adapted so that a gas turbine for burning gas and a gas turbine for burning oil are individually provided therein to burn a gas component and an oil component, respectively. Especially, in the latter case, it is preferable that one or more gas turbines for burning gas and one or more gas turbines for burning oil are provided correspondingly to one boiler in the apparatus.

Pressure of an exhaust gas at an outlet of the gas turbine may be the atmospheric pressure. Alternatively, the exhaust gas may be pressurized at the outlet of the gas turbine. Setting the pressure of the exhaust gas at the atmospheric pressure enables the effective utilization of energy of a high-temperature and high-pressure combustion gas. When the exhaust gas of the gas turbine is applied to the boiler and the exhaust gas is burned again, the residual heat, pressure and oxygen can be utilized by using a conventional boiler which can operate at the atmospheric pressure.

Contents of impurities contained in the gas turbine fuel (G) are, for example, as follows: a sodium content and a potassium content, a sum of which is, preferably, not more than 0.5 ppm by weight; a vanadium content which is, preferably, not more than 0.5 ppm by weight; a calcium content which is preferably not more than 0.5 ppm by weight because a calcium component results in hardest deposit or sludge; and a lead content which is, preferably, not more than 0.5 ppm by weight because lead causes corrosion and reduces the effects of magnesium additive for preventing an occurrence of corrosion.

Consequently, such a desirable gas turbine fuel can be obtained by the partial processing of the boiler-oriented fuel according to the present invention.

In the case of the partial combustion gasification of a mixture of coal and heavy fuel, a residue varies with kinds of coal and fuel oil, the mixing ratio thereof, the degree of the partial combustion gasification of the mixture, and processing conditions. Further, in some case, a residue is obtained in a state in which char or coke is dispersed in a glutinous oil residue. Furthermore, a residue of the mixture is sometimes obtained as being coked entirely. However, one of such states of the residue of the mixture is selected according to the type of the boiler.

The residue of the coal is char in the case of performing the low-temperature carbonization, and is coke in the case of conducting the high-temperature carbonization, and is a substance, which keeps the shape of the coal, in the case of performing the thermal decomposition carbonization because no sintering occurs. In the description of the method and apparatus of the present invention, such a residue is referred to as a thermal decomposition carbonization residue.

Although largely depending on the kind of the coal, the yield of char in the case of performing the low-temperature carbonization is higher than that of coke in the case of performing the high-temperature carbonization. The yield of a residue in the case of performing the thermal decomposition carbonization is further higher than that of char and sometimes reaches 800 kg/t coal or so.

In the case of performing the microwave irradiation, a residue is a decomposition carbonation residue or char, and has high calorific power of 5000 to 6500 kcal/kg.

In the case of performing the partial water-gas gasification and the partial combustion gasification, residues are obtained in the form of powder, or of a lump as a result of being soften and molten, or as coke or char, depending upon kinds of coal, the degree of the partial water-gas gasification of the mixture, and processing conditions. In residues, ash component, various kinds of salt components, or turbine blade corrosion components such as vanadium are condensed.

In the case of the partial processing of fuel oil, residues are high-viscosity oil, dried-up matter or coke.

In the case of the partial processing of a mixture of fuel oil and coal fuel oil, residues are a mixture of the aforementioned residues in the case of the processing of the coal and of the fuel oil.

In the case of the partial processing of waste plastic, residues are decomposition residues and high-viscosity oil.

In the case of the method and apparatus of the present invention, the boiler for burning residues can achieve both the combustion of residues at the atmospheric pressure and the combustion in a pressurized condition. Therefore, the method and apparatus of the present invention are implemented easily and economically by utilizing a power generation facility, which employs a conventional boiler that has both a radiation heat transfer surface and a convection heat transfer surface, without extensively modifying a facility.

In the case of the apparatus of the present invention, the surface temperature of a tube of the boiler is low, namely, about 600° C. Thus, even if salts derived from alkaline metal or alkaline earth metal, or vanadium (V) component are contained therein, the boiler can be used. Further, a characteristic aspect of the present invention resides in that a residue, in which these impurities are condensed, can be burned.

The ratio between the heat quantity consumed in a gas turbine and that consumed in a steam turbine is (20 to 60%):(80 to 40%) during the turbines are fully operational. The preferable ratio is (30 to 55%) (70 to 45%), and the more preferable ratio is (35 to 50%):(65 to 50%).

Therefore, the ratio between the heat quantity provided from the gas turbine fuel (A) and that provided from the boiler fuel (B) should be within the aforementioned range of the ratios.

In the case where electric power is generated by using only a distillate (D) and a residue (R) that are obtained by the partial processing of the boiler-oriented fuel (F), the ratio between the heat quantity of the distillate (or the oil component or the refined oil component) and that of the residue is adjusted to a value within the aforementioned range of ratios. Further, in the case where electric power is generated by using the combination of the gas-turbine-oriented fuel (G'), the boiler-oriented fuel (F'), and a distillate (D) and a residue (R) that are obtained by the partial processing of the boiler-oriented fuel (F'), the ratio of the heat quantity of the gas turbine fuel (A) to the boiler fuel (B), which are obtained after such a combination, is adjusted to a value within the aforementioned range of ratios.

In the case that the ratio of the heat quality of the gas turbine fuel to that of the boiler fuel is too low in comparison with the values of the ratio of the aforementioned range, the efficiency in power generation is not increased so much. Further, it is necessary for making the ratio of the heat quality of the gas turbine fuel thereto exceed the aforementioned range to achieve complete gasification or severe processing. Thus, the method and apparatus of the present invention become uneconomical in respect of the cost for equipment and processing.

Moreover, regarding the ratio of the heat quantities of the gas turbine fuel to that of the boiler fuel, the combustion exhaust gas from the gas turbine is supplied to the boiler in which the residues can be burned. Thus, the heating value and the residual oxygen in the combustion exhaust gas of the gas turbine can be effectively utilized. Consequently, the thermal efficiency can be enhanced by performing the exhaust gas re-burning combined cycle power generation.

In addition, a sum of Na content and K content in the fuel for a gas turbine (G), or in the gas turbine (A) which is obtained by mixing the fuel for a gas turbine (G), which is derived from the distillate, with the gas-turbine-oriented fuel (G') can be made to be equal to or less than 0.5 ppm, and moreover, V content in the fuel (G) is made to be equal to or less than 0.5 ppm. Consequently, there can be easily obtained a gas turbine fuel by which the turbine blades resist corrosion even if used for a long time period.

Moreover, an appropriate fuel can be used by being selected according to the circumstances from a fuel having little effect on the environment, a low-cost fuel or a surplus fuel and so forth while adjusting the ratio of the heat quantities of the gas-turbine-oriented fuel to the boiler fuel to a value of the aforementioned ratio.

Therefore, in the case that the power generation is performed by the method and apparatus of the present invention, the power generation is carried out by using surplus kerosene in seasons in which home heating is unnecessary, by using a by-product gas as gas-turbine-oriented fuel in the case that methane gas is produced as a by-product, or by using the boiler-oriented fuel such as waste plastic or producing a gas turbine fuel and a boiler fuel by the partial processing of the boiler-oriented fuel when the processing of the boiler-oriented fuel is necessary. Consequently, the power generation can be achieved optimally according to quantities of resources, and the costs and the environment of the power generation apparatus.

The aforesaid partial processing of the boiler-oriented fuel will be described briefly theoretically hereinbelow by omitting the description of complex heat loss.

For example, the partial processing of a boiler-oriented fuel having a heating value of 100 Mcal (megacalories) is performed, so that the boiler-oriented fuel is separated into a distillate, which has a heating value of 45 Mcal, and a residue which has a heating value of 55 Mcal. Further, one third ($1/3$) of the heating value of the distillate (15 Mcal) is converted into electric power, and the rest of the distillate, which corresponding to the remaining heating value of the distillate (30 Mcal), becomes a gas-turbine combustion exhaust gas. The temperature of this combustion exhaust gas is 450 to 700° C. This combustion exhaust gas contains oxygen which is 10 to 15% by volume. When this combustion exhaust gas (whose heating value is 30 Mcal) is supplied to the boiler and the residue (whose heating value is 55 Mcal) is burned, a part of the residue, whose heating value is 90% (namely, 76.5 Mcal) of that of the entire residue, is converted into steam. Further, the remaining part of the residue, whose heating value is 10% (namely, 8.5 Mcal) of that of the entire residue, is lost as a boiler exhaust gas. When the power generation is performed by means of a steam turbine by using the generated steam (having a heating value of 76.5 Mcal), heat quantity of 35.2 Mcal is converted into electric power at a thermal efficiency of 46%. Namely, only 50.2 Mcal of the entire heating value of the boiler-oriented fuel (100 Mcal) is converted into electric power.

In contrast, in the case that electric power is generated by simply supplying the boiler-oriented fuel to the boiler as in the case of a conventional apparatus, 90% (90 Mcal) of the heating value of the fuel is converted into steam by burning the boiler-oriented fuel which has a heating value of 100 Mcal. When electric power is generated by a steam turbine, heat quantity of 43 Mcal is converted into electric power at thermal efficiency of 48%. Namely, only 41.4 Mcal of the heat quantity (100 Mcal) of the entire coal is converted into electric power.

Namely, in accordance with the present invention, the boiler-oriented fuel is separated into the distillate and the residue by performing the partial processing of the boiler-oriented fuel. Thus, a gas turbine fuel and a boiler fuel, which have suitable quality, can be obtained in such a manner that the ratio of heat quantities of the gas turbine fuel to the boiler fuel corresponds to the aforementioned heat-quantity ratio. Moreover, a fuel can be produced and combined cycle power generation can be conducted easily and economically.

The aforementioned relation between the present invention and the conventional apparatus will be described hereunder in a more practical manner by using the typical boiler-oriented fuel which is a more typical fuel.

In the case that steam is first generated by simply burning coal (HHV basis 6200 kcal/kg) containing 30% by weight of volatile matter by means of the boiler, and that 1000 MW of electric power is generated by a steam turbine, 8536 t of coal per day are needed. Moreover, the net thermal efficiency is 39% (HHV basis).

In contrast, in the case of generating electric power by the apparatus of the present invention, 7398 t/day of the same coal are carbonized at 450° C. Thus, 2005 t/day of a gas turbine fuel corresponding to the volatile matter contained in the coal are obtained. Further, 269 MW of power can be generated by the gas-turbine power generation by utilizing this gas turbine fuel. The combustion exhaust gas derived from the gas turbine contains 13% by volume oxygen at a temperature of 580° C. Therefore, the combustion exhaust gas from the gas turbine is supplied to the boiler, and this residue can be burned. Further, 731 MW of electric power can be obtained by means of a steam turbine. Namely, 1,000 MW of power can be generated by using 7,398 t/day of the same coal. Further, the net thermal efficiency can be increased to 45%.

Particularly, it has been found that coal, such as low grade brown coal, which is rich in volatile matter and has a heating value of the distillate to the heating value of the entire coal ranging 20% to 60%, more preferably not less than 30%, and most preferably, 35% to 50%, can be effectively utilized. Further, as compared with the complete gasification of the coal, it is easy to extract the volatile matter as the distillate. Moreover, the raw material is not oxidized. Thus, a fuel having little impurity, such as Na, K or V, can be obtained by maintaining the initial heating value and by performing the processing at a low temperature.

Furthermore, in the case that 1000 MW of power is generated by simply burning heavy oil (HHV basis 9800 kcal/kg) by means of the boiler to generate steam, and generating electric power by means of a steam turbine, 5265 t/day of heavy oil is needed. Incidentally, the net generation efficiency is 40% (HHV basis).

In contrast, in the case that the power generation is performed in accordance with the present invention, the thermal decomposition of 4481 t/day of the same heavy oil is effected at a temperature of 480° C. by the visbreaking method. Further, 1824 t/day of a gas turbine fuel is obtained by a simplified topping. Then, 312 MW of power can be generated by gas-turbine power generation using this gas turbine fuel. Combustion exhaust gas derived from the gas turbine contains 3% by volume of oxygen at 580° C. Thus, a residue can be burned by supplying the combustion exhaust gas, which is derived from the gas turbine, to a boiler. Further, 688 MW of power can be generated by a steam turbine. Namely, 1000 MW of power can be generated by using 4481t/day of the same heavy oil. Moreover, the net generation efficiency can be increased to 47%.

Especially, diverse kinds of raw materials can be used as the heavy oil. Furthermore, as compared with the complete gasification of the heavy oil, it is easy to obtain a component, which is easily separated by the thermal decomposition, as a distillate. Moreover, the raw material is not oxidized. Thus, a fuel having little impurity, such as Na, K or V, can be obtained by maintaining the initial heating value and by performing the processing at a low temperature.

These hold true for the case of using a mixture of coal and another boiler-oriented fuel, or a mixture of fuel oil and another boiler-oriented fuel, or, specially, a mixture of coal and fuel oil, in addition to the herein-above-mentioned case of using the fuel oil singly, and also hold good in the case of changing a usual fuel rate, for example, lowering the ratio of the distillate at the time of an occurrence of surplus kerosene and using kerosene as an auxiliary fuel of a gas-turbine-oriented fuel, or conversely lowering the ratio of the residue.

Further, the apparatus of the present invention is placed in juxtaposition with a facility, such as an oil purification plant, a steelmaking plant or a chemical plant, in which a gas-turbine-oriented fuel and a boiler-oriented fuel are obtained at a same place. Further, the apparatus of the present invention can perform the aforesaid combined-cycle power generation, preferably, an exhaust gas re-burning combined cycle power generation by using the gas-turbine-oriented fuel and the boiler-oriented fuel supplied from each of the plants.

Oil purification plant receives crude oil or other various raw materials and fuels and can supply gas-turbine-oriented fuels such as hydrogen, LPG, petrochemical naphtha, aviation gasoline, mobile gasoline, jet fuel, kerosene and diesel light oil, and can also supply boiler-oriented fuels such as fuel oil A, fuel oil B, fuel oil C, residual oil under reduced pressure, asphalt, petroleum coke and pitch.

Consequently, the power generation apparatus of the present invention can perform combined-cycle power generation, preferably, exhaust-gas re-burning combined cycle power generation without being provided with a partial processing unit, by using the gas-turbine-oriented fuel and the boiler-oriented fuel, which are provided for itself so that the ratio between the heating values of these fuels is adjusted to the aforementioned ratio therebetween.

Similarly, in the steel making plant, a blast furnace gas, which contains carbon monoxide and hydrogen, or a coke oven gas, which is produced at the time of making coke and is rich in hydrogen, methane and carbon monoxide, is obtained. Further, such a blast furnace gas or a coke oven gas is used as the gas-turbine-oriented fuel. Moreover, a carbonaceous residue obtained from the steelmaking plant, coke used in steelmaking, coal which is the raw material of the coke, natural gas for heating iron ore, heavy oil, or pulverized coal is used as the boiler-oriented fuel. Furthermore, the gas-turbine-oriented fuel and the boiler-oriented fuel are used so that the ratio between the heating values of these fuels is adjusted to the aforementioned ratio therebetween. Consequently, the apparatus of the present invention can perform combined-cycle power generation, preferably, exhaust-gas re-burning combined cycle power generation without being provided with a partial processing unit.

Further, similarly, a chemical plant receives at least one of raw material and fuel, such as LNG, butane, naphtha, fuel oil or coal, and causes synthetic reactions or the like. Thereafter, flammable gases, such as hydrogen, carbon monoxide, methane, ethane, ethylene, propane, propylene and a stack gas, and/or liquid products, whose boiling point at the atmospheric pressure is not higher than 500° C., are supplied from the plant as the gas-turbine-oriented fuel. On the other hand, tar and defective discharged from the plant or heavy oil and coal used as the raw material and fuel of chemical plants can be used as the boiler-oriented fuel. Consequently, the power generation apparatus of the present invention can perform combined-cycle power generation, preferably, exhaust-gas re-burning combined cycle power generation without being provided with a partial processing unit, by using the gas-turbine-oriented fuel and the boiler-oriented fuel so that the ratio between the heating values of these fuels is adjusted to the aforementioned ratio therebetween.

Examples of the chemical plants are as follows: an olefin/aromatic products manufacturing plant for performing naphtha cracking; a general-purpose resin manufacturing plant for manufacturing various general-purpose resins such as polyolefine, polystyrene and polyvinyl chloride; a resin manufacturing plant for producing polyester, nylon, polyurethane, polyacrylonitrile, polyvinyl acetate, and polyacetal; and a plant for producing low molecular chemicals such as ammonia, urea, ammonium sulfate, ammonium nitrate, melamine, acrylonitrile, methanol, formalin, acetaldehyde, acetic acid, vinyl acetate, pentaerythritol, ethanol, propanol, butanol, octanol, ethylene oxide, propylene oxide, glycerin, phenol, bisphenol, aniline, diphenyl methane diisocyanate, tolylene diisocyanate, aceton, methyl isobutyl ketone, maleic anhydride, acrylic acid, polyacrylic acid, methacrylic acid, polymethacrylic acid and acrylic amide.

The method and apparatus of the present invention can be applied to a combinat (or industrial complex), namely, combinations of various plants, such as an oil purification plant, a petrochemical plant, an ironworks, a steelworks, a food processing plant and a thermal electric power station.

Further, the apparatus of the present invention is placed in juxtaposition with a coal mine and uses coal and a coal seam gas as the boiler-oriented fuel and the gas-turbine-oriented fuel, respectively, so that the ratio between the heating values of these fuels is adjusted to the aforementioned ratio therebetween. Consequently, the apparatus of the present invention can perform combined-cycle power generation, preferably, exhaust-gas re-burning combined cycle power generation without being provided with a partial processing unit.

Furthermore, the power generation apparatus of the present invention uses methane, which is generated by fermenting sludge, chicken dropping, or bean curd lees or the like produced in a "tofu (soy bean cake)" producing process, and dried residue thereof as the gas-turbine-oriented fuel and the boiler-oriented fuel, respectively, in such a manner that the ratio between the heating values of these fuels is adjusted to the aforementioned ratio therebetween. Thus, the apparatus of the present invention can perform combined-cycle power generation, preferably, exhaust-gas re-burning combined cycle power generation without being provided with a partial processing unit.

Thus, the power generation apparatus of the present invention can achieve efficient power generation by being placed in juxtaposition with a facility, such as an oil purification plant, a steelmaking plant or a chemical plant, and by generating electric power at a same place, namely, in a same business establishment by using a gas-turbine-oriented fuel and a boiler-oriented fuel produced from such a plant. Thus, generated power can be utilized not only as power to be consumed in each plant itself, but as power for sale. Consequently, the power generation method and apparatus of the present invention can make up for a deficiency in electric power at the peak of demands therefor.

Hereinafter, some embodiments of the present invention will be described in detail by referring to the accompanying drawings.

Further, only primary portions of a power generation apparatus embodying the present invention are shown in the drawings. Namely, the drawing of devices such as pumps, heat exchangers, cyclones, strainers, filters, storage tanks, solid-matter transporting means and heating-gas generating equipment, attachments, flue gas denitrizers, desulfurizers and decarbonators is omitted for simplicity of drawing.

Next, composing portions for performing the methods of the partial decomposition of a boiler-oriented fuel will be described hereunder correspondingly to such methods, respectively, by referring to FIG. 1.

A) Carbonization

In the apparatus of FIG. 1, preferably, coal 1 is preliminarily dried. Further, such coal 1 is supplied to partial decomposition processing means (in this case, a carbonization device, more particularly, a low-temperature carbonization device) 2. Then, the coal 1 is heated to a predetermined temperature by using a heating gas 15 which has been separately generated by burning a fuel. Thus, a distillate 3 is obtained by being accompanied with the heating gas 15. On the other hand, a residue (in this case, char) 4 is discharged from the bottom part of the partial decomposition processing means 2.

B) Microwave Irradiation

In the apparatus of FIG. 1, preferably, coal 1 is preliminarily dried. Further, such coal 1 is supplied to partial decomposition processing means (in this case, a microwave irradiation device) 2. Then, the partial decomposition is performed on the coal 1 together with a hydrocarbon gas 15', instead of the heating gas 15. As a result, a distillate 3 is obtained. Further, a residue 4 is discharged from the bottom part of the partial decomposition processing means 2.

C) Partial Water-Gas Gasification

In the apparatus of FIG. 1, coal 1 is supplied to partial decomposition processing means (in this case, the partial water-gas gasification means, and more particularly, a fixed-bed gasification furnace) 2 after the moisture content in the coal 1 is measured. Then, the partial water-gas gasification is performed on the coal 1 at a predetermined temperature, at a predetermined pressure and for a predetermined reaction time, together with a heating gas 15' which has been separately generated by burning a fuel and to which a predetermined amount of water vapor is added, instead of the heating gas 15. As a result, a distillate 3 is obtained from the top part of the partial water-gas processing means 2. Further, a residue 4 is discharged from the bottom part thereof.

D) Partial Combustion Gasification of Coal

In the case of the partial combustion gasification, the process is different in the following respects from that of the case of the carbonization.

In the apparatus of FIG. 1, coal 1 is supplied to partial decomposition processing means (in this case, the flow-bed gasification means) 2. Then, the partial combustion gasification is performed on the coal 1, to which a predetermined amount of air (or oxygen) 17 and water vapor 18 are added, instead of the heating gas 15, at a predetermined temperature, at a predetermined pressure and for a predetermined reaction time. As a result, a distillate 3 is obtained from the top part of the partial decomposition processing means 2. Further, a residue 4 is discharged from the bottom part thereof.

E) Partial Combustion Gasification of A Mixture of Coal and Heavy Oil

In the apparatus of FIG. 1, a mixture 1 of coal and fuel oil is supplied to partial combustion processing means (in this case, the flow-bed gasification means) 2. Incidentally, the coal and the fuel oil may be supplied separately from each other to the means 2. Then, the partial combustion gasification is performed on the mixture 1, to which a predetermined amount of air (or oxygen) 17 and water vapor 18 are added, instead of the heating gas 15, at a predetermined temperature, at a predetermined pressure and for a predetermined reaction time. As a result, a distillate 3 is obtained from the top part of the partial combustion gasification processing means 2. Further, a residue 4 is discharged from the bottom part thereof.

F) Thermal Decomposition

In the apparatus of FIG. 1, a boiler-oriented fuel (in this case, fuel oil) 1 for partial decomposition is supplied to thermal decomposition processing means (using the visbreaking method in this case) 2. Then, the partial decomposition is performed on the boiler-oriented fuel 1 at a predetermined temperature, at a predetermined pressure and for a predetermined reaction time. Thus, a distillate 3 is obtained from the top part of the thermal decomposition processing means 2. Further, a residue 4 is discharged from the bottom part thereof. Incidentally, in the case of the thermal decomposition of heavy oil, there is no need for blowing the heating gas 15 thereto.

In the apparatus of FIG. 1, the distillate 3 obtained by various kinds of the partial processing is supplied to a combustion chamber 23 of a gas turbine (consisting of a main body 21, air compressor 22 and a combustion chamber 23). Then, the distillate 3 is mixed with compressed air (incidentally, oxygen enriched air may be used instead of the compressed air) 25. When burned, the high-temperature and high-pressure driving combustion gas 27 is generated. Further, the gas turbine is driven by the combustion gas for driving 27. Then, electric power is generated by a generator 24 for a gas turbine, which is mounted on a shaft of the gas turbine.

On the other hand, the residue 4 is supplied to a boiler 31, in which the residue 4 is burned by being supplied with air 35. Thus, steam 32 is generated. The generated steam 32 is then fed to a steam turbine 33. Thereby, a generator 34 for the steam turbine, which is mounted on the shaft of the steam turbine, generates electric power. Condenser 37 is provided in the steam turbine 33. Further, the condenser 37 condenses the steam in a negatively pressurized state. Further, the condenser 37 condenses the exhaust gas of the steam turbine, so that condensate is separated from the exhaust gas. Then, the condensate is recycled to the boiler 31 together with make-up water as boiler feedwater 38.

In the aforementioned apparatus, a high-temperature gas-turbine exhaust gas 28 exhausted from the gas turbine can be supplied to the boiler 31 by an exhaust-gas supplying means. In the gas turbine exhaust gas 28, 10–15% by volume of oxygen is left. Method of burning the residue 4 (namely, by burning the exhaust-gas again) in the boiler 31 by this oxygen can increase the thermal efficiency in the combined cycle power generation, because of the facts that there is no need for newly feeding air 35 (usually, at ordinary temperature) thereinto and that the heat of the exhaust gas can be utilized. Moreover, the exhaust-gas treatment can be achieved economically. Therefore, this method is preferable.

Needless to say, the air 35 may be mixed into the gas-turbine exhaust gas 28 so as to burn the residue.

Further, heat recovery is achieved by first supplying the gas-turbine exhaust gas 28 to another heat recovery boiler and then generating steam. Alternatively, the heat-recovery-boiler exhaust gas is supplied to the boiler. Then, the exhaust-gas re-burning of the residue 4 by the exhaust gas can be performed in the boiler 31 by using the residual heat and 10–15% by volume of residual oxygen in the exhaust gas.

The exhaust gas supplying means is constituted by a duct for supplying a gas-turbine exhaust gas to the boiler. Further, if necessary, the exhaust gas supplying means may be provided with a valve, a thermometer, a flow meter and an oxygen content meter.

In the apparatus of FIG. 1, portions for performing the methods of the partial separation of the boiler-oriented fuel are similar to the separation methods following the partial decomposition of the boiler-oriented fuel. In these portions, heating, pressure reduction, topping, flushing, distillation, extraction, decantation (namely, an operation of pouring off without stirring up sediment) and a mixture of these operations are used.

Figure 2:
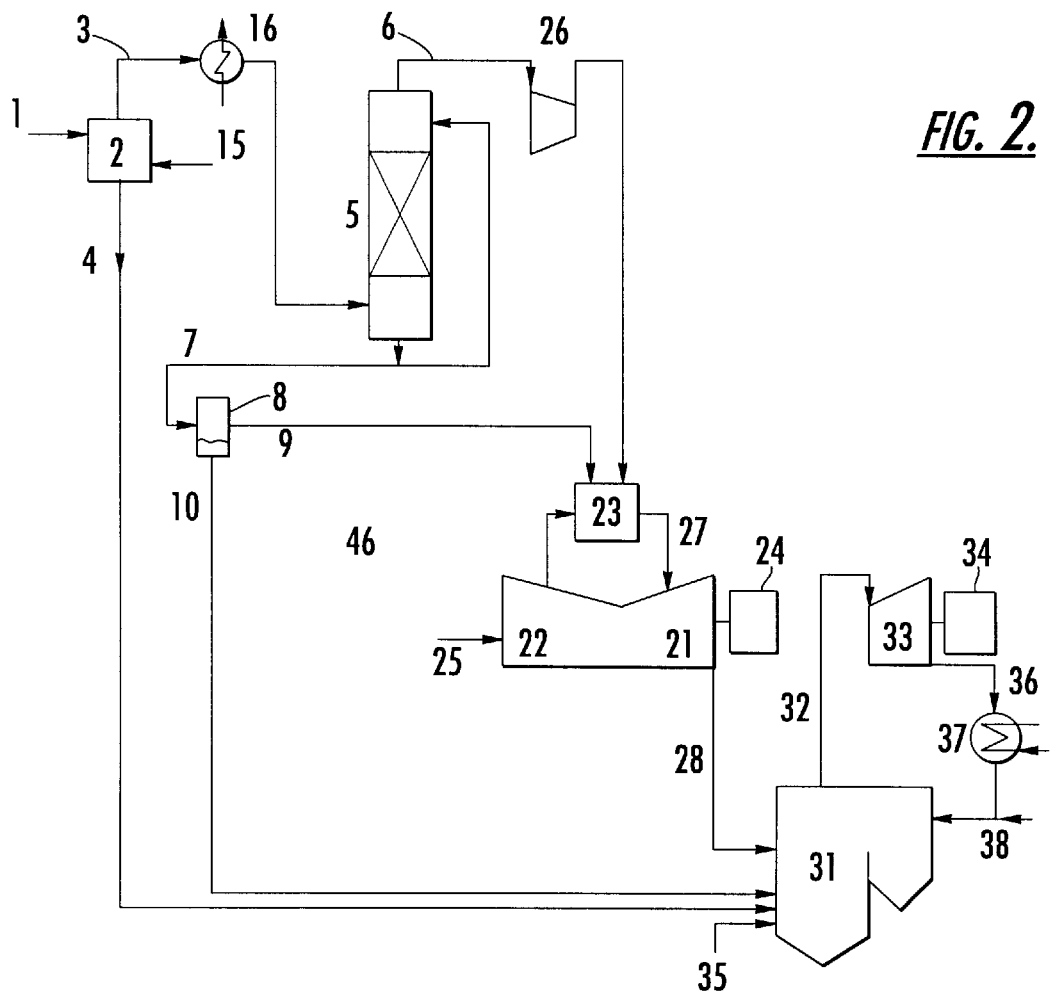
FIG. 2 is a process flow chart for illustrating a process of separating distillate into a gas component and a liquid component.

As illustrated in FIG. 2, the distillate 3 is cooled by the heat exchanger 16, so that the distillate 3 is separated into a gaseous component and a liquid component which are then washed in the gas washing column 5. Thus, the distillate 3 is separated into a gas component 6 and a liquid component 7. Incidentally, the liquid component 7 is used as a cleaning agent to be used in the gas washing column 5. The cleaning agent is supplied to the top part of the gas washing column 5, where vapor-liquid contact can be caused. The gas component 6 is supplied by a gas component compressor 26 to the combustion chamber 23.

Alternatively, the liquid component 7 in the gas washing column 5 may be cooled and then supplied to the top part of the gas washing column 5.

Although the liquid component 7 itself may be used as a gas turbine fuel, only an oil component 9 obtained by separating a water layer 10 therefrom through a separating tank 8 may be used as the gas turbine fuel. The water layer may be added to a fuel for the boiler 31.

Figure 3:
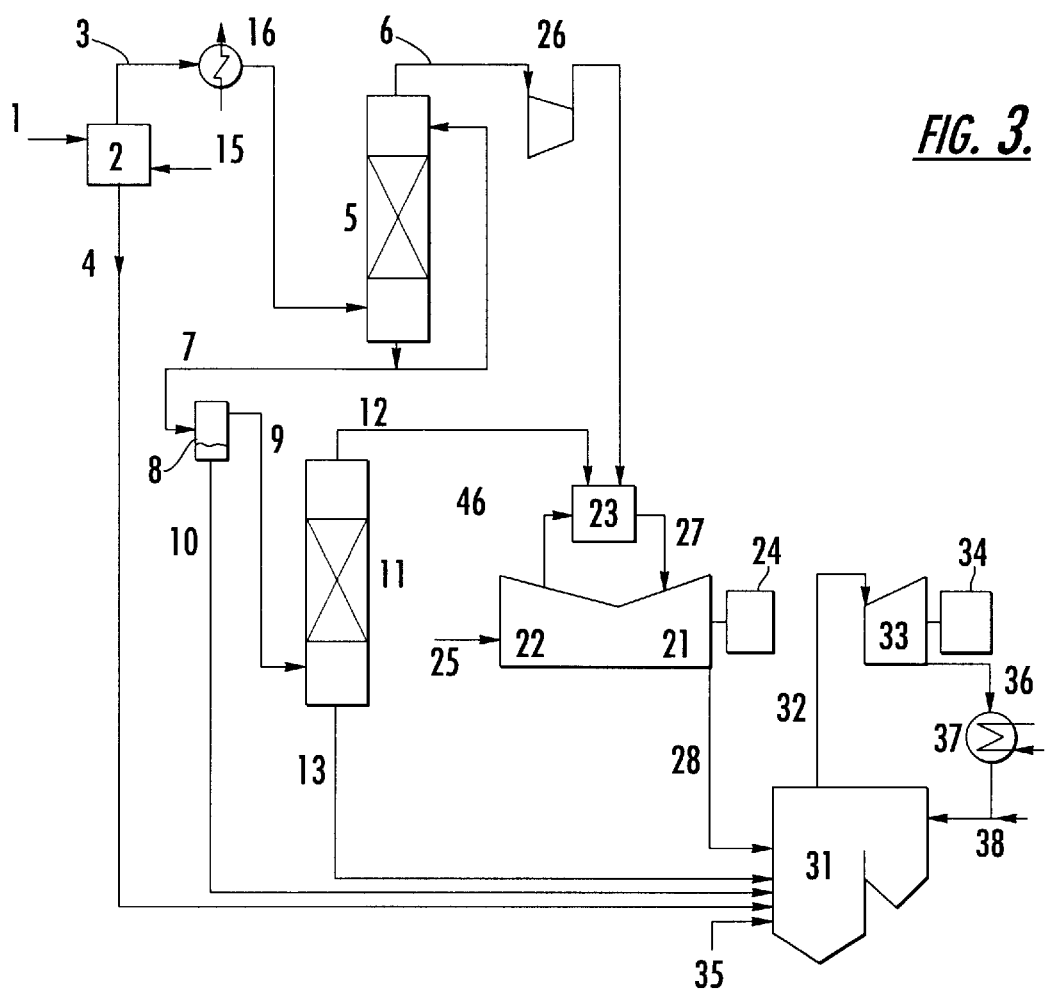
FIG. 3 is a process flow chart for illustrating a process flow chart for illustrating a process of further distilling an oil component.

As illustrated in FIG. 3, the oil component 9 may be refined by refining means (for instance, distillation). The oil component 9 is supplied to the distilling column 11, in which the oil component 9 is separated into a refined distillate 12 and a residue 13. The refined distillate 12 is supplied to the combustion chamber 23 as the gas turbine fuel. The residue 13 is added to the boiler 31 as a fuel therefor.

Even when using the gas turbine, this purification can prevent the gas turbine from being corroded due to V-component. Consequently, the life of the gas turbine can be increased.

Hereinafter, the case of using both the gas-turbine-oriented fuel 101 and the boiler-oriented fuel 102 will be described with reference to the drawings.

Figure 4:
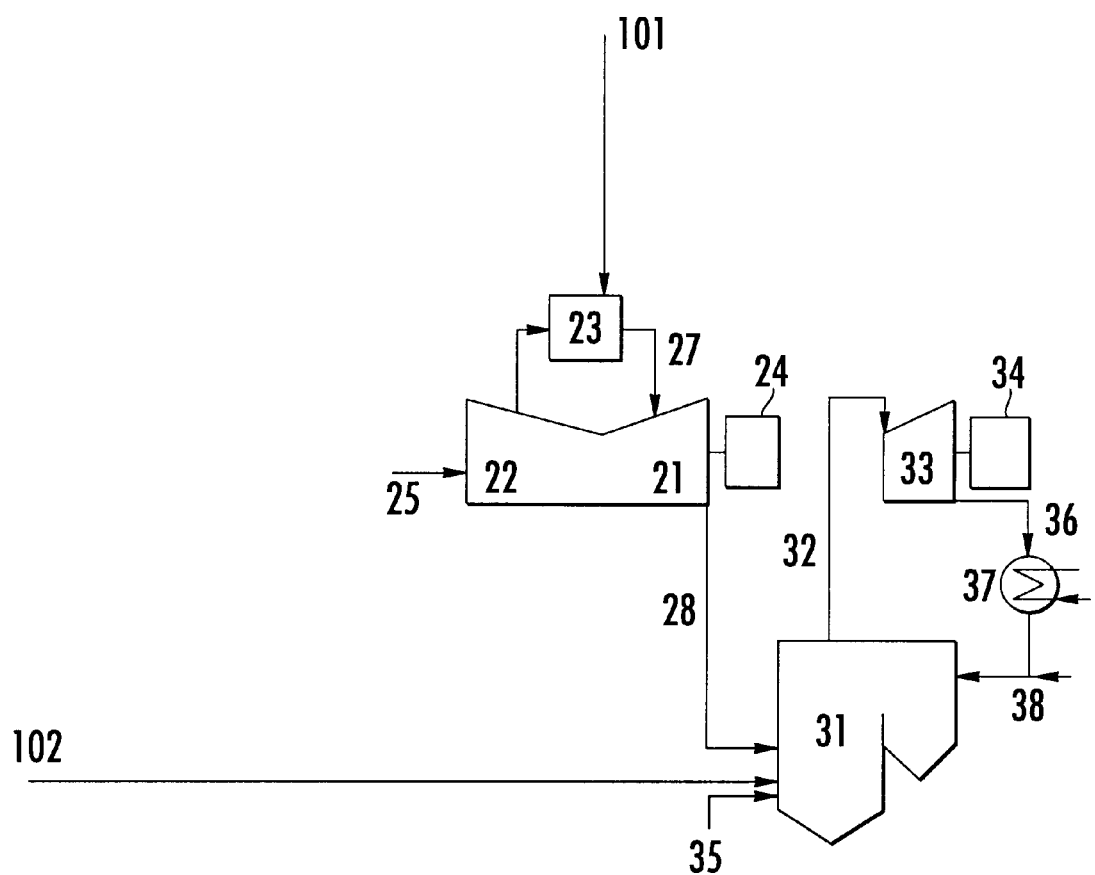
FIG. 4 is a process flow chart for illustrating a power generation method using a gas-turbine-oriented and a boiler-oriented fuel.

In the apparatus of FIG. 4, which is placed in juxtaposition with a facility (not shown), such as an oil purification plant, a steelmaking plant or a chemical plant, a gas-turbine-oriented fuel 101 is supplied to the combustion chamber 23 of the gas turbine (consisting of the main body 21, the air compressor 22 and the combustion chamber 23). Then, the fuel 101 is mixed with a compressed air (alternatively, oxygen enriched air can be used) 25. Further, this mixture is burned, so that the high-temperature and high-pressure driving combustion gas 27 is generated. Subsequently, the gas turbine is driven by the driving combustion gas 27. Then, electric power is generated by the generator 24 for the gas turbine, which is mounted on the shaft of the gas turbine. The gas turbine exhaust gas 28 exhausted from the gas turbine is supplied to the boiler 31.

On the other hand, a boiler-oriented fuel 102 generated by the plant is supplied to the boiler 31, in which the fuel 102 is burned by being supplied with air 35. Thus, steam 32 is generated. The generated steam 32 is then fed to the steam turbine 33. Then, the generator 34 for the steam turbine, which is mounted on the shaft of the steam turbine, generates electric power. Condenser 37 is provided in the steam turbine 33. Further, the condenser 37 condenses the steam in a negatively pressurized state. Further, the condenser 37 condenses the exhaust gas of the steam turbine 33, so that condensate is separated from the exhaust gas. Then, the condensate is recycled to the boiler 31 together with the make-up water as the boiler feedwater 38.

In the aforementioned apparatus, a high-temperature gas-turbine exhaust gas 28 exhausted from the gas turbine can be supplied to the boiler 31 by an exhaust-gas supplying means. In the gas turbine exhaust gas 28, 10–15% by volume of oxygen is left. Method of burning the boiler-oriented fuel 102 (namely, by performing the exhaust-gas re-burning) in the boiler 31 by this oxygen can increase the thermal efficiency in the combined cycle power generation, because of the facts that there is no need for newly feeding the air 35 (usually, at ordinary temperature) thereinto and that the temperature of the exhaust gas is high. Moreover, the exhaust-gas treatment can be achieved economically. Therefore, this method is preferable.

Needless to say, the air 35 may be added to the gas-turbine exhaust gas 28 so as to burn the boiler-oriented fuel 102.

Further, heat recovery is achieved by first supplying the gas-turbine exhaust gas 28 to another heat recovery boiler and then generating steam. Alternatively, the heat-recovery-boiler exhaust gas is supplied to the boiler. Then, the boiler-oriented fuel 102 can be processed by a method (namely, the exhaust-gas re-burning method) of burning the fuel 102 in the boiler 31 by using the residual heat and 10–15% by volume of residual oxygen in the exhaust gas.

Thus, the power generation can be achieved efficiently, without newly providing a facility for performing the partial processing of the boiler-oriented fuel, by utilizing the gas-turbine-oriented fuel 101 and the boiler-oriented fuel 102 produced from the plant.

Figure 5:
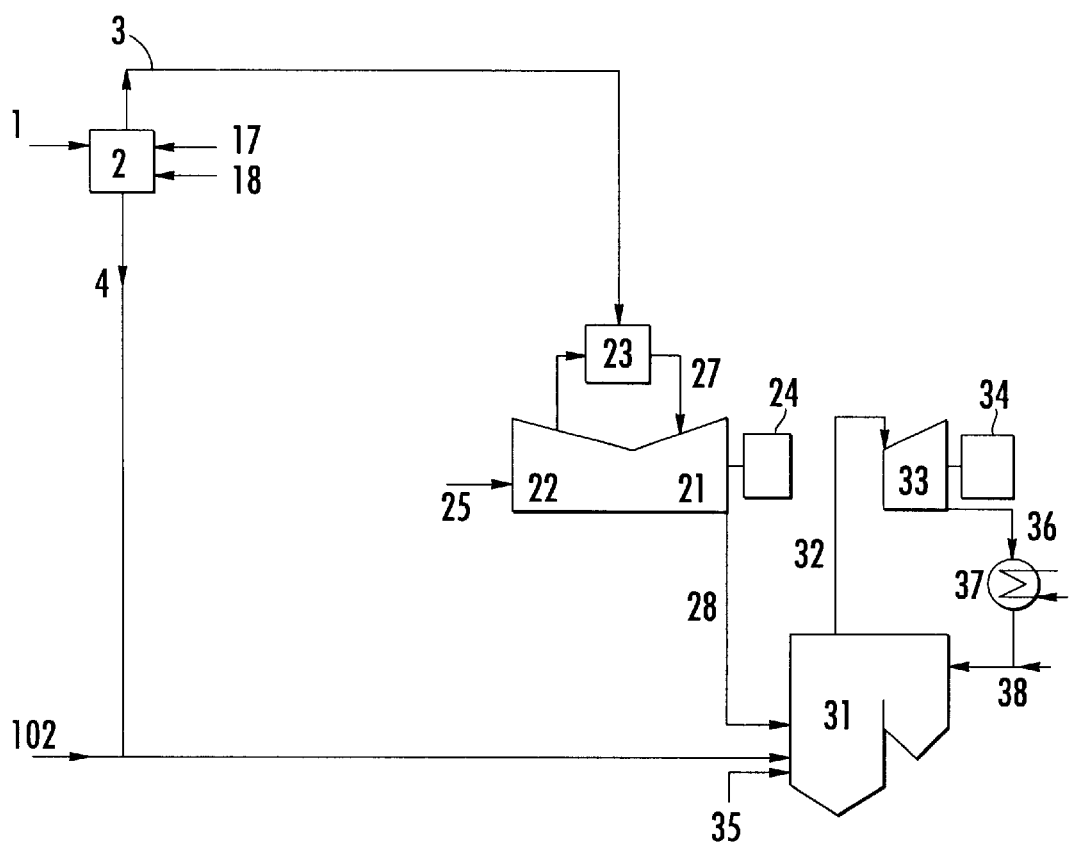
FIG. 5 is a process flow chart for illustrating a power generation method using a combination of a boiler-oriented fuel, a gas turbine fuel and a boiler fuel which are obtained by performing partial processing on the boiler-oriented fuel.

FIG. 5 illustrates an example of a process using a gas turbine fuel and a boiler fuel that are obtained by the partial processing of the boiler-oriented fuels 102 and 1.

As illustrated in this figure, the boiler-oriented fuel 1 to be treated partially is supplied to the partial processing means (in this case, a fluid-bed gasification furnace for coal) 2. Then, predetermined amounts of air (or oxygen) 17 and water vapor 18 are added thereto. Then, the partial combustion gasification is performed at a predetermined temperature, at a predetermined pressure, and for a predetermined reaction time. Thus, the distillate 3 is obtained from the top part of the partial combustion gasification processing means 2, while the residue 4 is discharged from the bottom part thereof.

The distillate 3 itself is supplied to the combustion chamber 23 of the gas turbine as a gas turbine fuel, and is then mixed with the compressed air 25. Subsequently, this mixture is burned, so that the high-temperature and high-pressure combustion gas for driving 27 is generated. Then, the gas turbine is driven by the combustion gas for driving 27. Then, electric power is generated by the generator 24 for the gas turbine, which is mounted on the shaft of the gas turbine. The gas-turbine exhaust gas 28 exhausted from the gas turbine is supplied to the boiler 31.

On the other hand, the residue 4 is supplied as a boiler fuel, together with the boiler-oriented fuel 102 to the boiler 31, in which the residue 4 is burned by being supplied with the air 35. Thus, steam 32 is generated. The generated steam 32 is then fed to the steam turbine 33. Thereby, the generator 34 for the steam turbine, which is mounted on the shaft of the steam turbine, generates electric power. Condenser 37 is provided in the steam turbine 33. Further, the condenser 37 condenses the steam in a negatively pressurized state. Further, the condenser 37 condenses the exhaust gas of the steam turbine, so that condensate is separated from the exhaust gas. Then, the condensate is recycled to the boiler 31 together with make-up water as the boiler feedwater 38.

In the aforementioned apparatus, the high-temperature gas-turbine exhaust gas 28 exhausted from the gas turbine can be supplied to the boiler 31 and can be utilized for the exhaust-gas re-burning method. By the exhaust-gas re-burning method, the thermal efficiency in the combined cycle power generation can be enhanced. Moreover, the exhaust-gas treatment can be achieved economically. Therefore, this method is preferable. Needless to say, the air 35 may be mixed into the gas-turbine exhaust gas 28 so as to burn the boiler-oriented fuel 102 and the residue 4.

Further, heat recovery is achieved by first supplying the gas-turbine exhaust gas 28 to another heat recovery boiler and then generating steam. Alternatively, the heat-recovery-boiler exhaust gas is supplied to the steam boiler. Then, the exhaust-gas re-burning of the boiler-oriented fuel 102 and the residue 4 can be performed in the boiler 31 by using the residual heat and 10–15% by volume of residual oxygen in the exhaust gas.

Figure 6:
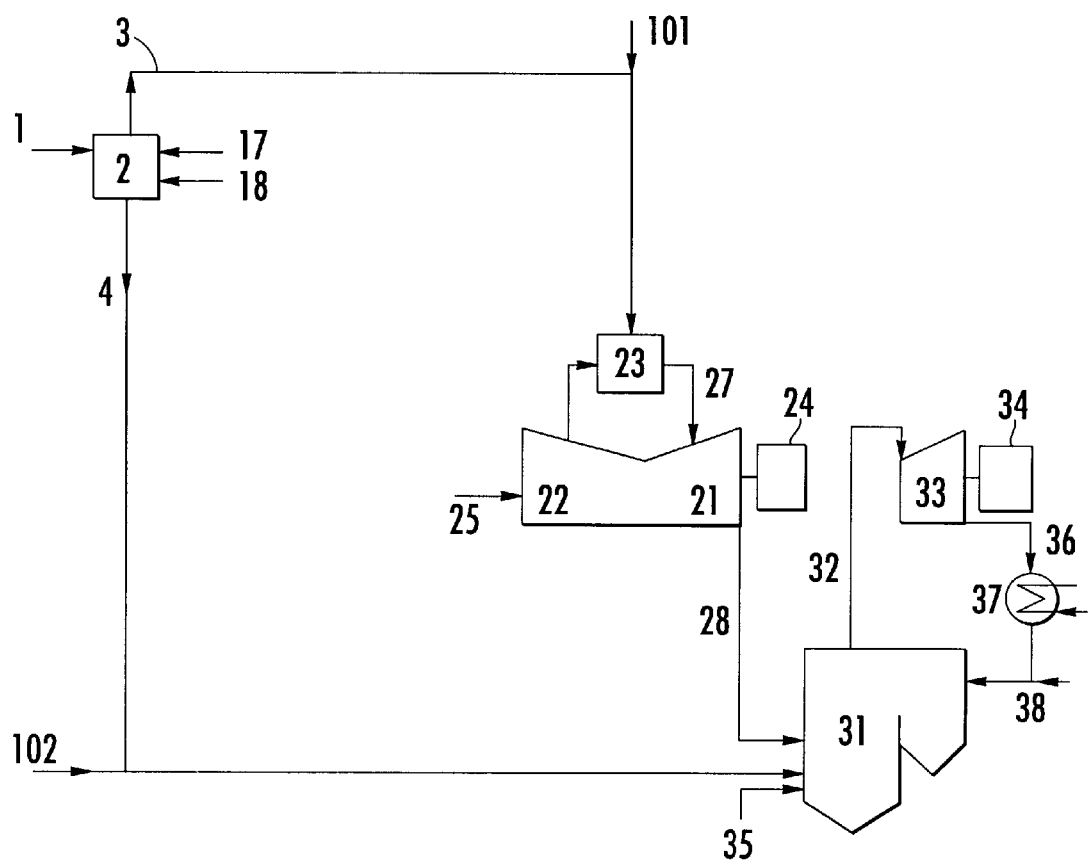
FIG. 6 is a process flow chart for illustrating a power generation method using a gas-turbine-oriented fuel, a boiler-oriented fuel, and a combination of a gas turbine fuel and a boiler fuel which are obtained by performing partial processing on the boiler-oriented fuel.

FIG. 6 illustrates an example of a process using a gas-turbine-oriented fuel in addition to a boiler-oriented fuel, gas turbine fuel and a boiler fuel that are obtained by the partial processing of the boiler-oriented fuel.

As illustrated in FIG. 6, the boiler-oriented fuel 1 to be treated partially is supplied to the partial processing means (in this case, carbonization means) 2. Then, predetermined amounts of air (or oxygen) 17 and water vapor 18 are added thereto. Then, the partial combustion gasification is performed at a predetermined temperature, at a predetermined pressure, and for a predetermined reaction time. Thus, the distillate 3 is obtained from the top part of the partial combustion gasification processing means 2, while the residue 4 is discharged from the bottom part thereof.

The distillate 3 itself is supplied to the combustion chamber 23 of the gas turbine together with the gas-turbine-oriented fuel 101, and is then mixed with the compressed air 25. Subsequently, this mixture is burned, so that the high-temperature and high-pressure driving combustion gas for driving 27 is generated. Then, the gas turbine is driven by the combustion gas for driving 27. Then, electric power is generated by the generator 24 for the gas turbine, which is mounted on the shaft of the gas turbine. The gas turbine exhaust gas 28 exhausted from the gas turbine is supplied to the boiler 31.

By this method, the gas turbine fuel and the boiler fuel are manufactured by performing the partial processing of an inexpensive fuel, for example, coal. Further, the fuel oil to be urgently treated is utilized as the boiler-oriented fuel 102 which is not subject to the partial processing. In contrast, kerosene, which becomes surplus seasonally, is utilized as a gas-turbine-oriented fuel. Thus, various fuels can be utilized in combination. Moreover, the ability in power generation can be improved only by small investment, in comparison with the cost of increasing the ability of the partial processing means in such a manner as to be able to deal with variation in demands for electric power.

Figure 7:
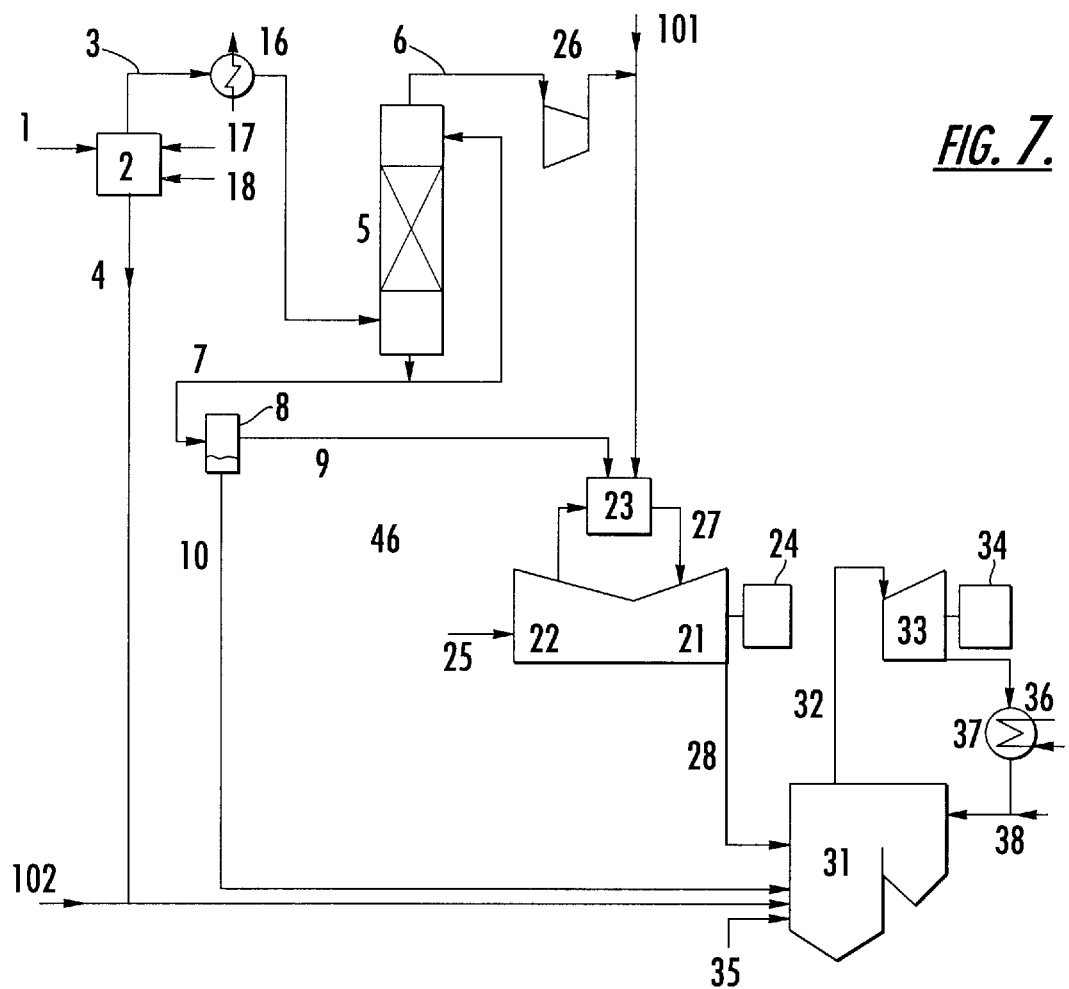
FIG. 7 is a process flow chart for illustrating a process of separating the distillate into a gas component and a liquid component.

FIG. 7 is a process flow chart illustrating the case that the distillate of FIG. 6 is further separated into a gas component and a liquid component.

As illustrated in FIG. 7, the distillate 3 is cooled by the heat exchanger 16, so that the distillate 3 is separated into a gaseous component and a liquid component which are then washed in the gas washing column 5. Thus, the distillate 3 is separated into the gas component 6 and the liquid component 7. Incidentally, the liquid component 7 is used as the cleaning agent to be used in the gas washing column 5. The cleaning agent is supplied to the top part of the gas washing column 5, where vapor-liquid contact can be caused. The gas component 6 is supplied by the gas component compressor 26 to the combustion chamber 23.

Alternatively, the liquid component 7 in the gas washing column 5 may be cooled and then supplied to the top part of the gas washing column 5.

Although the liquid component 7 itself may be used as the gas turbine fuel, only an oil component 9 obtained by separating the water layer 10 therefrom through a separating tank 8 may be used as the gas turbine fuel. The water layer may be added to a fuel for the boiler 31.

Moisture is separated and eliminated from the distillate by this method, so that the gas turbine fuel does not contain the moisture. Thus, the volume of the combustion chamber of the gas turbine can be reduced. Additionally, sodium and potassium salts and inorganic substances such as vanadium hardly mix into a gas turbine fuel. Consequently, a fuel desirable for the gas turbine can be obtained.

Figure 8:
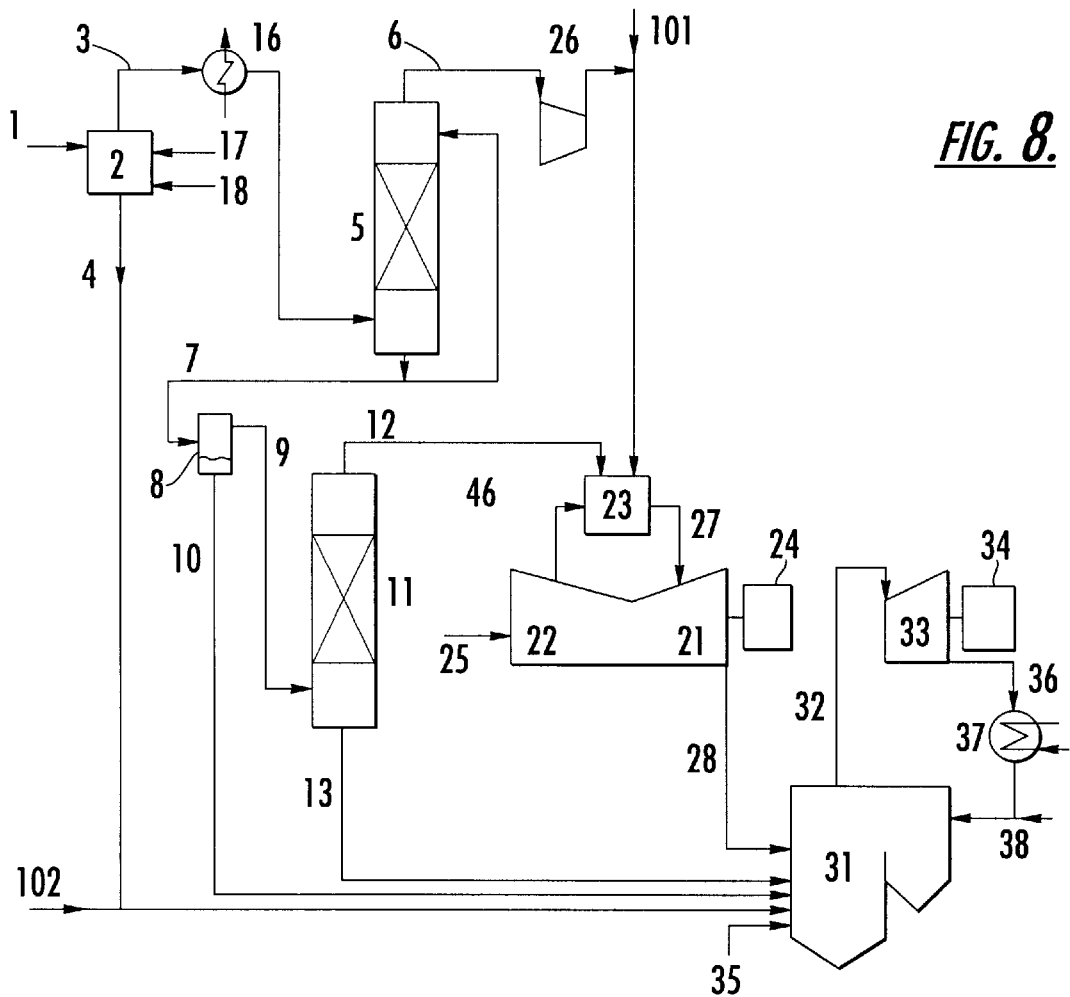
FIG. 8 is a process flow chart for illustrating a process of further distilling an oil component.

As illustrated in FIG. 8, the oil component 9 may be refined by refining means (for instance, distillation). The oil component 9 is supplied to the distilling column 11, in which the oil component 9 is separated into the refined distillate 12 and the residue 13. The refined distillate 12 is supplied to the combustion chamber 23 as the gas turbine fuel. The residue 13 is added to the boiler 31 as a fuel therefor.

This refining (or purification) results in reduction in salt content and in vanadium content. The gas turbine can be fully prevented from being corroded due to the salt content and vanadium content. Consequently, the life of the gas turbine can be further increased.

Further, the produced distillate and residue are used in the aforementioned combined cycle power generation. Furthermore, the produced distillate and residue are partly used in the other external fuel and synthetic raw material. These are included in the basic idea of the present invention.

As above described, in accordance with the present invention, fuels achieve the maximum effects when used in the combined cycle power generation. Thus, it is preferable that the power generation equipment of the present invention is placed in juxtaposition with a facility (not shown) in which the boiler-oriented fuel or a gas-turbine-oriented fuel is obtained, for example, a stope for mining coal, oil or natural gas, a petroleum refining plant, an ironworks, a fermentation facility, waste disposal site and various kinds of chemical plants.

EXAMPLES

Hereunder, operations of the present invention will be described in the following practical examples which are merely illustrative, and the present invention is not to be regarded as limited thereto.

First, practical examples of the carbonization of coal will be described hereinbelow.

Example A-1

High-temperature carbonization of 1000 kg/hr of the following dried coal is performed at a temperature of about 1000° C. by using the apparatus of FIG. 1. As a result, a distillate and coke are obtained.

Raw Material Coal (after dried)
  Moisture Content: 2% by weight
  Volatile Matter: 30% by weight
  Fixed Carbon: 51% by weight
  Ash: 17% by weight
  Calorific Value: 5,780 kcal/kg
Coke
  Production Rate: 550 kg/hr
  Volatile Matter: 2% by weight
  Fixed Coal: 67% by weight
  Ash: 31% by weight
  Calorific Value: 6,300 kcal/kg
Gas Component
  Production Rate: 355 $Nm^3$/hr
  Calorific Value: 5,050 kcal/$Nm^3$
Oil Component
  Production Rate: 57 kg/hr
  Calorific Value: 9,100 kcal/kg The aforementioned distillates (namely, the gas component and the oil component) are supplied to the gas turbine and are burned therein. The gas turbine exhaust gas is at a temperature of about 580° C. and contains about 14% by volume of oxygen. The aforementioned residue (coke) can be burned by supplying the gas turbine exhaust gas to the boiler. Consequently, the efficiency in power generation is increased to 45%.

In contrast, in the case that steam is generated by simply burning the aforementioned coal by means of the boiler, and that electric power is generated by the steam turbine, the efficiency in power generation is 39%.

Example A-2

Low-temperature carbonization of 1,000 kg/hr of the following dried coal is performed at a temperature of about 600° C. by using the apparatus of FIG. 2. As a result, a distillate and char are obtained. The distillate is cooled and washed by a liquid component. Further, a water layer is separated therefrom by the separating tank. Thus, a gas component and an oil component are obtained.

The gas component and the oil component are used as the gas turbine fuel. The coke and the separated water layer in the distillate are used as the boiler fuel.

Raw Material Coal (after dried)
  Moisture Content: 4% by weight
  Volatile Matter: 31% by weight
  Fixed Carbon: 50% by weight
  Ash: 15% by weight
  Calorific Value: 6,430 kcal/kg
Char
  Production Rate: 669 kg/hr
  Volatile Matter: 11% by weight
  Fixed Coal: 65% by weight
  Ash: 24% by weight
  Calorific Value: 6,200 kcal/kg
Gas Component
  Production Rate: 180 $Nm^3$/hr
  Calorific Value: 7,100 kcal/$Nm^3$
Oil Component
  Production Rate: 110 kg/hr
  Calorific Value: 9,100 kcal/kg The aforementioned gas component is supplied to the gas turbine for burning gas, and the oil component is supplied to a gas turbine for burning oil. Then, electric power is generated. The gas turbine exhaust gas is at a temperature of about 580° C. and contains about 13% by volume oxygen. Thus, water vapor is generated by supplying the gas-turbine exhaust gas to the heat recovery boiler. Thereafter, electric power is generated by supplying the char to the boiler by utilizing the heat-recovery-boiler exhaust gas. Consequently, the thermal efficiency in the combined cycle power generation is 46%.

Example A-3

Thermal decomposition carbonization of the coal of Example A-2 is performed at a temperature of about 450° C. by using the apparatus of FIG. 2. As a result, a distillate and a residue are obtained. The distillate is cooled and washed by a liquid component. Further, a water layer is separated therefrom by the separating tank. Thus, a gas component and an oil component are obtained.

The gas component and the oil component are used as the gas turbine fuel. The residue and the separated water layer are used as the boiler fuel. Then, these fuels are burned by supplying air. Sulfur content in each of the gas component and the liquid component is 0.52% by weight. Na content, K content and Vanadium content are 0.5 ppm by weight. Therefore, even when using such a gas turbine fuel, no corrosion of the turbine blade and so on occurs.

Example A-4

Thermal decomposition carbonization of the coal of Example A-1 is performed at a temperature of about 450° C. by using the apparatus of FIG. 3. As a result, a distillate and a residue are obtained. The distillate is cooled and washed by a liquid component. Further, a water layer is separated therefrom by the separating tank. Thus, a gas component and an oil component are obtained. The oil component is separated into a refined distillate and a residual pitch by distillation under reduced pressure.

The gas component and the refined distillate are used as the gas turbine fuel. The residue and the separated water layer are used as the boiler fuel. Then, these fuels are burned by supplying air. Sulfur content in each of the gas component and the liquid component is 0.95% by weight. Salt content and Vanadium content are 0.1 ppm by weight. Therefore, even when using such a gas turbine fuel, no corrosion of the turbine blade and so on occurs for a long time period.

Example A-5

Carbonization (or Dry Distillation) of 1.000 kg of the following dried coal was performed at a temperature of about 500° C. by putting the coal into a flask and then heating the coal from the outside. As a result, a distillate and char were obtained.
Raw Material WANBO Coal (after dried)
  Moisture Content: 3.5% by weight
  Volatile Matter: 33% by weight
  Fixed Carbon: 53.1% by weight
  Ash: 10.4% by weight
  Gross Calorific Value: 7100 kcal/kg
    (Net Calorific Value: 6840 kcal/kg)
Char
  Production Rate: 0.80 kg
  Volatile Matter: 16% by weight
  Fixed Coal: 66% by weight
  Ash: 13% by weight
  Gross Calorific Value: 6,825 kcal/kg
Distillate
  Production Rate: 0.20 kg
  Gross Calorific Value: 8,200 kcal/kg Each of Na content, K content and V content was not larger than 0.5 mg/kg. The ratio between the heating values of the distillate and the residue was nearly 20:80.

Combined cycle power generation can be performed by supplying the distillate and the char to the gas turbine and the boiler, respectively.

However, in the case that the distillate is suppressed and is extracted when the ratio between the heating values of the distillate and the residue is 10:90, an increase in the efficiency in power generation is small even if the combined cycle power generation is performed. Thus, there is little merit in providing a facility for the partial processing of the fuel.

Example A-6

Similarly as in the case of Example A-5, the carbonization of 1.000 kg of the coal was performed at an internal temperature of about 800° C. by putting the coal into a flask and then heating the coal from the outside. As a result, a distillate and coke were obtained.
Coke
  Production Rate: 0.69 kg
  Volatile Matter: 2.6% by weight
  Fixed Coal: 77% by weight
  Ash: 16% by weight
  Calorific Value: 6,650 kcal/kg
Distillate
  Production Rate: 0.31 kg
  Calorific Value: 8,100 kcal/kg The ratio between the heating values of the distillate and the residue was 35:65. Na content, K content and V content in the distillate were 0.5 mg/kg, 2 mg/kg, and 0.5 mg/kg or less, respectively. However, after the distillate was distilled under the atmospheric pressure, each of Na content, K content and V content in the distillate was not more than 0.5 mg/kg.

As can be understood from this example, it was very easy to obtain the distillate, whose heating value is equivalent to the volatile matter in the coal, as a gas turbine fuel for performing the combined cycle power generation advantageously.

Incidentally, very severe conditions are necessary for increasing the distillate so that the ratio between the heating values of the distillate and the residue exceeds 60:40. Moreover, the amount of oxygen contained in the gas turbine exhaust gas exceeds the necessary quantity thereof for burning the exhaust gas again. Consequently, the exhaust-gas loss increases.

Example A-7

Low-temperature carbonization of 100,000 kg/hr of the following dried coal is performed at a temperature of about 500° C. by using the apparatus of FIG. 1. As a result, a distillate and char are obtained. The distillate is used as the gas turbine fuel. The char is used as the boiler fuel.
Raw Material Takashima Coal (dry basis)
  Volatile Matter: 44% by weight
  Fixed Carbon: 50% by weight
  Ash: 6% by weight
  Calorific Value: 7,900 kcal/kg
Char
  Production Rate: 61,600 kg/hr
  Volatile Matter: 1% by weight
  Fixed Coal: 67% by weight
  Ash: 31% by weight
  Calorific Value: 7,054 kcal/kg
Gas Component
  Production Rate: 35,500 Nm$^3$/hr
  Calorific Value: 5050 kcal/Nm$^3$
Oil Component
  Production Rate: 19,400 kg/hr
  Calorific Value: 9100 kcal/kg The aforementioned distillate (namely, the gas component and the oil component) and air (1,075,000 m$^3$/hr) are supplied to the gas turbine, and are burned therein. Then, 129 MW/hr of electric power is generated. The gas-turbine exhaust gas is at a temperature of about 580° C. and contains about 13% by volume oxygen. The aforementioned residue (namely, the char) is burned by supplying the gas-turbine exhaust gas to the boiler. Thereafter, 285 MW/hr of electric power can be generated by the steam turbine. Namely, the thermal efficiency in the power generation is increased to 45%.

In contrast, in the case that the partial processing of the coal is not performed but that the coal is burned simply by the boiler by using the air (1,075,000 m$^3$/hr) and thus steam is generated and the power generation is performed by using the steam turbine, the thermal efficiency in the power generation is 39%.

In the case of the method and apparatus of the present invention, all of the amount (namely, 1,075,000 m$^3$/hr) of the air may be added to the gas turbine. Alternatively, the necessary amount of the air for the boiler combustion may be divided into smaller amounts of air, and thereafter, the smaller amounts of the air may be added to the boiler in sequence.

Second, the microwave irradiation of the coal will be described by showing the following practical examples hereinbelow.

Example B-1

Microwave irradiation of 1,000 kg/hr of the following dried coal is performed at a temperature of about 300° C. by using the apparatus of FIG. 1 (incidentally, hydrocarbon gas is not supplied thereto). As a result, 280 kg/hr of a distillate and 430 kg/hr of char are obtained.

Raw Material Coal
- Moisture Content: 29% by weight
- Volatile Matter: 31% by weight
- Fixed Carbon: 35% by weight
- Ash: 5% by weight
- Calorific Value: 4,530 kcal/kg Char
- Volatile Matter: 11% by weight
- Fixed Coal: 77% by weight
- Ash: 11% by weight
- Calorific Value: 6,000 kcal/kg Distillate
- Calorific Value: 6,960 kcal/kg The distillate is used as the gas turbine fuel, and on the other hand, the char is used as the boiler fuel. Thus, the combined cycle power generation can be performed.

Example B-2

Microwave irradiation of the coal is performed similarly as in the case of Example B-1, except that a methane gas is made to coexist in the apparatus. Thus, a distillate and a residue are obtained.

The distillate is used as the gas turbine fuel, and the char is used as the boiler fuel. The gas-turbine exhaust gas is at a temperature of about 580° C. and contains about 13% by volume oxygen. The char is burned by utilizing this gas turbine exhaust gas. Consequently, the thermal efficiency of the combined cycle power generation reaches 46%.

Therefore, as compared with the case of simply burning coal in the boiler and generating electric power by the steam turbine, the thermal efficiency of this example is high.

Similarly as in the case of A series of the examples, it is very easy to obtain the distillate as a gas turbine fuel for performing the combined cycle power generation advantageously.

Further, in the case that the volume of the distillate to be extracted and the ratio of the heating values of the distillate to the residue is 10:90, an increase in the efficiency in power generation is small even if the combined cycle power generation is performed. Thus, there is a little merit in providing a facility for the partial processing of the fuel.

Furthermore, very severe conditions are necessary for increasing the volumn of the distillate to such an extent that the ratio of the heating values of the distillate to the residue exceeds 60:40. Moreover, the amount of oxygen contained in the gas-turbine exhaust gas exceeds the necessary quantity for burning the exhaust gas again. Consequently, the exhaust-gas loss increases.

Third, the partial water-gas gasification of the coal will be described by showing the following practical examples hereinbelow.

Example C-1

Partial water-gas gasification of 1000 kg/hr of the following coal is performed in the fluid bed gasifier at a temperature of about 830° C. and at a weight ratio of water vapor to coal (water vapor/coal) =0.3 by using the apparatus of FIG. 1. As a result, a distillate and a residue are obtained.

After the dedusting and desulfurization, the distillate is used as the gas turbine fuel by maintaining the high temperature and pressure state thereof. The residue is used as the boiler fuel.

Raw Material Coal
- Moisture Content: 29% by weight
- Volatile Matter: 31% by weight
- Fixed Carbon: 35% by weight
- Ash: 5% by weight
- Calorific Value: 4,530 kcal/kg Residue
- Production Rate: 300 kg/hr
- Volatile Matter: 3% by weight
- Fixed Coal: 80% by weight
- Ash: 17% by weight
- Calorific Value: 5,500 kcal/kg Distillates: Gas Component, Oil Component and Water Gas Component
- Production Rate: 632 Nm$^3$/hr
- Calorific Value:, 2,500 kcal/Nm$^3$ Oil Component
- Production Rate: 200 kg/hr
- Calorific Value: 6,500 kcal/kg Water
- Production Rate: 500 kg/hr The aforementioned distillates (namely, the gas component and the oil component) are supplied to the gas turbine and are burned therein. The gas-turbine exhaust gas is at a temperature of about 580° C. and contains about 13% by volume oxygen. The aforementioned residue is burned by supplying the gas-turbine exhaust gas to the boiler. Consequently, the efficiency of power generation increases to about 45%.

In contrast, in the case that steam is generated by simply burning the aforementioned coal by means of the boiler, and that electric power is generated by the steam turbine, the efficiency of power generation is about 39%.

Example C-2

Partial Water-gas gasification of the coal of Example C-2 is performed by using the apparatus of FIG. 2, similarly as in the case of Example C-1. As a result, a distillate and a residue are obtained. The distillate is cooled and washed by a liquid component after dedusting and desulfurization. Further, a water layer is separated therefrom by the separating tank. Thus, a gas component and an oil component are obtained. Each of Na content, K content and V content is 0.5 ppm or so.

The gas component and the oil component are used as the gas turbine fuel. The residue and the separated water layer are used as the boiler fuel.

Example C-3

Partial water-gas gasification of the coal is performed by using the apparatus of FIG. 3, similarly as in the case of Example C-1. As a result, a distillate and a residue are obtained. The distillate is cooled and washed by a liquid component after dedusting and desulfurization. Further, a water layer is separated by the separating tank. Thus, a gas component and an oil component are obtained. The oil component is separated into a refined distillate and a residual pitch by distillation under reduced pressure.

The gas component and the refined distillate are used as the gas turbine fuel. The residue, the separated water layer and the residual pitch are used as the boiler fuel. Then, these fuels are burned by supplying air. Sulfur content in each of the gas component and the liquid component is 0.52% by weight. Each concentration of Na content, K content and V content is 0.5 ppm by weight. Therefore, even when such a gas turbine fuel is used, no corrosion of the turbine blade and so on occurs for a long time period.

Example C-4

Partial water-gas gasification of the coal is performed by using the apparatus of FIG. 3, similarly as in the case of Example C-1. As a result, a distillate and a residue are obtained. The distillate itself is cooled and washed by a liquid component. Further, a water layer is separated by the separating tank. Thus, a gas component and an oil component are obtained. The oil component is separated into a refined distillate and a residuum by distillation under reduced pressure.

The gas component and the refined distillate are used as the gas turbine fuel. The residue, the separated water layer and the residuum are used as the boiler fuel. Then, these fuels are burned by supplying air. Sulfur content in each of the gas component and the liquid component is 0.95% by weight. Each of Na content, K content and V content is 0.5 ppm by weight. Therefore, even when such a gas turbine fuel is used, no corrosion of the turbine blade and so on occurs.

Example C-5

The distillate obtained in Example C-1 is supplied to the gas turbine, and is then burned therein. The residue is supplied to the boiler. The gas-turbine exhaust gas is at a temperature of 580° C. Further, the exhaust heat is recovered by the heat recovery boiler. Thereby, the thermal efficiency of the power generation is enhanced, in comparison with the case of simply burning the coal in the boiler and generating steam.

Example C-6

The distillate obtained in Example C-2 is supplied to the gas turbine and are then burned therein. The gas-turbine exhaust gas is supplied to the boiler and is at a temperature of about 580° C. and contains about 13% by volume oxygen. The residue is burned by utilizing this gas. Consequently, the thermal efficiency of the combined cycle power generation reaches 46%.

Similarly as in the case of A series of the examples, it is very easy for these examples of C series to obtain the distillate as a gas turbine fuel for performing the combined cycle power generation advantageously.

Further, in the case that the volume of the distillate to be extracted and the ratio of the heating values of the distillate to the residue is 10:90, an increase of the efficiency of power generation is small even if the combined cycle power generation is performed. Thus, there is a little merit in providing a facility for the partial processing of the fuel.

Furthermore, very severe conditions are necessary for increasing the volumn of the distillate to such an extent that the ratio of the heating values of the distillate to the residue exceeds 60:40. Moreover, the amount of oxygen contained in the gas turbine exhaust gas exceeds the necessary quantity for burning the exhaust gas again. Consequently, the exhaust loss increases.

Fourth, the partial combustion gasification of the coal will be described by showing the following practical examples hereinbelow.

Example D-1

First, 1,000 kg/hr of the following coal, 500 kg/hr of high-pressure vapor and 130 kg/hr of oxygen are supplied to the flow bed gasifier, and subsequently, the partial combustion gasification of such coal is performed at a temperature of about 1,100° C. at a pressure of 40 atm by using the apparatus of FIG. 1. As a result, a distillate and a residue are obtained.

Raw Material Coal
    Moisture Content: 25% by weight
    Volatile Matter: 30% by weight (dry basis)
    Fixed Carbon: 51% by weight (dry basis)
    Ash: 17% by weight (dry basis)
    Calorific Value: 5780 kcal/kg (dry basis)
Residue
    Production Rate: 400 kg/hr
    Volatile Matter: 1% by weight
    Fixed Coal: 43% by weight
    Ash: 56% by weight
    Calorific Value: 5000 kcal/kg
Distillates: Gas Component, Oil Component and Water
Gas Component
    Production Rate: 652 $Nm^3$/hr
    Calorific Value: 2600 kcal/$Nm^3$
Oil Component
    Production Rate: 80 kg/hr
    Calorific Value: 8000 kcal/kg
Water
    Production Rate: 550 kg/hr The distillates are dedusted and desulfurized and are then used as the gas turbine fuel in the condition of a high temperature and a high pressure. The residue is used as the boiler fuel. Thus, the combined cycle power generation can be performed.

Example D-2

Partial combustion gasification of the coal is performed by using the apparatus of FIG. 2, similarly as in the case of Example D-1. As a result, a distillate and a residue are obtained. After the distillate is dedusted and desulfurized, the distillate is cooled and washed by a liquid component. Further, a water layer is separated therefrom by the separating tank. Thus, a gas component and an oil component are obtained.

The gas component and the oil component are used as the gas turbine fuel. The residue and the separated water layer in the distillate are used as the boiler fuel.

The obtained distillate is supplied to the gas turbine, and is then burned therein. The gas-turbine exhaust gas is supplied to the boiler. The gas-turbine exhaust gas is at a temperature of about 580° C. and contains about 13% by volume oxygen. The remaining component is burned by utilizing this gas-turbine exhaust gas. Consequently, the thermal efficiency of the combined cycle power generation reaches 46%. Therefore, even when such a gas turbine fuel is used in a gas turbine, no corrosion of the turbine blade and so on occurs.

Example D-3

Partial combustion gasification of the coal is performed by using the apparatus of FIG. 3, similarly as in the case of Example D-1. As a result, a distillate and a residue are obtained. After the distillate is dedusted and desulfurized, the distillate is cooled and washed by a liquid component. Further, a water layer is separated therefrom by the separating tank. Thus, a gas component and an oil component are obtained. The oil component is separated into a refined distillate and a residual pitch by distillation under reduced pressure.

The gas component and the refined distillate are used as the gas turbine fuel. The residue, the separated water layer and the residual pitch are used as the boiler fuel. Then, these fuels are burned by supplying air. Sulfur content in each of the gas component and the liquid component is 0.6% by weight. Each of Na content, K content and V content is 0.5 ppm by weight. Therefore, even when such a gas turbine fuel is used in a gas turbine, no corrosion of the turbine blade and so on occurs for a long time period.

Example D-4

The distillate obtained in Example D-1 is supplied to the gas turbine, and is then burned therein. The residue is supplied to the boiler. The gas-turbine exhaust gas is at a temperature of 580° C. Further, steam is generated by the exhaust-heat recovery boiler. Thus, electric power is generated by the steam turbine.

Similarly as in the case of A series of the examples, it is very easy for these examples of D series to obtain the distillate as a gas turbine fuel for performing the combined cycle power generation advantageously.

Further, in the case that the volume of the distillate to be extracted and the ratio of the heating values of the distillate to the residue is 10:90, an increase of the efficiency of power generation is small even if the combined cycle power generation is performed. Thus, there is a little merit in providing a facility for the partial processing of the fuel.

Furthermore, very severe conditions are necessary for increasing the distillate to such an extent that the ratio of the heating values of the distillate to the residue exceeds 60:40. Moreover, the amount of oxygen contained in the gas-turbine exhaust gas exceeds the necessary quantity thereof for burning the exhaust gas again. Consequently, the exhaust-gas loss increases.

Fifth, the thermal decomposition of heavy oil will be described by showing the following practical examples hereinbelow.

Example E-1 (Using Visbreaking Method)

First, 1000 kg/hr of the following heavy oil is supplied to a heating furnace during pressurized. Then, the thermal decomposition of the heavy oil is performed at a temperature of 480° C. Subsequently, a side reaction is stopped by adding quenching oil to the heater. Thereafter, the heavy oil is supplied to the bottom part of a distilling column, so that a distillate and a residue are obtained.

Raw Material Heavy Oil: Iranian Light Residual Oil under Reduced Pressure
  Specific Gravity: 1.01 (15/4° C.)
  Viscosity: 100,000 cSt (50° C.)
  Sulfur content: 3.6% by weight Residue
  Production Rate: 665 kg/hr
  Specific Gravity: 1.03 (15/4° C.)
  Viscosity: 45,000 cSt (50° C.)
  Sulfur Content: 3.9% by weight
  Percentage Content of Materials
Having High Boiling Point
  (≧350° C.): 78.5% by weight
  Calorific Value: 9000 kcal/kg
Distillates: Gas Component and Oil Component
  Gas Component
  Production Rate: 35 kg/hr
  Calorific Value: 10,400 kcal/Nm³
Oil Component
  Production Rate: 300 kg/hr
  Calorific Value: 10,000 kcal/kg The distillates are supplied to the gas turbine and are burned therein. The gas-turbine exhaust gas is supplied to the boiler and is at a temperature of about 580° C. and contains about 13% by volume of oxygen. The residue is burned by using this gas. Consequently, the thermal efficiency of combined cycle power generation reaches 46%.

As compared with the fact that the thermal efficiency of power generation is about 40% when steam is generated by simply supplying the heavy oil to the boiler and electric power is generated by the steam turbine, the present invention enhances the thermal efficiency of power generation considerably.

Example E-2 (Using Fluid Coking Method)

First, 1000 kg/hr of the following heavy oil is supplied to a reactor. Then, the thermal decomposition of the heavy oil is performed at a temperature of 500° C. and is separated into a distillate and a residue. Subsequently, the residue extracted from the bottom part of the reactor is supplied to the burner chamber. Then, air is blown into this chamber and the residue is heated. A part of coke is extracted from a middle part of the burner chamber. Further, the remaining coke is circulated from the bottom part of the burner chamber to the reactor.

Raw Material Heavy Oil: Residual Oil under Reduced Pressure at Temperature ≧566° C.
Condorason Carbon Residue: 26.5% by weight
  Specific Gravity: 1.05 (15/4° C.)
  Vanadium Content: 890 ppm by weight
  Sulfur content: 3.6% by weight
Residue
  Production Rate of Coke: 260 kg/hr
  Sulfur Content: 5% by weight
  Calorific Value: 6000 kcal/kg
Distillates: Gas Component and Oil Component
Reactor Gas Component
  Production Rate: 130 kg/hr
  Calorific Value: 10,400 kcal/Nm³
Oil Component (Naphtha and Light Oil)
  Production Rate: 540 kg/hr
  Calorific Value: 10,000 kcal/kg All of the gas component of the distillates and a part of the oil component thereof are used as the gas turbine fuels. The rest of the oil component and the residue are used as the boiler fuels.

Example E-3 (Using Delayed Coking Method)

First, 1000 kg/hr of the following heavy oil is supplied to the bottom part of a distilling column. Then, the heavy oil is separated into a distillate and a residue (namely, a high boiling liquid). Subsequently, the residue extracted from the bottom part of the distilling column undergoes the thermal decomposition at a temperature of 470° C. in a heating furnace to such an extent that no coke content is caused. Then, the residue is supplied to a coke drum. Thereafter, the residue is separated into the distillate and the residue (namely, coke). This residue is further separated into a gas component and an oil component.

Raw Material Heavy Oil: Minas Residual Oil under Reduced Pressure

Residual Carbon: 10.9% by weight

Specific Gravity: 0.939 (15/4° C.)

Sulfur content: 0.16% by weight

Residue

Production Rate of Coke: 191 kg/hr

Sulfur Content: 0.4% by weight

Calorific Value: 6000 kcal/kg

Distillates: Gas Component and Oil Component

Gas Component

Production Rate: 70kg/hr (10 mol % of hydrogen, 36 mol % of methane, 18 mol % of ethane, 18 mol % of ethylene, 21 mol % of propane, 21 mol % of propylene, 15 mol % of butane and 15 mol % of butene)

Calorific Value: 10,400 kcal/Nm$^3$

Oil Component (Naphtha and Light Oil)

Production Rate: 739 kg/hr

Calorific Value: 10,000 kcal/kg

All of the gas component of the distillates and a part of the oil component thereof are used as the gas turbine fuels. The rest of the oil component and the residue are used as the boiler fuels.

Example E-4 (Using EUREKA Method)

First, 1000 kg/hr of the following heavy oil is supplied to the bottom part of a distilling column. Then, the heavy oil is separated into a distillate and a residue (namely, a high boiling point liquid). Subsequently, the residue extracted from the bottom part of the distilling column undergoes the thermal decomposition at a temperature of 400° C. in a heater to the extent that no coke content is caused. Then, the residue is supplied to a reactor. Thereafter, the thermal decomposition of the residue is further performed for two hours by blowing steam into the reactor. Subsequently, the distillate obtained from the reactor is added to the aforesaid distilling column and is separated into the distillate and the residue. Upon completion of cooling, a pitch is exhausted from the bottom part of the reactor. The pitch is cut into flake-like pieces which are used as boiler fuels. The distillate is further separated into a gas component, condensed water and an oil component. Furthermore, the oil component is separated into a light oil component and heavy oil component. The gas component and the light oil component are used as the gas turbine fuel, while the heavy oil component and the pitch are used as the boiler fuel.

Raw Material Heavy Oil: Residual Oil under Reduced Pressure at Temperature ≧500° C.

Residual Carbon: 20% by weight

Specific Gravity: 1.017 (15/4° C.)

Vanadium Content: 200 ppm by weight

Sulfur content: 3.9% by weight

Residue

Production Rate of Pitch: 290 kg/hr

Vanadium Content: 690 ppm by weight

Sulfur Content: 5.7% by weight

Calorific Value: 9000 kcal/kg

Distillates: Gas Component, Condensed water and Oil Component

Gas Component

Production Rate: 90 kg/hr (Sulfur Content 13% by weight)

Calorific Value: 10,400 kcal/Nm$^3$

Oil Component (Light Oil Component and Heavy Oil Component)

Production Rate of Light Oil Component: 220 kg/hr

Calorific Value thereof: 10,000 kcal/kg

Production Rate of Heavy Oil Component: 400 kg/hr

Calorific Value thereof: 9000 kcal/kg

All of the gas component, and the light oil component of the distillates are supplied to the gas turbine as the fuels therefor. Further, electric power is generated by using the gas turbine. The heavy oil component and the pitch of the residue are used as the boiler fuel to produce steam. Furthermore, electric power is generated by using the steam turbine.

Example E-5

Thermal decomposition of the heavy oil is performed, similarly as in the case of Example E-1. As a result, a distillate and a residue are obtained. After the distillate is desulfurized, the distillate is cooled and separated, and a gas component and an oil component are obtained.

The gas component is supplied to a gas turbine for burning gas, and the oil component is supplied to a gas turbine for burning oil. Thus, the power generation is performed. The residue is used as the boiler fuel and is burned by supplying air thereto. Sulfur content in each of the gas component and the liquid component is 1% by weight. A sum of Na content and K content is not more than 0.5 ppm by weight. Further, a vanadium content is not more than 0.5 ppm by weight. Therefore, in the case of both of the gas turbine for burning gas as well as in the case of the gas turbine for burning oil, no corrosion of the turbine blade and so on occurs.

Example E-6

The distillate obtained in Example E-1 is supplied to the gas turbine and is then burned therein. The residue is supplied to the boiler. The gas-turbine exhaust gas is at a temperature of 580° C. Further, steam is generated by the heat recovery boiler. Thus, electric power is generated by the steam turbine.

Example E-7 (Contact Coking of Bitumen)

First, 1000 kg/hr of the following raw material is heated by a coil heater, so that the raw material is brought into a fluid state. Then, the raw material is supplied to the reactor. Subsequently, the thermal decomposition of the raw material is performed at a temperature of 480° C. and is separated into a distillate and a residue. Subsequently, the residue (adhering onto a seed coke) extracted from the bottom part of the reactor is supplied to a heater chamber. Then, air is blown into this chamber and the residue is heated. A part of the heated coke is circulated from the bottom part of the heater chamber to the reactor. Further, a part of the coke is extracted from the middle part of the heater chamber.

Raw Material Dry Tar: Great Canadian Oil Sand Bitumen

Ramsbottom Carbon Residue: 11% by weight

Specific Gravity: 1.016 (20/4° C.)
Viscosity: 11,000 cSt (38° C.)
Vanadium Content: 140 ppm by weight
Sulfur Content: 4.7% by weight
Residue
  Production Rate of Pitch Coke: 650 kg/hr
  Sulfur Content: 6% by weight
  Calorific Value: 9000 kcal/kg
Distillates: Gas Component and Oil Component
Reactor Gas Component
  Production Rate: 30 kg/hr
  Calorific Value: 10400 kcal/Nm$^3$
Oil Component (Light Oil and Diesel Heavy Oil)
  Production Rate: 320 kg/hr
  Calorific Value: 10,000 kcal/hr
  The distillates are used as the gas turbine fuels. The residue is used as the boiler fuels.

Example E-8 (Visbreaking Method of Fuel Oil C)

First, 1000 kg/hr of the following heavy oil is supplied at a pressure of 20 kg/cm$^2$G to a heater. Then, the thermal decomposition of the heavy oil is performed at a temperature of 500° C. Subsequently, a side reaction is stopped by adding quenching oil to the heater. Thereafter, the heavy oil is supplied to the bottom part of a distilling column, so that a distillate and a residue (namely, high-viscosity liquid) at 290° C. are obtained.
Raw Material Heavy Oil: Fuel Oil C #2
  Flash Point: 80° C.
  Viscosity: 100 cSt (50° C.)
  Sulfur Content: 1.5% by weight
  Calorific Value: 9,400 kcal/kg
Residue
  Production Rate: 670 kg/hr
  Sulfur Content: 2.1% by weight
  Calorific Value: 9,000 kcal/kg
Distillates: Oil Component
Oil Component
  Production Rate: 330 kg/hr
  Specific Gravity: 0.80 (15/4° C.)
  Calorific Value: 10,212 kcal/kg
  The distillate is used as the gas turbine fuel, and the residue is used as the boiler fuel.

Example E-9 (Atmospheric Pressure Thermal Decomposition of Fuel Oil C)

First, 1.000 kg of the following heavy oil was performed at a temperature of about 450° C. by putting the heavy oil into a flask and then heating the heavy oil from the outside. Further, the thermal decomposition of at the atmosphere pressure was performed in a batch manner. As a result, a distillate and a residue (namely, high-viscosity liquid) were obtained at a temperature of 206° C.
Raw Material Fuel Oil C (IFO-280 manufactured by
  Mitsubishi Oil Co., Ltd.)
  Flash Point: 111° C.
  Viscosity: 278 cSt (50° C.)
  Sulfur Content: 2.35% by weight
  Nitrogen Content: 0.20% by weight
  Carbon Residue: 8.88% by weight
  Na Content: 12.6 ppm by weight
  K Content: 0.1 ppm by weight
  V Content: 32.6 ppm by weight
  Gross Calorific Value: 9800 kcal/kg
Residue
  Production Rate: 0.55 kg
  Sulfur Content: 3.1% by weight
  Nitrogen Content: 0.34% by weight
  Carbon Residue: 16% by weight
  Na Content: 23 ppm by weight
  K Content: 0.2 ppm by weight
  V Content: 59 ppm by weight
  Gross Calorific Value: 9,170 kcal/kg
Distillate: Oil Component
Oil Component
  Production Rate: 0.45 kg
  Sulfur Content: 1.4% by weight
  Nitrogen Content: 0.01% by weight
  Carbon Residue: 0.07% by weight
  Na Content: 0.1 ppm by weight
  K Content: 0.1 ppm by weight
  V Content: 0.1 ppm by weight
  Gross Calorific Value: 10,570 kcal/kg
  The oil component is suited to the gas turbine fuel, and the residue can be used as the boiler fuel. Further, the amount of the oil component and that of the residue are commensurate with the amount of the fuel for the exhaust gas re-burning combined cycle power generation.

Example E-10 (Atmospheric Pressure Thermal Decomposition of Fuel Oil C)

Similarly as in the case of Example E-9, the thermal decomposition of 1.000 kg of the heavy oil of Example E-9 was performed at a temperature of 450° C. at the atmospheric pressure in a match manner. As a result, a distillate and a residue (namely, a dried-up substance) at a temperature of 218° C. were obtained. Even if the residue is further heated, the amount of the distillate is reduced considerably.
Residue
  Production Rate: 0.35 kg
  Sulfur Content: 0.7% by weight
  Nitrogen Content: 0.36% by weight
  Carbon Residue: 1% by weight
  Na Content: 36 ppm by weight
  K Content: 0.3 ppm by weight
  V Content: 93 ppm by weight
  Gross Calorific Value: 9,130 kcal/kg
Distillate: Oil Component
Oil Component
  Production Rate: 0.65 kg
  Sulfur Content: 1.4% by weight
  Nitrogen Content: 0.01% by weight
  Carbon Residue: 0.07% by weight
  Na Content: 0.5 ppm or less by weight
  K Content: 0.5 ppm or less by weight
  V Content: 0.5 ppm or less by weight
  Gross Calorific Value: 10,160 kcal/kg
  The oil component is suitable for the gas turbine fuel, and the residue is a dried-up substance. Further, very severe conditions are necessary for obtaining more distillate. The cost of equipment therefor becomes excessive. Thus, actually, the amount of the distillate is suppressed, namely, the weight of the distillate is limited to 60% by weight or so (namely, to the extent that the ratio of the heating values of the distillate to the residue is 60% :40%). Thus, the residue can be transported to the boiler during the residue is in a fluid state. The oil component and the residue, the heating-value ratio of them being adjusted to an appropriate value, are suitable for the exhaust gas re-burning combined cycle power generation.

Example E-11 (Atmospheric Pressure Thermal Decomposition of Orimulsion)

Similarly as in the case of Example E-9, the thermal decomposition of 1.000 kg of the following dried orimulsion was performed at a temperature of 450° C. at the atmospheric pressure in a batch manner. As a result, a distillate and a residue (namely, a dried-up substance) at a temperature of 282° C. were obtained.

Raw Material: Orimulsion (Dry Basis)
  Sulfur Content: 3.51% by weight
  Nitrogen Content: 0.89% by weight
  Carbon: 84.9% by weight
  Na Content: 104 ppm by weight
  K Content: 4 ppm by weight
  V Content: 444 ppm by weight
  Gross Calorific Value: 9,820 kcal/kg
Residue
  Production Rate: 0.35 kg
  Sulfur Content: 4.9% by weight
  Nitrogen Content: 1.9% by weight
  Carbon: 86% by weight
  Na Content: 400 ppm by weight
  K Content: 6 ppm by weight
  V Content: 1590 ppm by weight
  Gross Calorific Value: 8,850 kcal/kg
Distillate: Oil Component
Oil Component
  Production Rate: 0.65 kg/hr
  Sulfur Content: 2.8% by weight
  Nitrogen Content: 0.23% by weight
  Carbon: 84% by weight
  Na Content: 0.1 ppm by weight
  K Content: 0.1 ppm or less by weight
  V Content: 0.3 ppm by weight
  Gross Calorific Value: 10,340 kcal/kg The oil component is suited to the gas turbine fuel, and the residue has properties by which the residue can be used as the boiler fuel. This example reveals that there is a limit (for instance, 70% or so) to the range of the heating-value ratio at which the oil suited to the gas turbine can be easily obtained. Further, in this case, in view of the extraction of the residue and the efficiency of the exhaust gas re-burning, the distillate may be extracted at a further lower heating-value ratio.

Example E-12 (Atmospheric Pressure Thermal Decomposition of Fuel Oil C)

First, the thermal decomposition of 100,000 kg/hr of the following heavy oil is performed at a temperature of about 450° C. and at the atmospheric pressure by using the apparatus of FIG. 1, so that a distillate and a residue (namely, high-viscosity liquid) at a temperature of 206° C. are obtained.

Raw Heavy Material: Fuel Oil C (ISO-280 manufactured by Mitsubishi Oil Co., Ltd.)
  Flash Point: 111° C.
  Viscosity: 278 cSt (50° C.)
  Sulfur Content: 2.35% by weight
  Nitrogen Content: 0.20% by weight
  Carbon Residue: 8.88% by weight
  Na Content: 12.6 ppm by weight
  K Content: 0.1 ppm by weight
  V Content: 32.6 ppm by weight
  Gross Calorific Value: 9,800 kcal/kg
Residue
  Production Rate: 58,480 kg
  Sulfur Content: 3.1% by weight
  Nitrogen Content: 0.34% by weight
  Carbon Residue: 16% by weight
  Na Content: 23 ppm by weight
  K Content: 0.2 ppm by weight
  V Content: 59 ppm by weight
  Gross Calorific Value: 9,170 kcal/kg
Distillate: Oil Component
Oil Component
  Production Rate: 41,520 kg/hr
  Sulfur Content: 1.4% by weight
  Nitrogen Content: 0.01% by weight
  Carbon Residue: 0.07% by weight
  Na Content: 0.5 ppm by weight or less
  K Content: 0.5 ppm by weight or less
  V Content: 0.5 ppm by weight or less
  Gross Calorific Value: 10,570 kcal/kg Further, 169 MW/hr of electric power is generated by supplying 41,520 kg/hr of the oil component and 1,190,000 m$^3$/hr of air, which are obtained as above described, to the gas turbine. The gas-turbine exhaust gas is at a temperature of about 580° C., contains about 13% by volume oxygen, and is supplied to the boiler where the remaining component is burned. Thus, 366.6 MW/hr of electric power can be generated. Consequently, the thermal efficiency of power generation by using the heavy oil according to the present invention is 47%.

On the other hand, in the case of burning the heavy oil simply by using a boiler, 455.3 MW/hr of electric power can be generated by supplying 1,190,000 m$^3$/hr of air to 100,000 kg/hr of the heavy oil. The thermal efficiency of power generation in this case is 40%.

In the case of this example according to the present invention, the power generation can be achieved by supplying all of the amount (1,190,000 m$^3$/hr) of air to the gas turbine, or alternatively, by dividing the amount of air, which is needed for the combustion in the boiler, into smaller quantities of air and supplying the smaller quantities of air to the boiler in sequence.

As can be understood from these examples, it is very easy to obtain the distillate as a gas turbine fuel for performing the combined cycle power generation advantageously.

Further, in the case that the volumn of the distillate is suppressed and the ratio of the heating values of the distillate to the residue is 10:90, an increase of the efficiency in power generation is small even if the combined cycle power generation is performed. Thus, there is a little merit in providing a facility for the partial processing of the fuel.

Incidentally, an amount of the distillate can increase until the ratio of the heating values of the distillate to the residue is increased to 70:30. However, the extraction of the residue becomes more difficult when the ratio is more than 60:40. Moreover, the amount of oxygen contained in the gas-turbine exhaust gas exceeds the necessary quantity thereof for the exhaust gas re-burning. Consequently, the exhaust-gas loss increases.

Sixth, the partial combustion gasification of a mixture of coal and heavy oil will be described by showing the following practical examples hereinbelow.

Example F-1

First, 1000 kg/hr of the following mixture of coal and heavy oil, 800 kg/hr of steam having a temperature of 260° C. and 735 Nm$^3$/hr of oxygen are supplied to the gasifier, and subsequently, the partial combustion gasification is performed at a temperature of about 1400° C. at a pressure of 40 atm by using the apparatus of FIG. 1. As a result, a distillate and a residue are obtained.

Coal
- Moisture Content: 25% by weight
- Volatile Matter: 30% by weight (dry basis)
- Fixed Carbon: 51% by weight (dry basis)
- Ash: 17% by weight (dry basis)
- Calorific Value: 5780 kcal/kg (dry basis)
- Supply Rate of Coal: 500 kg/hr
- Heavy Oil: Fuel Oil C #2
- Flash Point: 80° C.
- Viscosity: 100 cSt (50° C.)
- Sulfur Content: 1.5% by weight
- Calorific Value: 9,400 kcal/kg
- Supply Rate of Heavy Oil: 500 kg/hr Residue
- Production Rate: 600 kg/hr
- Volatile Matter: 1% by weight
- Fixed Coal: 67% by weight
- Ash: 32% by weight
- Calorific Value: 4000 kcal/kg Distillates: Gas Component, Oil Component and Water Gas Component
- Production Rate: 1600 Nm$^3$/hr
- Calorific Value: 2500 kcal/Nm$^3$ Oil Component
- Very Little
- Production Rate: 20 kg/hr
- Calorific Value: 9800 kcal/kg Water
- Production Rate: 300 kg/hr The obtained distillates are supplied to the gas turbine and are burned therein. The gas-turbine exhaust gas is supplied to the boiler, is at a temperature of about 580° C. and contains about 13% by volume oxygen. The residue is burned by using this gas. Consequently, the thermal efficiency of the combined cycle power generation reaches 46%

On the other hand, all of the amount of the boiler-oriented fuel is gasified and then, electric power is generated by using the gas turbine. Further, steam is generated from the gas-turbine exhaust gas by the heat recovery boiler. Further, in the case that the combined cycle power generation is performed, the thermal efficiency is about 46%. However, in the case of the conventional apparatus by which all of the amount of the fuel is gasified, special gas turbine and boiler systems are necessary and thus the building cost of such a conventional apparatus is high. In contrast, the building cost of the apparatus of the present invention is low. In the case of modifying the existing facility, the conventional boiler can be utilized. Furthermore, the gasification of the full amount of the fuel, and the processing or treatment of ash is difficult. The gas purification should be performed at a low temperature. Consequently, heat loss is large.

Example F-2

Partial combustion gasification of the mixture of the coal and the heavy oil is performed by using the apparatus of FIG. 2, similarly as in the case of Example F-1. As a result, a distillate and a residue are obtained. After the distillate is dedusted and desulfurized, the distillate is cooled and washed by a liquid component. Further, a water layer is separated therefrom by the separating tank. Thus, a gas component and an oil component are obtained.

The gas component and the oil component are supplied to the gas turbine fuel. The residue and the separated water layer in the distillate are supplied to the boile. Thus, the combined cycle power generation can be performed.

Example F-3

Partial combustion gasification of the mixture of the coal and the heavy oil is performed by using the apparatus of FIG. 3, similarly as in the case of Example F-1. As a result, a distillate and a residueiare obtained. After the distillate is dedusted and desulfurized, the distillate is cooled and washed by a liquid component. Further, a water layer is separated therefrom by the separating tank. Thus, a gas component and an oil component are obtained. The oil component is separated into a refined distillate and a residual pitch by distillation under reduced pressure.

The gas component and the refined distillate are used as the gas turbine fuel. The residue, the separated water layer and the residual pitch are used as the boiler fuel. Then, these fuels are burned by being supplied with air. Sulfur content in each of the gas component and the liquid component is 0.6% by weight. Each of Na content, K content and V content is not more than 0.5 ppm by weight. Therefore, no corrosion of the turbine blade occurs.

Example F-4

Partial combustion gasification of the mixture of the coal and the heavy oil is performed by using the apparatus of FIG. 3, similarly as in the case of Example F-1. As a result, a distillate and a residue are obtained. After the distillate is dedusted and desulfurized, the distillate is cooled and washed by a liquid component. Further, a water layer is separated therefrom by the separating tank. Thus, a gas component and an oil component are obtained. The oil component is separated into a refined distillate and a residue by distillation under reduced pressure.

The gas component and the refined distillate are used as the gas turbine fuel. The residue, the separated water layer and the residual pitch are used as the boiler fuel. Then, these fuels are burned by being supplied with air. Sulfur content in each of the gas component and the liquid component is 1.0% by weight. Each of Na content, K content and V content is not more than 0.5 ppm by weight. Therefore, no corrosion of the turbine blade occurs.

Example F-5

The distillate obtained in Example F-1 is supplied to the gas turbine and is then burned therein by using the apparatus of FIG. 1. The residue is supplied to the boiler. The gas-turbine exhaust gas is at a temperature of 580° C. Further, the recovery of heat is performed by the heat recovery boiler.

Example F-6

First, 1000 kg/hr of the mixture of coal of Example F-1 and heavy oil described below, 500 kg/hr of high-pressure vapor (or steam) and 130 Nm$^3$/hr of oxygen are supplied to the flow bed gasifier, and subsequently, the partial combustion gasification of such coal is performed at a temperature of about 1100° C. at a pressure of 30 atm by using the apparatus of FIG. 1. As a result, a distillate and a residue are obtained.

Coal
    Moisture Content: 25% by weight
    Volatile Matter: 30% by weight (dry basis)
    Fixed Carbon: 51% by weight (dry basis)
    Ash: 17% by weight (dry basis)
    Calorific Value: 5780 kcal/kg (dry basis)
Supply Rate of Coal: 400 kg/hr
Heavy Oil: Iranian Light Residual Oil under Reduced Pressure
    Specific Gravity: 1.01 (15/4° C.)
    Viscosity: 100,000 cSt (50° C.)
    Sulfur Content: 3.6% by weight
    Supply Rate of Heavy Oil: 600 kg/hr
Residue
    Production Rate: 300 kg/hr
    Volatile Matter: 3% by weight
    Fixed Coal: 74% by weight
    Ash: 23% by weight
    Calorific Value: 4800 kcal/kg
Distillates: Gas Component, Oil Component and Water
Gas Component
    Production Rate: 1500 Nm$^3$/hr
    Calorific Value: 2600 kcal/Nm$^3$
Oil Component
    Production Rate: 80 kg/hr
    Calorific Value: 8000 kcal/kg
Water
    Production Rate: 250 kg/hr The distillates are dedusted and desulfurized, and used as the gas turbine fuel by maintaining the high temperature and the high pressure thereof. The residue is used as the boiler fuel. Thus, the combined cycle power generation is performed.

As can be understood from the example, it is very easy to obtain these distillates as a gas turbine fuel for performing the combined cycle power generation advantageously.

Further, in the case that the volume of the distillate is suppressed and the ratio of the heating values of the distillate to the residue is 10:90, an increase of the efficiency of power generation is small even if the combined cycle power generation is performed. Thus, there is little merit in providing a facility for the partial processing of the fuel.

Moreover, although it depends upon the mixing ratio of the coal to the heavy oil, an amount of the distillate can be increased until the ratio of the heating values of the distillate to the residue is increased to 70:30 or so. However, the extraction of the residue becomes more difficult when the ratio is more than 60:40. Furthermore, the amount of oxygen contained in the gas-turbine exhaust gas exceeds the necessary quantity thereof for the exhaust gas reburning. Consequently, the exhaust-gas loss increases.

Seventh, examples using various kinds of the boiler-oriented fuels will be described hereinbelow.

Example G-1

In the apparatus of FIG. 4, 56,000 kg/hr of kerosene, which is excessive in summer season, is used as the gas-turbine-oriented fuel. Further, 92,800 kg/hr of the following heavy oil, which cannot be used as the boiler-oriented fuel, is used.

The gas-turbine exhaust gas is at a temperature of about 580° C. and contains about 13% by volume oxygen. The boiler-oriented fuel can be burned by using only this exhaust gas. Consequently, the thermal efficiency of power generation reaches 46%.

Kerosene: #1
    Flash Point: 40° C. or higher
    95% Distillation Temperature: 270° C. or lower
    Calorific Value: 10,500 kcal/kg (HHV basis)
Heavy Oil: Iranian Light Residual Oil under Reduced Pressure
    Specific Gravity: 1.01 (15/4° C.)
    Viscosity: 100,000 cSt (50° C.)
    Sulfur Content: 3.6% by weight Example G-2

9505 kg/hr of Kerosene used in Example G-1 is employed as the gas-turbine-oriented fuel in the apparatus of FIG. 8 (incidentally, the boiler-oriented fuel designated by reference numeral 102 is not employed). Further, the low-temperature carbonization of 220,400 kg/hr of the following dried coal is performed at a temperature of about 600° C. As a result, a distillate and char are obtained. The distillate is cooled and washed by a liquid component. Further, a water layer is separated therefrom by the separating tank. Thus, a gas component and an oil component are obtained.

The oil component is separated into a refined distillate and a residual pitch by distillation under reduced pressure.

The gas component and the refined distillate are used as the gas-turbine-oriented fuel, together with kerosene. The residue, the separated water layer and the residual pitch are supplied to the boiler as the boiler fuel, together with coal. Then, these fuels are burned by supplying air. Sulfur content in each of the gas component and the liquid component is 0.52% by weight. Each of salt content and V content is 0.5 ppm by weight. Therefore, a gas-turbine-oriented fuel can be used in an operation for a long time period, for example, 8000 hours. Moreover, no corrosion of the turbine blade and so on occurs Raw Material Coal (after dried)
    Moisture Content: 4% by weight
    Volatile Matter: 31% by weight
    Fixed Carbon: 50% by weight
    Ash: 15% by weight
    Calorific Value: 6430 kcal/kg
Char
    Production Rate: 193,100 kg/hr
    Volatile Matter: 11% by weight
    Fixed Coal: 65% by weight
    Ash: 24% by weight
    Calorific Value: 6700 kcal/kg
Gas Component
    Production Rate: 18,000 Nm$^3$/hr
    Calorific Value: 7100 kcal/Nm$^3$ Oil Component
  Production Rate: 11,000 kg/hr
  Calorific Value: 9110 kcal/kg

Example G-3

The apparatus of FIG. 5 is used. Further, 36,050 kg/hr of the following coal used in Example G-2 is employed as the boiler-oriented fuel. Moreover, 135,800 kg/hr of the following heavy oil is used as the boiler-oriented fuel for thermal decomposition.

The heavy oil is supplied to a heating furnace during pressurized. Then, the thermal decomposition of the heavy oil is performed at a temperature of 500° C. Subsequently, a side reaction is stopped by adding quenching oil to the heating furnace. Thereafter, the heavy oil is supplied to the bottom part of a distilling column, and a distillate and a residue are obtained.

The distillate is desulfurized and is used as a gas-turbine-oriented fuel while keeping a high temperature and a high pressure. The remaining component may be used as a boiler fuel together with coal.

Raw Material Heavy Oil: Iranian Light Residual Oil under Reduced Pressure
  Specific Gravity: 1.01 (15/4° C.)
  Viscosity: 100,000 cSt (50° C.)
  Sulfur content: 3.6% by weight
Residue
  Production Rate: 75,369 kg/hr
  Specific Gravity: 1.03 (15/4° C.)
  Viscosity: 45,000 cSt (50° C.)
  Sulfur Content: 3.9% by weight
  Percentage Content of Materials
Having High Boiling Point
  ($\geq 350°$ C.): 78.5% by weight
  Calorific Value: 9000 kcal/kg
Distillates: Gas Component and Oil Component
Gas Component
  Production Rate: 5,433 ; $Nm^3$/hr
  Calorific Value: 10,125 kcal/$Nm^3$
Oil Component
  Production Rate: 54,320 kg/hr
  Calorific Value: 10,000 kcal/kg

Example G-4 (Utilizing Coal, Thermal Decomposition of Heavy Oil, and Kerosene)

The apparatus of FIG. 6 is used. Further, 15,500 kg/hr of kerosene used in Example G-1 is employed as the gas-turbine-oriented fuel, and 100,000 kg/hr of coal used in Example G-2 is employed as the boiler-oriented fuel. Moreover, 99,520 kg/hr of the heavy oil is used as the boiler-oriented fuel for thermal decomposition.

The gas-turbine exhaust gas is at a temperature of about 580° C. and contains about 13% by volume of oxygen. The residue and the boiler-oriented fuel can be burned by using only this exhaust gas. Consequently, the thermal efficiency of power generation reaches 46%.

Example H-1 (Combined Cycle Power Generation Performed by Power Generation Apparatus Placed in Juxtaposition with Oil Refining Plant)

The power generation apparatus of FIG. 4 is placed in juxtaposition with an oil refining plant which uses 15,900 kl/day (13,674 t/day) of crude oil as a raw material.

The crude is completely treated. The following products are obtained from the oil refining plant.
  Gas: 250,000 $Nm^3$/day
  LPG: 450 t/day
  Petrochemical Naphtha: 680 t/day
  Gasoline: 2,750 t/day
  Jet Fuel: 700 t/day
  Kerosene: 1,350 t/day
  Diesel Light Oil: 2,300 t/day
  Sum of Fuel Oil A, B and C: 3,000 t/day
  Residual Oil under Reduced Pressure: 1,500 t/day
  Asphalt: 300 t/day
  Petroleum Coke and Pitch: 400 t/day Among these products, 41.9 t/hr of the diesel light oil is supplied to the g as turbine as the gas-turbine-oriented oil. Further, 86 t/hr of the residual oil under reduced pressure is supplied to the boiler as the boiler-oriented oil.

The gas turbine exhaust gas is at a temperature of about 580° C. and contains about 13% by volume of oxygen. The boiler-oriented fuel can be burned by using only this exhaust gas. As a result, the thermal efficiency of power generation reaches 46% (net thermal efficiency).

Consequently, the diesel light oil and the residual oil under reduced pressure can be converted into electric power without newly establishing a partial processing facility and without transporting the oil to an electric power company.

Example H-2 (Combined Cycle Power Generation Performed by Power Generation Apparatus Placed in Juxtaposition with Steelmaking Plant)

The power generation apparatus of FIG. 4 is placed in juxtaposition with a steelmaking plant.

Koppers coke oven is placed in the steelmaking plant. Thus, bituminous coal is completely decomposed to thereby produce coke and coke oven gas.
Supply Rate of Coal: 200 t/hr
Production Rate of Coke: 146 t/hr
  By-product Amount of Coke Oven Gas: 6,200 $Nm^3$/hr
  Composition of Coke Oven Gas: 56% by volume of hydrogen, 27% by volume of methane, 7% by volume of carbon monoxide, 3% by volume of hydrocarbon and other non-combustible gas components.
  Calorific Value of Coke Oven Gas: 4,450 kcal/$Nm^3$ Iron or steel is manufactured by supplying the aforementioned coke to a blast furnace.

The following blast furnace gas is generated from the blast furnace, and thus can be supplied to the gas turbine.
  Composition of Blast Furnace Gas: 3% by volume of hydrogen, 24% by volume of carbon monoxide and other kinds of non-flammable gas components.
  Calorific Value of Blast Furnace Gas: 800 kcal/$Nm^3$ Hereinafter, the case of using a coke oven gas will be described.

Full amount of the coke oven gas is supplied to the gas turbine as the gas-turbine-oriented fuel. Moreover, 85.2 t/hr of pulverized coal produced in the process of manufacturing coke, and, if necessary, together with coal for coal-making are supplied to the boiler as the boiler-oriented fuel.

The gas-turbine exhaust gas is at a temperature of about 580° C. and contains about 13% by volume of oxygen. The boiler-oriented fuel can be burned by using only this exhaust gas. As a result, the thermal efficiency of power generation reaches 45% (net thermal efficiency).

Consequently, the electric power can be efficiently obtained from a coke oven gas and pulverized coal without newly establishing a partial processing facility.

Example H-3 (Combined Cycle Power Generation Performed by Power Generation Apparatus Placed in Juxtaposition with Chemical Plant)

The power generation apparatus of FIG. 4 is placed in juxtaposition with a chemical plant which includes a naphtha-cracking plant, a general-purpose resin plant and a chemical product plant.

Naphtha is supplied to the naphtha-cracking plant, and the naphtha-cracking of the naphtha is completely achieved.

Rate of Treating Naphtha: 1,000,000 t/year
Production Rate of Ethylene: 350,000 t/year
Production Rate of Propylene: 170,000 t/year
Production Rate of Benzene: 56,000 t/year
Production Rate of Off-Gas
Production Rate in Terms of Methane: 87,000 t/year
Calorific Value in Terms of Methane: 13,300 kcal/kg
Production Rate of Fuel Oil and Tar: 39,500 t/year
Calorific Value of Fuel Oil and Tar: 10,500 kcal/kg
Production Rate of Unrecyclable Resin: 55,000 t/year
Calorific Value of Unrecyclable Resin: 9,300 kcal/kg
Production Rate of Chemical Tar-like Product: 21,000 t/year
Calorific Value of Chemical Tar-like Product: 4,800 kcal/kg Currently, an off-gas exhausted from the naphtha-cracking plant, tar-like substances exhausted from the naphtha-cracking plant and various resin plants, unrecyclable resins such as atactic polymers, washed polymers at the time of changing brands and nonstandardized resins are burned by the boiler. Then, steam is generated, and electric power is generated. At that time, the thermal efficiency of power generation is 39% (net thermal efficiency).

Further, the combined cycle power generation is performed by using an off-gas, which has been hitherto supplied to the boiler as a combustion gas, as a gas-turbine-oriented fuel, and using fuel oil and tar, unrecyclable resins and chemical tar-like substances as the boiler-oriented fuel. Moreover, a gas-turbine exhaust gas is supplied to the boiler, and the boiler-oriented fuel is burned therein. Consequently, the thermal efficiency of power generation reaches 46% (net thermal efficiency).

Consequently, electric power can be efficiently obtained in a chemical plant without newly establishing a partial processing facility, by supplying an off-gas, which is exhausted from a naphtha-cracking plant, to the gas turbine, and supplying tar-like emission matter, unrecyclable resins and tar-like chemical substances, which are exhausted from the naphtha cracking plant and various resin plants, to the boiler. Further, if necessary, the obtained electric power can be sold to an electric power company.

What is claimed is:

1. A power generation method comprising the steps of:
separating a boiler-oriented fuel (F) into a distillate (D) and a residue (R) by performing partial processing of the boiler-oriented fuel (F);
adopting a fuel for a gas turbine (G) obtained from the distillate singly, or a mixture of the fuel for a gas turbine (G) and a gas-turbine-oriented fuel (G') as a gas turbine fuel (A);
adopting the residue (R) singly, or a mixture of the residue (R) and at least one fuel selected from the group consisting of a boiler-oriented fuel (F) and another kind of boiler-oriented fuel (F') as a boiler fuel (B);
generating electric power by driving a steam turbine which is driven by steam produced by burning the gas turbine fuel (A) in the gas turbine; and
generating electric power by driving a steam turbine which is driven by steam produced by burning the boiler fuel (B) in a boiler,
wherein the boiler-oriented fuel (F or F') is a fuel selected from the group consisting of coal, poorly graded coal whose volatile matter is not less than 20% by weight, char, coke, fuel oil, residual oil, pitch, bitumen, petroleum coke, carbon, tar sand, sand oil obtained from tar sand, oil shale, shale oil obtained from oil shale, Orinoco tar, orimulsion which is an aqueous suspension of Orinoco tar, asphalt, emulsified asphalt, petroleum-oil mixture (COM), coal-water mixture (CWM), coal-methanol slurry, mass resulted from naturally occurring substances, waste plastic, combustible refuse, and a mixture of these substances;
wherein at least a gas component (V) and an oil component (O) are separated from the distillate (D), and wherein the gas component (V), the oil component (O) or both of the gas component (V) and the oil component (O) is used as the fuel for a gas turbine (G);
wherein the oil component (O) is separated into a refined distillate (C) and a distillate residue (R') by distilling the oil component (O), wherein the refined distillate (C) is used as the fuel for a gas turbine (G), and wherein the distilled residue (R') is used in the boiler; and
wherein the gas component (V) is burned by a gas turbine for burning gas, and wherein the oil component (O) or the refined distillate (C) is burned by a gas turbine for burning oil.

2. The power generation method according to claim 1, wherein the boiler fuel (B) is burned again by supplying a gas-turbine exhaust gas to the boiler.

3. The power generation method according to claim 1, wherein steam for generating power is produced by supplying a gas-turbine exhaust gas to a heat recovery boiler, and wherein the boiler fuel (B) is burned again by supplying an exhaust gas discharged from the heat recovery boiler to the boiler.

4. The power generation method according to one of claims 1 to 3, wherein the partial processing is partial separation processing which comprises at least one selected from a group consisting of topping, flushing, distillation, extraction and decantation.

5. The power generation method according to one of claims 1 to 3, wherein the partial processing is partial decomposition processing which comprises at least one selected from a group consisting of thermal decomposition, carbonization, water-gas gasification, combustion-gas gasification, hydrogenation and microwave irradiation.

6. The power generation method according to claim 4, wherein the partial processing is performed at a temperature in a range of 250° C. to 500° C.

7. The power generation method according to claim 1, wherein the ratio of the heat quantity of the distillate (D) to the residue (R) is 20–60% to 80–40%.

8. The power generation method according to claim 1, wherein the gas turbine fuel (A) contains sodium, potassium and vanadium, the total weight ratio of sodium and potassium being not more than 0.5 ppm, and the weight ratio of vanadium being not more than 0.5.

9. A power generation apparatus comprising:
partial processing means for separating a boiler-oriented fuel (F) into a distillate (D) and a residue (R) by performing partial processing of the boiler-oriented fuel (F);

a first separation device for separating at least a gas component (V) and an oil component (O) from the distillate (D);

a second separation device for separating the oil component (O) into refined distillate (C) and residue (R');

a gas turbine;

a power generator for the gas turbine which generates electric power by driving the gas turbine;

a boiler for generating steam;

a steam turbine to be driven by the steam discharged from the boiler; and a power generator for the steam turbine which generates electric power by driving the steam turbine, wherein the boiler-oriented fuel (F or F') is a fuel selected from a group of coal, poorly graded coal whose volatile matter is not less than 20% by weight, char, coke, fuel oil, residual oil, pitch, bitumen, petroleum coke, carbon, tar sand, sand oil obtained from tar sand, oil shale, shale oil obtained from oil shale, Orinoco tar, orimulsion which is an aqueous suspension of Orinoco tar, asphalt, emulsified asphalt, petroleum-oil mixture (COM), coal-water mixture (CWM), coal-methanol slurry, mass resulted from naturally occurring substances, waste plastic, combustible refuse, and a mixture of these substances.

10. The power generation apparatus according to claim 9, which further comprises an exhaust gas supplying means for supplying the exhaust gas discharged from the gas turbine to the boiler.

11. The power generation apparatus according to claim 9, which further comprises:

a heat recovery boiler into which the exhaust gas discharged from the gas turbine is introduced to generate steam for generating power; and an exhaust gas supplying means for supplying the exhaust gas discharged from the heat recovery boiler to the boiler.

12. A power generation method comprising the steps of:

placing first and second power generation apparatuses in juxtaposition with a facility from which a gas-turbine oriented fuel and a boiler-oriented fuel can be supplied, wherein each of the first and second power generation apparatuses individually comprise:

partial processing means for separating the boiler-oriented fuel (F) into a distillate (D) and a residue (R) by performing partial processing of the boiler-oriented fuel (F);

a first separation device for separating at least a gas component (V) and an oil component (O) from the distillate (D);

a second separation device for separating the oil component (O) into refined distillate (C) and residue (R');

a gas turbine;

a power generator for the gas turbine which generates electric power by driving the gas turbine;

a boiler for generating steam;

a steam turbine to be driven by the steam discharged from the boiler; and a power generator for the steam turbine which generates electric power by driving the steam turbine, wherein the boiler-oriented fuel (F or F') is a fuel selected from a group of coal, poorly graded coal whose volatile matter is not less than 20% by weight, char, coke, fuel oil, residual oil, pitch, bitumen, petroleum coke, carbon, tar sand, sand oil obtained from tar sand, oil shale, shale oil obtained from oil shale, Orinoco tar, orimulsion which is an aqueous suspension of Orinoco tar, asphalt, emulsified asphalt, petroleum-oil mixture (COM), coal-water mixture (CWM), coal-methanol slurry, mass resulted from naturally occurring substances, waste plastic, combustible refuse, and a mixture of these substances;

supplying the gas-turbine-oriented fuel to a gas turbine in the first power generation apparatus and then burning the gas-turbine-oriented fuel therein;

generating electric power by driving the gas turbine in the first power generation apparatus by using a combustion gas for driving which is generated by burning the gas-turbine-oriented fuel;

supplying the boiler-oriented fuel to the boiler in the second power generation apparatus, and burning the boiler-oriented fuel therein by using an exhaust gas discharged from the gas turbine; and generating electric power by driving a steam turbine in the second power generation apparatus which is driven by steam generated by burning the boiler-oriented fuel.

13. The power generation method according to claim 12, wherein the facility is at least one which is selected from a group consisting of an oil purification plant, a steelmaking plant and a chemical plant.

14. The method according to claim 1, wherein the mass resulted from naturally occurring substances comprises at least one component selected from the group consisting of wood, grass, fats, oils, and press cake.

15. The apparatus according to claim 12, wherein the mass resulted from naturally occurring substances comprises at least one component selected from the group consisting of wood, grass, fats, oils, and press cake.

16. The method according to claim 15, wherein the mass resulted from naturally occurring substances comprises at least one component selected from the group consisting of wood, grass, fats, oils, and press cake.

* * * * *